US 10,836,581 B2

(12) United States Patent
DeGroot et al.

(10) Patent No.: US 10,836,581 B2
(45) Date of Patent: Nov. 17, 2020

(54) INFEED AND OUTFEED ASSEMBLIES FOR A CONVEYOR

(71) Applicant: Laitram, L.L.C., Harahan, LA (US)

(72) Inventors: Michael Hendrik DeGroot, Rockford, MI (US); Gerko Hulshof, Aalten (NL); Drew Downer, Caledonia, MI (US); James R. Honeycutt, Jr., Grandville, MI (US)

(73) Assignee: Laitram, L.L.C., Harahan, LA (US)

( * ) Notice: Subject to any disclaimer, the term of this patent is extended or adjusted under 35 U.S.C. 154(b) by 0 days.

(21) Appl. No.: 16/335,456

(22) PCT Filed: Sep. 21, 2017

(86) PCT No.: PCT/US2017/052631
§ 371 (c)(1),
(2) Date: Mar. 21, 2019

(87) PCT Pub. No.: WO2018/057688
PCT Pub. Date: Mar. 29, 2018

(65) Prior Publication Data
US 2019/0263596 A1 Aug. 29, 2019

Related U.S. Application Data

(60) Provisional application No. 62/397,416, filed on Sep. 21, 2016, provisional application No. 62/404,946, filed on Oct. 6, 2016.

(51) Int. Cl.
*B65G 23/44* (2006.01)
*B65G 21/06* (2006.01)

(52) U.S. Cl.
CPC ............ *B65G 21/06* (2013.01); *B65G 23/44* (2013.01)

(58) Field of Classification Search
CPC ........ B65G 23/44; B65G 23/14; B65G 23/16; B65G 23/26; B65G 15/60
(Continued)

(56) References Cited

U.S. PATENT DOCUMENTS 1,913,040 A * 6/1933 Pierson ................... F16H 7/14
474/113
4,156,482 A * 5/1979 Tomlinson ............ B65G 57/28
198/411

(Continued)

FOREIGN PATENT DOCUMENTS

CN 1678184 A 10/2005
DE 4233131 A1 4/1994
(Continued)

OTHER PUBLICATIONS

Extended European Search Report of the European Patent Application No. 17853853.4, dated Apr. 22, 2020, European Patent Office, Munich, Germany.
(Continued)

*Primary Examiner* — Joseph A Dillon, Jr.
(74) *Attorney, Agent, or Firm* — Catherine M. Bishop

(57) ABSTRACT

A conveyor employs an infeed assembly and outfeed assembly, each comprising a nosebar assembly that may be mounted to a conveyor frame to transition a conveyor belt between a returnway and a carryway, a belt guiding roller, such as a sprocket or brake, a position limiter for ensuring proper engagement between the belt guiding roller and the conveyor belt and a connecting plate that ensures proper placement of the position limiter relative to the guide roller. The infeed assembly and outfeed assembly components may be easily moved into engagement and out of engagement to facilitate replacement, cleaning or maintenance.

15 Claims, 57 Drawing Sheets

(58) Field of Classification Search
USPC ...... 198/813, 832.3, 835; 474/131, 133, 136
See application file for complete search history.

(56) References Cited

U.S. PATENT DOCUMENTS

| | | | | |
|---|---|---|---|---|
| 4,179,026 A * | 12/1979 | de Vries | ................ | B65G 15/02 198/831 |
| 4,203,513 A * | 5/1980 | Scheppele | ............. | B65G 47/19 198/502.2 |
| 4,253,343 A * | 3/1981 | Black | ................... | A01F 29/14 198/813 |
| 4,278,166 A * | 7/1981 | Pirro, Jr. | .............. | B65G 47/261 198/781.04 |
| 4,561,538 A * | 12/1985 | Zwiebel | ................ | B65G 23/44 198/816 |
| 4,919,255 A * | 4/1990 | Morgan | ............... | B65G 47/261 198/781.06 |
| 5,076,331 A * | 12/1991 | Debaes | ................. | D03D 39/18 139/291 C |
| 5,096,045 A * | 3/1992 | Feldl | ..................... | B65G 15/24 198/583 |
| 5,186,313 A * | 2/1993 | Denker | ................. | B65G 23/44 198/806 |
| 5,186,336 A * | 2/1993 | Pippin | ................... | B07C 5/3412 198/367.2 |
| 5,301,797 A * | 4/1994 | Hollyfield, Jr. | ........ | B65G 45/16 198/499 |
| 5,378,273 A * | 1/1995 | Taguchi | ............... | B65G 47/244 156/362 |
| 5,615,775 A * | 4/1997 | Barbaret | .................. | B03C 1/16 209/219 |
| 5,622,249 A * | 4/1997 | Morin | .................... | B65G 45/12 15/256.6 |
| 5,626,219 A * | 5/1997 | Deefholts | .............. | B65G 15/14 198/626.5 |
| 5,657,853 A * | 8/1997 | Pennino | ............... | B65G 39/073 15/256.52 |
| 5,901,854 A * | 5/1999 | Ishii | ...................... | B65G 47/38 198/370.04 |
| 5,934,449 A * | 8/1999 | Dolan | .................... | B65G 17/08 198/806 |
| 6,321,900 B1 * | 11/2001 | Micklethwaite | ....... | B65G 23/00 198/496 |
| 6,409,008 B1 * | 6/2002 | Newsome | ............... | B65G 15/14 198/403 |
| 6,471,044 B1 * | 10/2002 | Isaacs | ................... | B65G 43/08 198/347.4 |
| 6,619,473 B2 * | 9/2003 | Romeo | ................. | B65G 21/02 198/836.1 |
| 6,871,737 B2 | 3/2005 | Ertel et al. | | |
| 7,290,649 B2 * | 11/2007 | Wolkerstorfer | ....... | B65G 13/073 198/781.01 |
| 7,806,254 B2 * | 10/2010 | Brayman | ............... | B65G 15/00 198/832 |
| 8,469,182 B2 | 6/2013 | Alotto | | |
| 8,936,147 B2 * | 1/2015 | Knas | ..................... | B65G 23/44 198/814 |
| 8,960,415 B2 * | 2/2015 | Simonsen | ........... | B32B 37/0053 198/782 |
| 9,242,801 B2 * | 1/2016 | DeGroot | ............... | B65G 15/60 |
| 9,751,695 B2 * | 9/2017 | DeGroot | ............... | B65G 47/66 |
| 10,035,656 B2 * | 7/2018 | DeGroot | ............... | B65G 21/105 |
| 10,427,880 B2 * | 10/2019 | Batchelder | ............. | B65G 23/44 |
| 10,464,755 B2 * | 11/2019 | MacLachlan | .......... | B65G 15/62 |
| 10,654,663 B2 * | 5/2020 | Liebmann | .............. | B65G 43/08 |
| 10,696,481 B2 * | 6/2020 | Batchelder | ............. | B65G 39/16 |
| 2002/0108840 A1 | 8/2002 | Layne et al. | | |
| 2003/0010607 A1 * | 1/2003 | Romeo | ................. | B65G 21/105 198/860.1 |
| 2003/0069098 A1 * | 4/2003 | Serkh | .................... | F16H 7/1218 474/135 |
| 2003/0196875 A1 * | 10/2003 | Bube | ...................... | B65G 43/00 198/810.01 |
| 2005/0085945 A1 * | 4/2005 | Andoh | ................. | G03G 15/757 700/230 |
| 2006/0076217 A1 * | 4/2006 | Cumberlege | .......... | B65G 39/16 198/806 |
| 2006/0089223 A1 * | 4/2006 | Van Vooren | ......... | A01D 43/086 474/133 |
| 2006/0113166 A1 * | 6/2006 | Wolkerstorfer | ....... | B65G 13/073 198/781.01 |
| 2006/0229151 A1 * | 10/2006 | Jansen | .................. | F16H 7/1281 474/117 |
| 2007/0295583 A1 * | 12/2007 | Hall | ........................ | B65G 23/12 198/860.5 |
| 2008/0017479 A1 | 1/2008 | Ostman | | |
| 2009/0135019 A1 * | 5/2009 | Smith | .................... | B65G 43/00 340/679 |
| 2010/0072037 A1 | 3/2010 | Jabber et al. | | |
| 2011/0011705 A1 * | 1/2011 | Tabata | ................... | B41J 11/007 198/810.03 |
| 2011/0303513 A1 * | 12/2011 | Simonsen | ........... | B32B 37/0053 198/782 |
| 2013/0048469 A1 * | 2/2013 | Rogers | ................... | B65G 47/54 198/608 |
| 2013/0062167 A1 * | 3/2013 | Alotto | ..................... | B65G 21/06 198/813 |
| 2013/0108333 A1 * | 5/2013 | Yasumoto | ............ | G03G 15/162 399/303 |
| 2013/0264173 A1 * | 10/2013 | Felton | .................... | B65G 45/16 198/499 |
| 2013/0264176 A1 * | 10/2013 | Knas | ...................... | B65G 23/44 198/835 |
| 2014/0076695 A1 * | 3/2014 | Mott | ...................... | B65G 15/60 198/835 |
| 2014/0311874 A1 | 10/2014 | Franzaroli | | |
| 2015/0210475 A1 | 7/2015 | Batchelder et al. | | |
| 2015/0329292 A1 * | 11/2015 | Kawanami | ............. | B65G 15/64 198/813 |
| 2016/0167884 A1 * | 6/2016 | Batchelder | ............. | B65G 45/12 198/497 |
| 2016/0311622 A1 * | 10/2016 | DeGroot | ............... | B65G 21/105 |
| 2017/0362034 A1 * | 12/2017 | DeGroot | ............... | B65G 21/06 |
| 2019/0152706 A1 * | 5/2019 | Batchelder | ............. | B65G 39/16 |

FOREIGN PATENT DOCUMENTS

| | | |
|---|---|---|
| JP | 2015187032 A | 10/2015 |
| WO | 2016172296 A1 | 10/2016 |

OTHER PUBLICATIONS

Search Report of the Chinese Patent Application No. 201780058165.6, dated Jun. 22, 2020, China National Intellectual Property Administration.

* cited by examiner

INFEED AND OUTFEED ASSEMBLIES FOR A CONVEYOR

RELATED APPLICATIONS

The present application claims priority to U.S. Provisional Patent Application No. 62/397,416, filed Sep. 21, 2016 and entitled "Infeed and Outfeed Assemblies for a Conveyor", the contents of which are herein incorporated by reference. The present application also claims priority to U.S. Provisional Patent Application No. 62/404,946, filed Oct. 6, 2016 and also entitled "Infeed and Outfeed Assemblies for a Conveyor", the contents of which are herein incorporated by reference.

FIELD OF THE INVENTION

The present invention relates to power-driven conveyors. More particularly, the invention relates to infeed and outfeed assemblies for a conveyor to transition conveyed items onto and off of the conveyor.

BACKGROUND OF THE INVENTION

Power-driven conveyors are used to convey items. Infeed assemblies are used to transition items onto the conveyor as the conveyor belt moves from a returnway to a carryway above the returnway. Outfeed assemblies are used to transition items off of the conveyor as the belt moves from the carryway to the returnway. A drive moves the conveyor belt through the conveying circuit. For example, drive sprockets mounted on a rotatable shaft may engage and drive the conveyor belt along the conveying circuit. Drive sprockets can be located at the outfeed of the conveyor or within the returnway of the circuit. The infeed may contain drag sprockets to create resistance to the belt movement. Such resistance may be helpful in positively-driven conveyor belts that are not pretensioned throughout the belt circuit, allowing the conveyor belt to be loose and strain-fee between the drive and the drag sprockets. Roller limiters or other devices may be used to ensure proper engagement between the conveyor belt and the drive or drag sprockets.

Currently, it is difficult to either clean or maintain cleanliness in conveyors and—or to disassemble certain components for cleaning, replacement or maintenance. In addition, space surrounding drag sprockets and drive sprockets may be limited, making the addition of other conveyor components, such as scrapers and belt wrap rollers, difficult.

In addition, small transfers of items are generally limited to flat belts that operate using pretension. The pretension, combined with the velocity of the infeed and—or outfeed rollers, results in a short life span for the rollers or static nose bars that guide the belts. Replacement of worn components leads to downtime of the conveyor and can be difficult.

SUMMARY OF THE INVENTION

A conveyor comprises a frame, a positive-drive, low tension conveyor belt trained around an infeed portion and an outfeed portion. An infeed assembly is mounted to the frame and includes a removable belt-guiding assembly comprising an axle and a rotatable nosebar mounted to the axle. A belt-guiding roller is mounted at the infeed below the belt-guiding assembly to impart drag on the belt. A position limiter assembly, movable between an engaged position and a disengaged position in which the position limiter assembly is still connected to the frame, ensured proper engagement between the conveyor belt and the belt-guiding roller. An outfeed assembly includes a drive, a disengageable position limiter assembly for ensuring proper engagement between the drive and the conveyor belt and a scraper assembly that can also be disengaged.

According to one aspect, an assembly for a conveyor comprises a first side plate, a second side plate opposing the first side plate, a first roller extending between the first side plate and the second side plate for engaging a drive side of a conveyor belt, a connecting plate mounted to the side plate and having a first seat for receiving an axle end of the first roller, and a second seat that is open, a position limiter for ensuring proper engagement between the drive side of the conveyor belt and the first roller, the position limiter having a first end configured to be received in the open seat and a handle connected the position limiter. The handle is movable between an operating position in which the position limiter end is mounted in the open seat and a nonoperating position, in which the position limiter end is unseated from the open seat, yet still connected to the conveyor frame.

According to another aspect, a conveyor assembly comprises a first conveyor component having a chamfered opening, a second conveyor component having a threaded portion and an enlarged portion above the threaded portion, the enlarged portion tapering to a point and a fastener having a threaded opening for mating with the threaded portion to secure the second conveyor component to the first conveyor component.

According to another aspect, a connecting plate for positioning a roller limiter relative to a conveyor belt in a conveyor assembly is provided The connecting plate comprises a first opening for receiving an axle of a belt-guiding roller, an open seat for seating a connecting portion of the roller limiter and a second opening for mounting the connecting plate to a side plate of a conveyor frame.

DETAILED DESCRIPTION OF THE INVENTION

Figure 1:
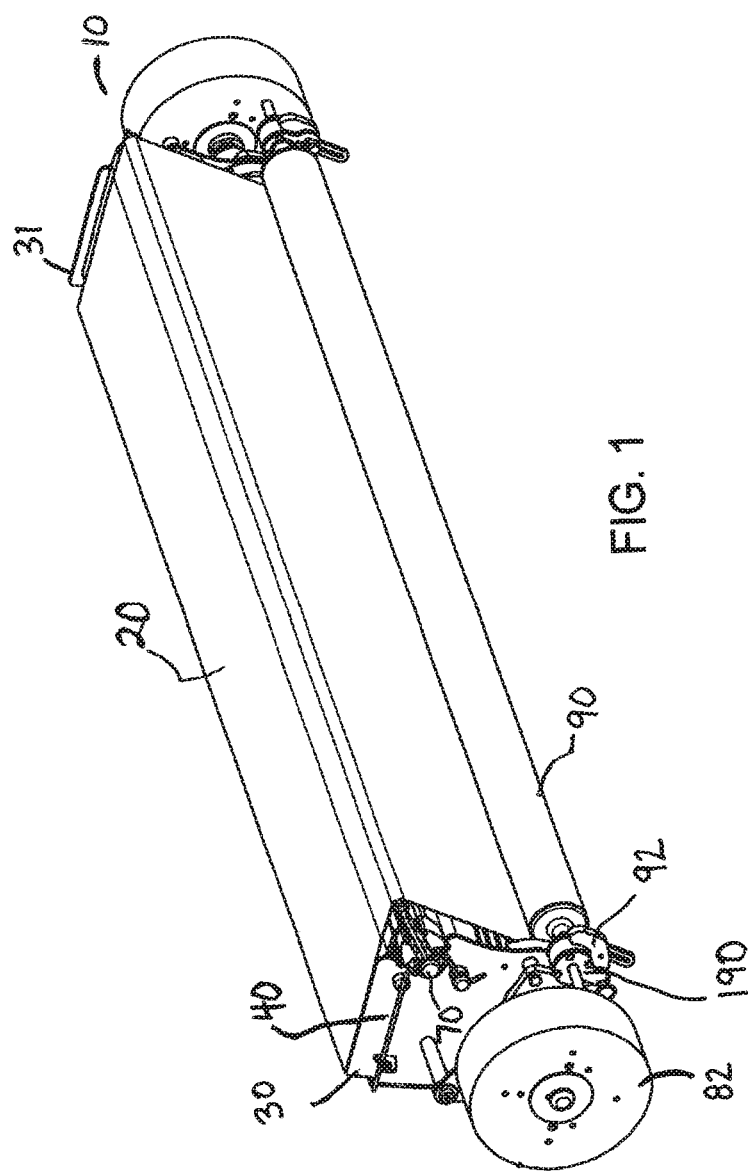
FIG. 1 is an isometric view of an infeed portion of a conveyor belt system according to an embodiment of the invention.

The present invention provides a sanitary system at a transition end, i.e., the infeed or outfeed end, of a conveyor that can be easily installed and removed without tools. The system facilitates transfer of products to and from positively-driven, low tension endless conveyor belts and enables small diameter transfers. The present invention will be described below relative to an illustrative embodiment. Those skilled in the art will appreciate that the present invention may be implemented in a number of different applications and embodiments and is not specifically limited in its application to the particular embodiments depicted herein.

FIGS. 1-5 show an infeed portion 10 of a conveyor belt system according to an embodiment of the invention. The conveyor belt system includes a frame and a positively-driven, low tension conveyor belt 20, such as the Thermo- Drive® belt available from Intralox, L.L.C., the Cleandrive positive drive belt available from Habasit AG, the Gates Mectrol PosiClean® positive drive belt available from Gates Mectrol, the Volta SuperDrive™ and other positive drive belts available from Volta Belting and other positively-driven, low tension conveyor belts known in the art. The invention is not limited to these belts, and may be implemented with any suitable positive-drive, low tension conveyor belt. The illustrative conveyor belt 20 has a smooth outer surface substantially free of discontinuities and an inner surface with a plurality of teeth at a given belt pitch or other suitable drive elements. The conveyor belt 20 conveys products along a carryway from an infeed to an outfeed and returns along a returnway below the carryway. The conveyor belt may be conventionally trained around belt-guiding members in the infeed portion 10 and outfeed portion 12, as described below.

At the infeed end 10, the conveyor belt 20 comes up from the returnway and enters the carryway, and items to be conveyed transition onto the conveyor belt 20. In certain applications, it may be desirable to have a "tight transfer", i.e., smooth transition on and off the conveyor belt for even small products.

The illustrative infeed end comprises a frame for a conveyor belt, the frame including opposing side plates 30, 31 and a carryway support 32. Each side plate include a recess 33 in a top front corner for seating a noseroller assembly 70 for guiding the conveyor belt at the infeed transition point. Upper protrusions 35, 36, 37 are used to lock the noseroller assembly to the frame using a handle 40. The infeed end 10 further includes a guide roller 80 for guiding the belt below the infeed transition point. The illustrative guide roller 80 includes a plurality of teeth for engaging the drive elements on the drive side of the conveyor belt. The guide roller can be a brake for imparting localized tension to help the conveyor belt conform to the noseroller assembly. A position limiter, shown as a roller limiter 90, ensures proper engagement of the drive elements of the conveyor belt with the teeth on the guide roller 80.

Figure 10:
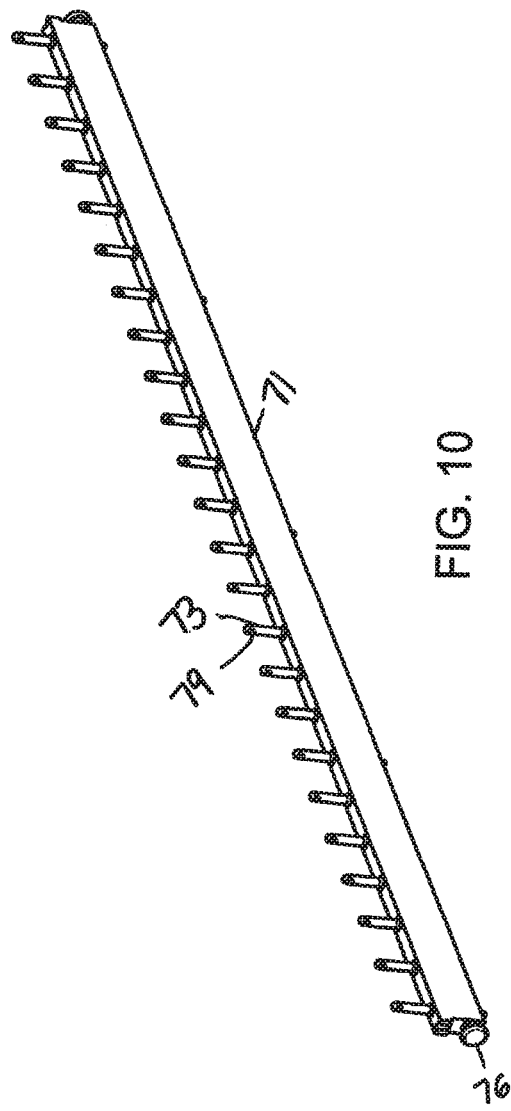
FIG. 10 shows the assembly of FIG. 6 with the noseroller segments and axle removed.

The illustrative noseroller assembly 70 comprises a cartridge that can be easily removed from and inserted into the frame. Alternatively, the noseroller assembly 70 can be permanently attached to the frame. The nosebar assembly 70 comprises one or more passive rotatable nosebars 75 for guiding the conveyor belt. In the illustrative embodiment, the nosebar assembly comprises a series of toothed nosebars 75 mounted on an axle or other structure. As shown in FIGS. 6-10, the illustrative noseroller assembly 70 comprises a support beam 71 that extends from a first end to a second end, corresponding to the width of the conveyor belt 20. Clips 72 are disposed at periodic intervals along the beam 71 to allow mounting of the noseroller assembly 70 in the conveyor frame. The support beam 71 includes a plurality of arms 73 extending up from the upper surface of the support beam 71. Each arm 73 includes at least one opening 79, as shown in FIG. 10, for receiving an axle 74.

To assemble the noseroller assembly, a nosebar segment 75 is placed between two arms 73, such that an opening in the nosebar segment 75 aligns with the opening 79 in the arm, then, the axle 74 is pushed through the aligned openings to secure the nosebar segments to the support beam 71. The nosebar axle 74 includes a straight body portion and one or more end curves 86 to allow the nosebar axle 74 to lock into place, or rotate to allow for easy disassembly and replacement of the nosebars 75. The nosebar axle 74 ensures that all nosebars 75 are coaxial and allow free rotation of the nosebars 75 about the axle, driven by the conveyor belt 20.

When the axle 74 and the end assembly 10 are connected, the axle 74 is locked. When removed from the conveyor, the axle 75 can be rotated and removed. As it is removed, each individual nosebar 75 can come out.

The nosebar 75, an embodiment of which is described in US Patent Application Publication No. 2014/00116856 entitled "Positively-Driven, Low Tension Transfer Conveyor", the contents of which are herein incorporated by reference, forms a guide structure for guiding the conveyor belt around the infeed end. The nosebar 75 is mounted on and is freely rotatable about the nosebar axle 75. Roller bearings or other devices may facilitate rotation of the nosebar 75 about the nosebar axle 74. The nosebar 75 has a relatively small diameter, which may be smaller than the arc of the natural curvature of the belt 20. The small radius of the nosebar allows a smaller gap between two conveyor belts or between the conveyor belt and another device to ensure a smooth transition. The nosebars 75 have a grooved profile, shown as teeth that engage drive structure on the conveyor belt 20 to allow the conveyor belt 20 to drive the nosebars 75. The nosebars function as slide bearings and the use of a series of segments across the width of the axle 74 limits deflection of the axle 74 and conveyor belt 20.

The support beam 71 for the noseroller assembly further includes protrusions 76, 77 extending from the end faces for securing the noseroller assembly to the conveyor frame. Each protrusion 76, 77 comprises a neck forming a channel for receiving a locking handle 40 and an enlarged head at the end of the neck.

Figure 11:
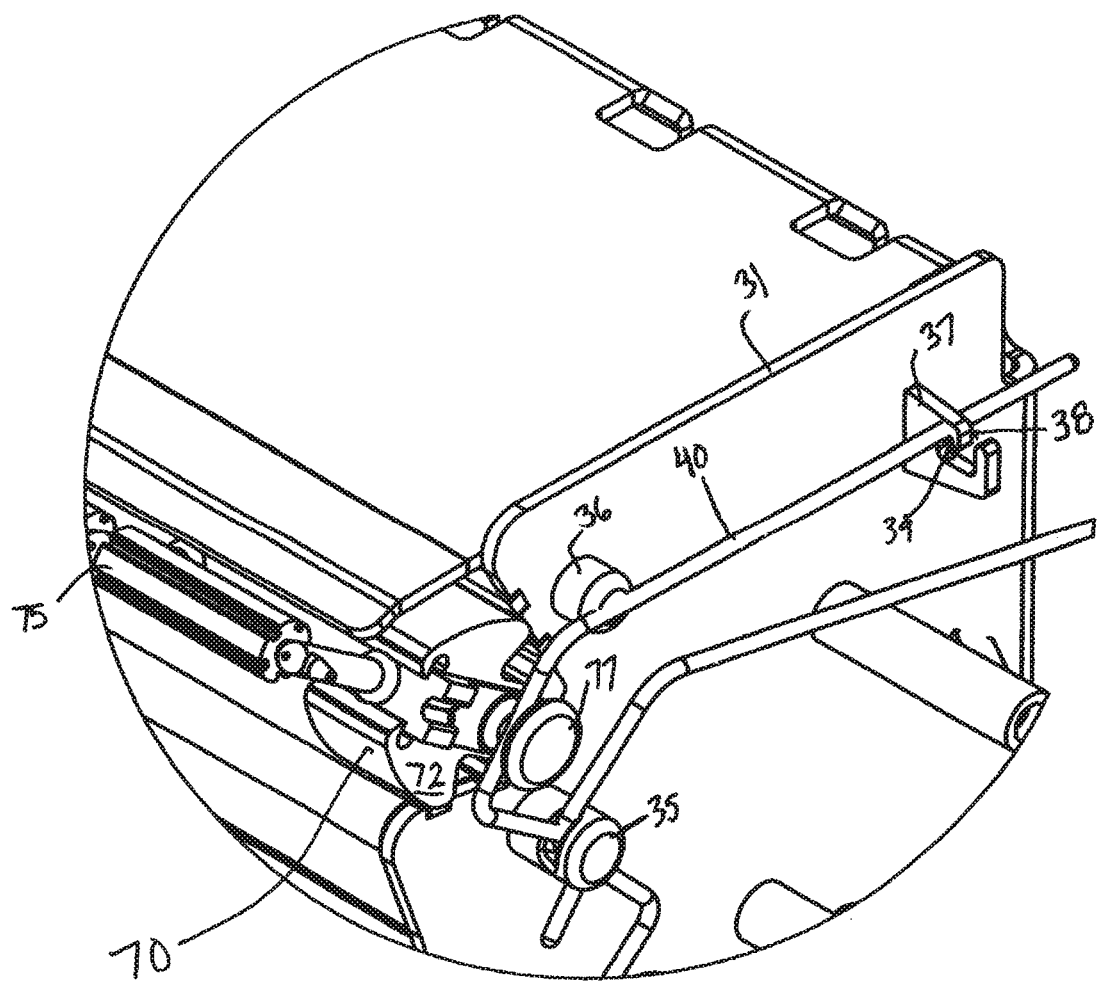
FIG. 11 is a detailed view of the noseroller assembly of FIG. 6 inserted in a conveyor frame.

As shown in FIG. 11, a handle 40 can lock each side of the noseroller cartridge 70 to the frame. The handle 40 extends through an opening in a first protrusion 35 on a side plate 30 or 31. The handle 40 bends, then passes through the channel formed by the neck of a protrusion 76 or 77, through a channel in a second protrusion 36. The end of the handle 40 can lock in place in the third protrusion 37, which includes a slot 38 and recess 39 for seating the handle. A user can depress the handle 40 and move the end out of the slot to release the handle 40, releasing the noseroller cartridge from the frame. The handle 40 may remain connected to the associated side plate 30 or 31 even when in an unlocked position Any suitable means for securing the noseroller assembly to the frame may be used, and the invention is not limited to the illustrative means. Preferably, the noseroller assembly can be locked in an operational position, where the axle is locked axially and rotationally, without the use of external tools or fasteners.

Each side plate 30, 31 at the infeed further include a slot 34 (see FIG. 3) or other feature for mounting the guide roller 80. The illustrative guide roller 80 mounted on an axle 81 that connects to an external drag unit 82 that may be used to create localized tension in the conveyor belt to allow the conveyor belt to conform to the small-diameter noseroller. The drag unit may include permanent magnet brakes to brake a drive, or any suitable device. In another embodiment, the drag unit is omitted or internal to the side plates 30, 31. The infeed 10 includes connectors 83 and other suitable means for mounting the drag unit 82 to the side plates 30, 31.

The infeed end further includes a position limiter, which in the illustrative embodiment comprises a roller limiter 90, mounted in a selected position relative to the guide roller to ensure proper engagement with the guide roller 80. Position limiter connecting plates 92 connect the roller limiter 90 to the side plates 30, 31 of the frame. The position limiter connecting plates allow the position limiter 90 to move between an engaged position, in which the positon limiter 90 is positioned to ensure proper engagement between the guide roller 80 and the conveyor belt 20, and an disengaged position, in which the position limiter 90 is pivoted or otherwise moved out of engagement yet still remains connected to the side plates 30, 31 to prevent loss and facilitate quick re-engagement.

Figure 12:
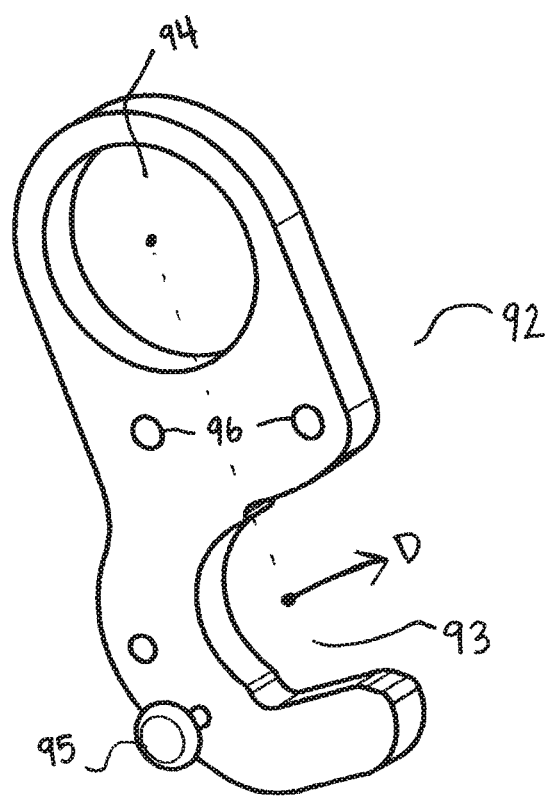
FIG. 12 is an isometric view of a limiter connecting plate used in the infeed portion of FIG. 1.

Referring to FIG. 12, the position limiter connecting plate 92 comprises an open seat 93 for seating a first connecting portion on the end of the roller limiter 90 and another seat, shown as opening 94, or other feature for mounting the axle 81 of the guide roller 80. In one embodiment, the axle of the guide roller 80 protrudes through the opening 94 and connects to drag unit 82 on an outer side. A protrusion 95 extends from the inner surface of the connecting plate 92 below the seat 93 to allow a pivotable connection to a second connecting portion of the roller limiter. The position limiter connecting plate 92 further includes openings 96 that receive fasteners 97 for mounting the connecting plate 92 to a side plate 30 or 31. Any suitable means for mounting the connecting plate 92 to the infeed may be used.

The open seat 93 of the connecting plate 92 comprises two straight side walls, a curved closed end wall and an open end wall to allow the connecting portion of the roller limiter to pivot out of the seat. In one embodiment, the open seat 93 is configured to allow pivoting of the roller limiter connecting portion 190 in a direction D that is perpendicular to an axial direction along which the roller limiter 90 extends. Direction D may also be perpendicular to a reference line extending between opening 94 and the open seat 93.

Figure 13:
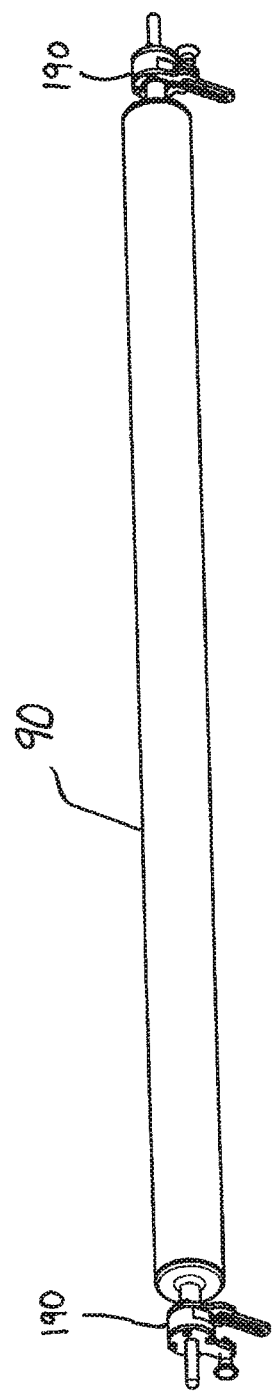
FIG. 13 is an isometric view of a position limiter assembly of the infeed portion of FIG. 1.
Figure 14:
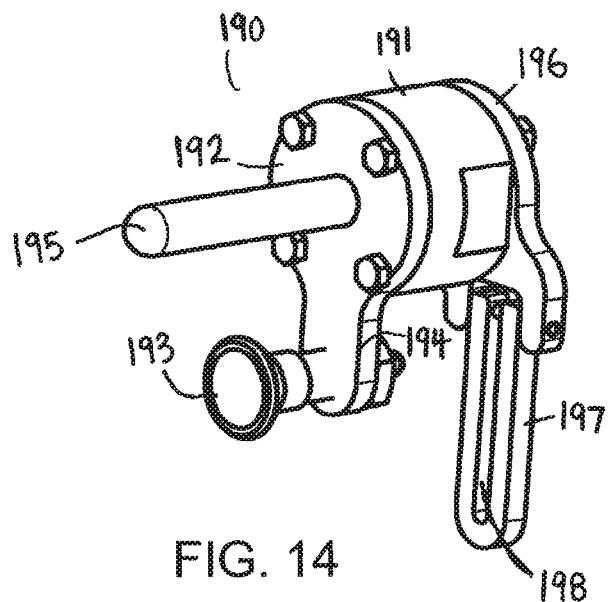
FIG. 14 is a detailed view of the connecting portions of the position limiter assembly of FIG. 13.
Figure 15:
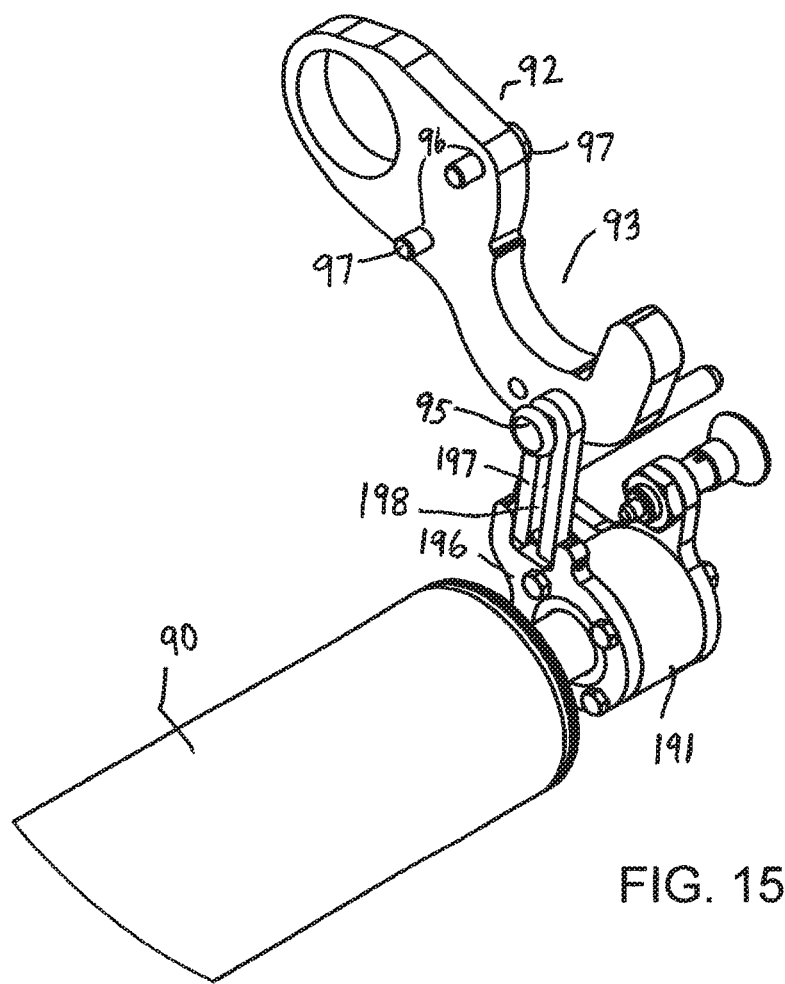
FIG. 15 shows the position limiter in a disengaged position relative to the limiter connecting plate according to an embodiment of the invention.

The roller limiter 90 includes mounting components that allow the roller limiter 90 to move into and out of engagement without requiring complete removal of the limiter from the frame. As shown in FIGS. 13 and 14, the roller limiter includes handles 190 at each end that can each be received in a seat 93 of the connecting plate 92. Each handle 190 comprises a central cylindrical portion 191 forming a connecting portion and through which the end axle of the roller limiter protrudes. An outer end face 192 caps the central cylindrical portion and has an off center handle 193 extending from a protrusion 194 as well as a central axle 195. An inner end face 1% caps the inner side of the central cylindrical portion 191 and includes a slotted extension 197 having a slot 198 forming a second connecting portion that engages the inner protrusion 95 on the connecting plate 92, as shown in FIG. 15. During normal operation, shown in FIGS. 1 and 5, the central cylindrical portion 191 is held in the seat 93, which properly positions the roller limiter 90 relative to the guide roller 80, sandwiching the conveyor belt 20 therebetween and ensuring proper engagement between the teeth of the conveyor belt 20 and the guide roller 80. The cylindrical portion 191 can be unseated from seat 93 to release the roller limiter 90 by pulling the handle 190 up out of the seat 93 and allowing the roller limiter 90 pivot about protrusion 95 out of the seat and fall, as shown in FIG. 15, while the engagement between the inner protrusion 95 and slotted extension 197 holds the roller limiter 90 attached to the frame, allowing the roller limiter 90 to be quickly reengaged. Other suitable means for allowing disengagement of the position limiter from an engaged position without disconnecting the position limiter from the frame may be used.

Figure 2:
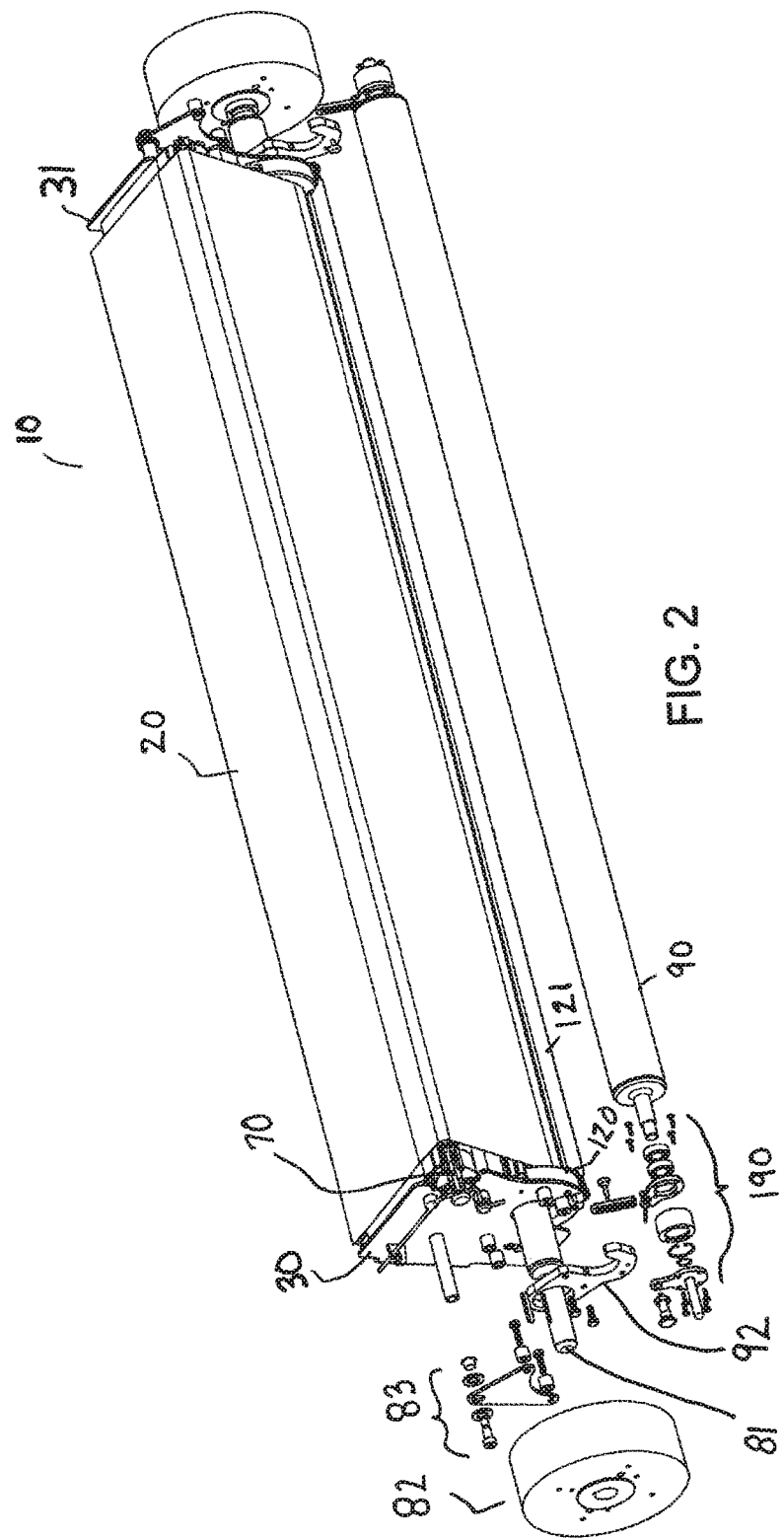
FIG. 2 is an exploded view of the infeed portion of FIG. 1.
Figure 3:
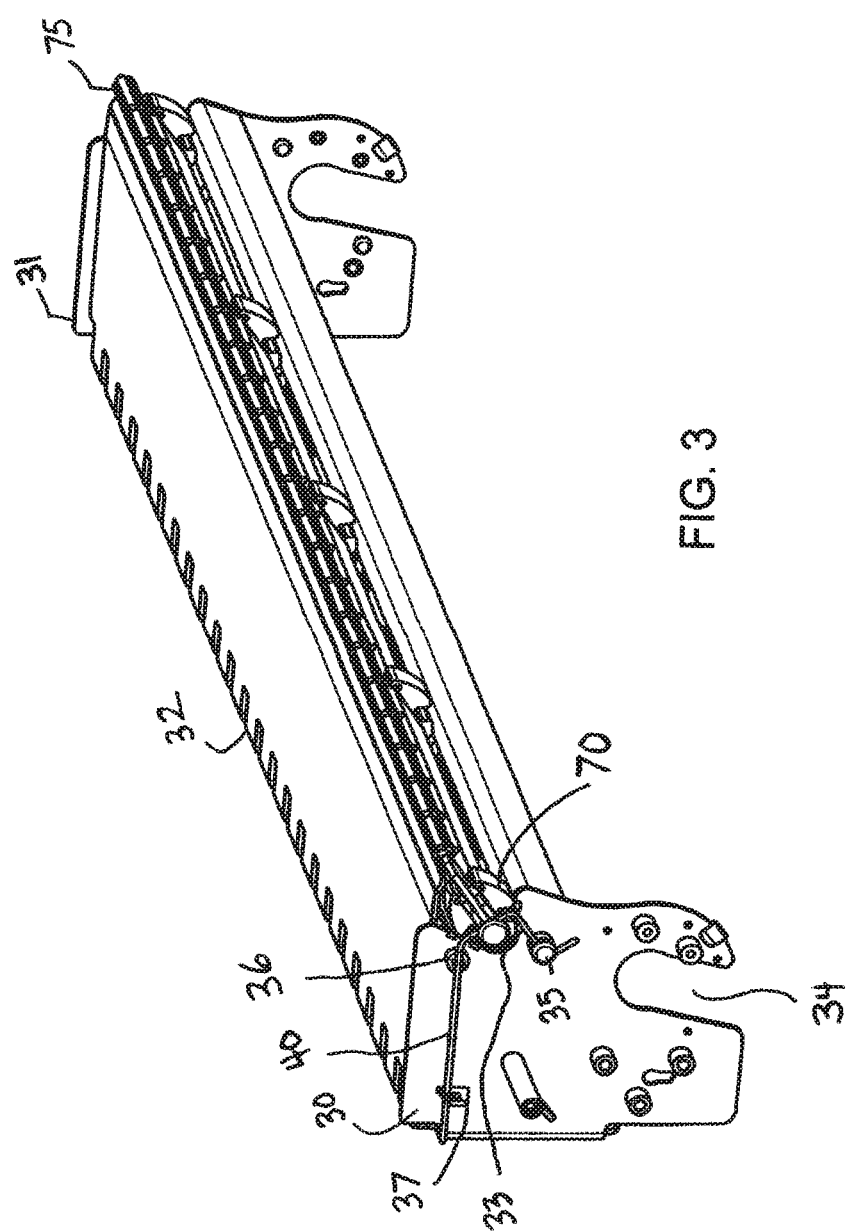
FIG. 3 shows a subset of the infeed portion of FIG. 1 with a conveyor belt, position limiter and guide roller removed.
Figure 4:
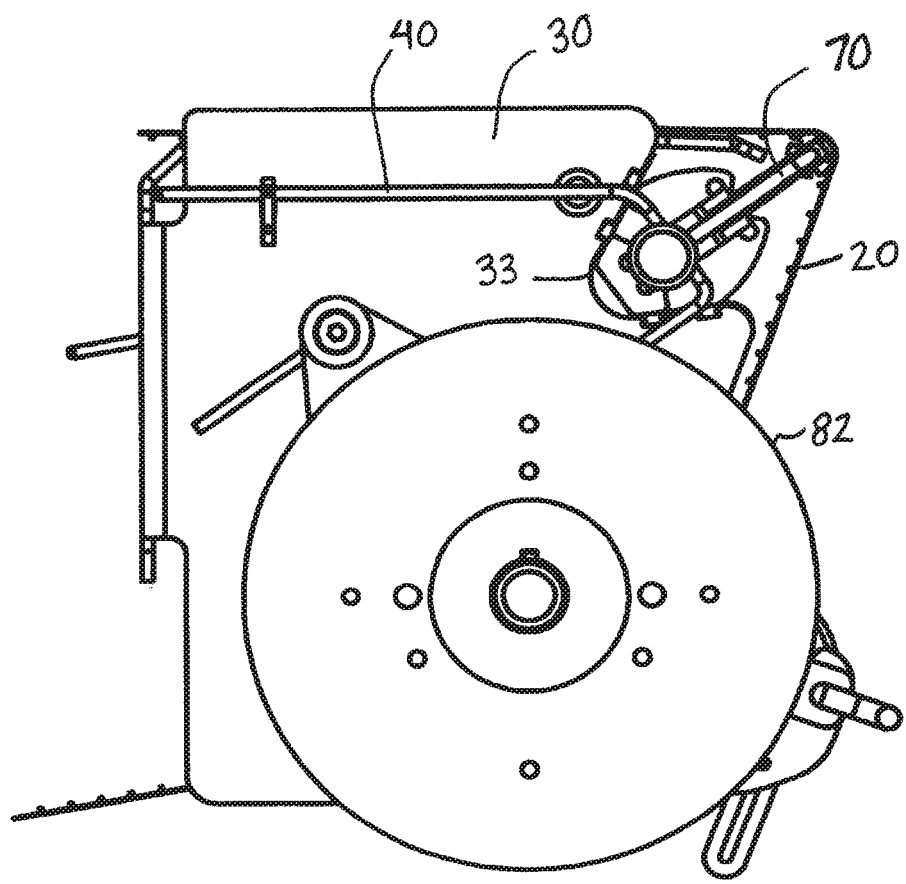
FIG. 4 is a side view of the infeed portion of FIG. 1.
Figure 5:
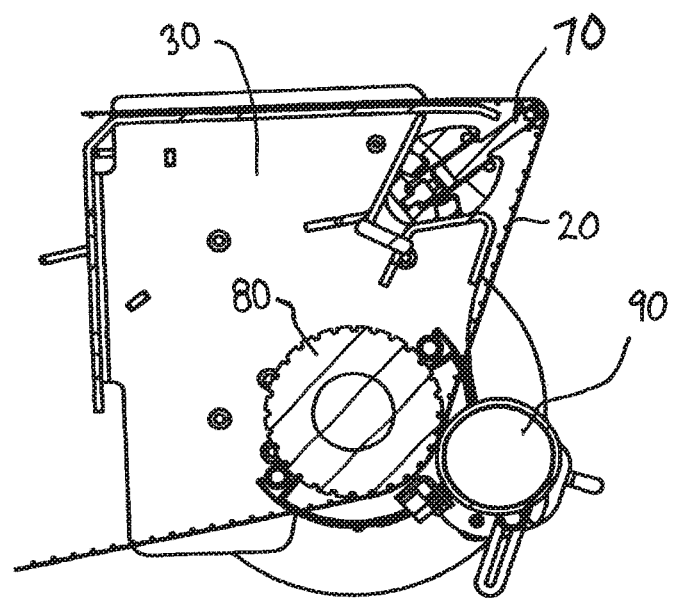
FIG. 5 is a cross-sectional side view of the infeed portion of FIG. 1.
Figure 6:
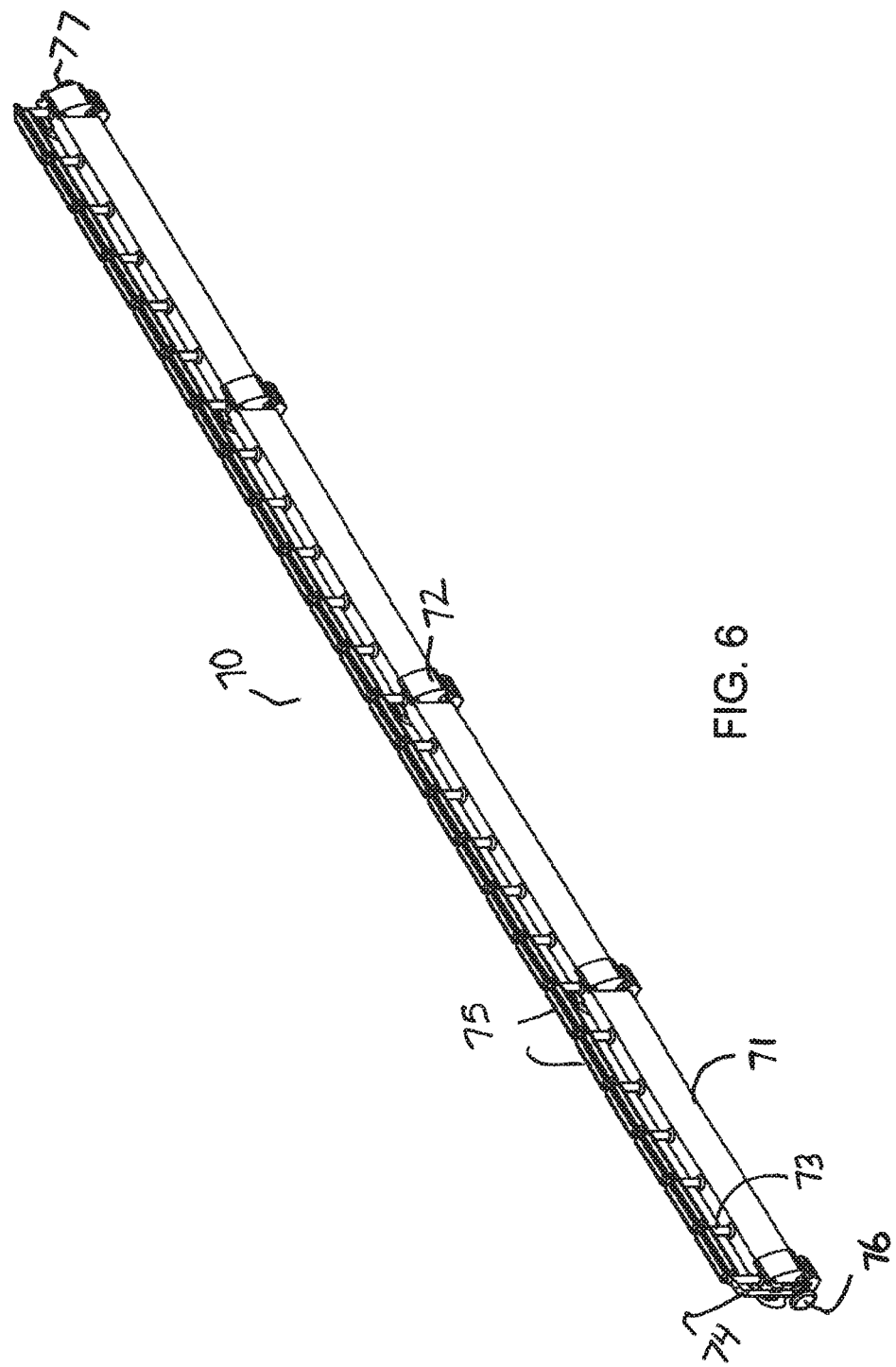
FIG. 6 is an isometric view of the noseroller assembly used in the infeed portion of FIG. 1.
Figure 7:
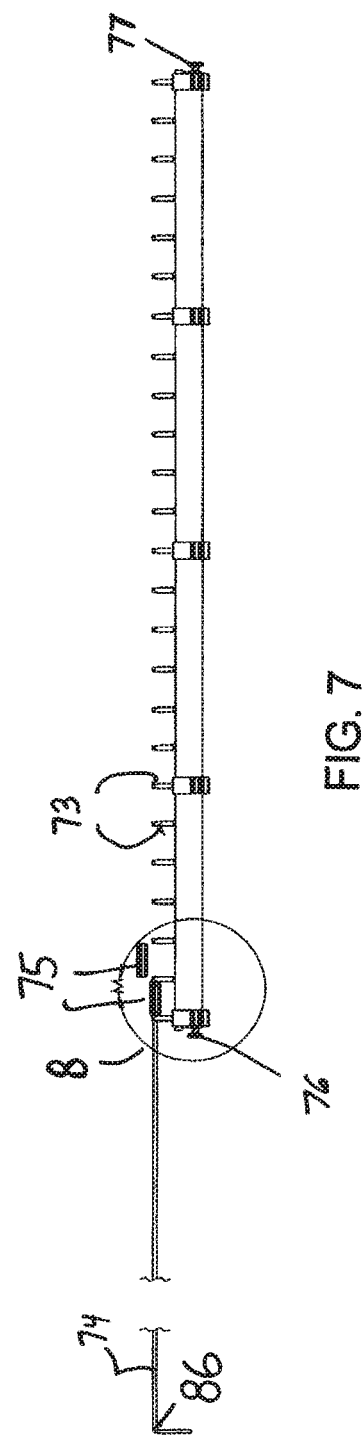
FIG. 7 is a front view of the noseroller assembly of FIG. 6 during assembly.
Figure 8:
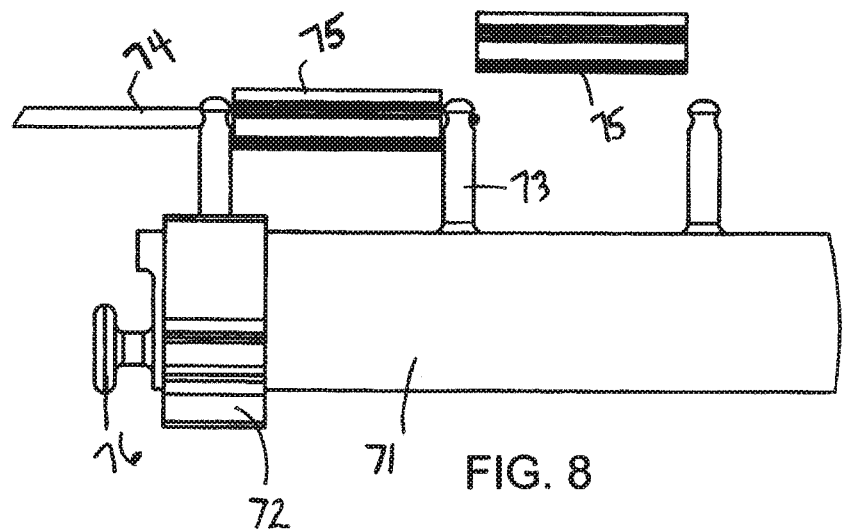
FIG. 8 is a detailed view of area 8 of FIG. 7.
Figure 9:
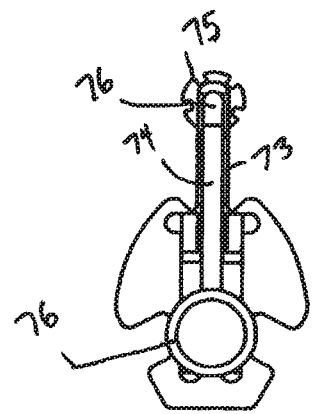
FIG. 9 is a side view of the noseroller assembly of FIG. 6.

Guards 120, 121 can also be mounted to the frame for safety purposes (see FIG. 2).

Figure 16:
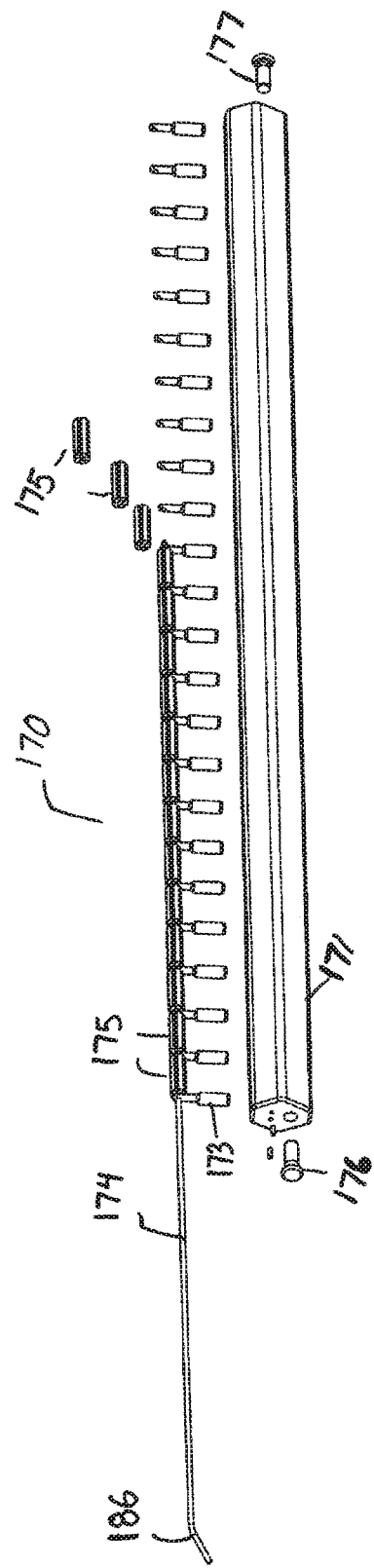
FIG. 16 shows another embodiment of a noseroller assembly suitable for use in an infeed or outfeed portion of a conveyor.
Figure 17:
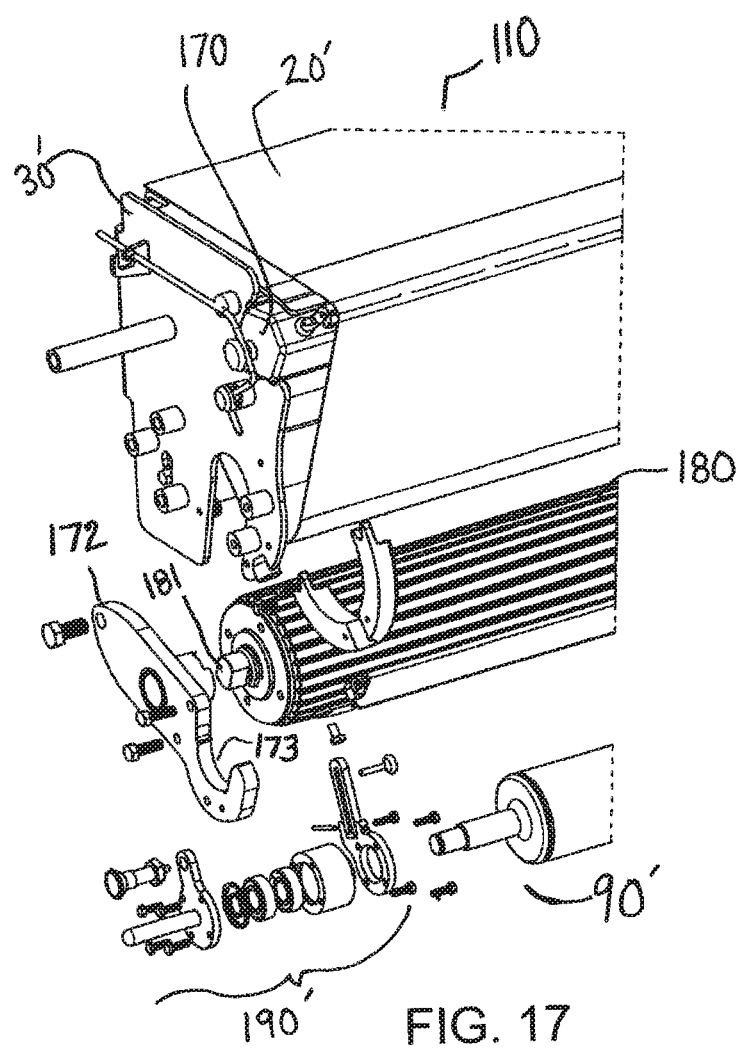
FIG. 17 is an exploded close-up view of a side portion of an infeed portion of a conveyor belt system according to another embodiment of the invention.
Figure 18:
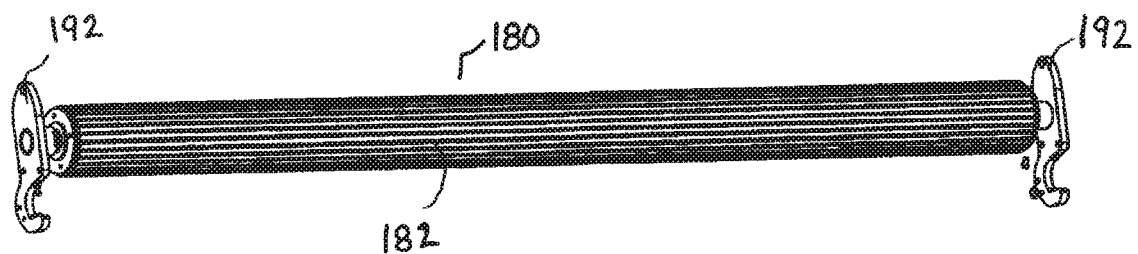
FIG. 18 shows the internally-braked guide roller and limiter connecting plates in the embodiment of FIG. 17.

FIG. 16 shows another embodiment of a noseroller assembly 170 suitable for insertion into an infeed or outfeed portion of a conveyor frame to guide a conveyor belt between a carryway and a returnway. The illustrative noseroller assembly 170 has a support beam 171 having a hexagonal cross-section, end protrusions 176, 177, support arms 173, noseroller segments 175 and an axle 174 having a bent end 186. The noseroller assembly 170 can be easily inserted into and removed from an associated frame. In another embodiment, the support beam 170 comprises a sheet that curves at the end of the carryway, rather than a beam.

FIGS. 17-20 show alternate embodiment of a guide roller and position limiter connector plate for an infeed portion 110 of a conveyor, including the noseroller assembly 170 of FIG. 16. In the embodiment of FIGS. 17-20, the guide roller 180 includes an internal braking mechanism and the position limiter connecting plate 172 is configured to connect the internally-braked guide roller 180 to a frame side plate 30' and also connect the roller limiter 90 to the frame side plate 30'. The roller limiter 90 and associated mounting components 190 are the same as or substantially similar to those shown in FIGS. 1-5 and 13-15. The illustrative guide roller 180 includes end mounting axles 181 and a toothed outer shell 182 that can rotate around the end mounting axles with resistance. The toothed outer shell 182 engages the drive side of the conveyor belt 20 to provide a limited amount of tension to ensure that the conveyor belt 20' conforms to the noserollers 175.

Figure 19:
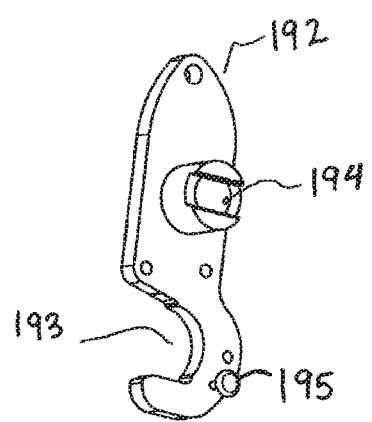
FIG. 19 is an isometric view of the limiter connecting plate of FIG. 17.

The position limiter connecting plate 192, an embodiment of which is shown in FIG. 19, is mounted to the outside of the frame plate 30' and includes an inner recess 194 for holding a corresponding end mounting axle 181 such that the end mounting axle 181 remains fixed while allowing rotation of the shell portion 182. The illustrative inner recess 194 has flat sides for fixedly engaging the end mounting axle 181. The position limiter connector 192 further includes an open seat 193 for seating the handle 190 on the end of the roller limiter and an inner protrusion 195 for engaging the slot 198 in the slotted extension 197 of the roller limiter to prevent removal of the roller limiter from the frame while allowing disengagement from the conveyor belt. The open seat 193 faces a direction that is perpendicular to the axis of the roller limiter 90 and guide roller 180, allowing the roller limiter 90 to pivot out of the seat in a non-operational mode.

Figure 20:
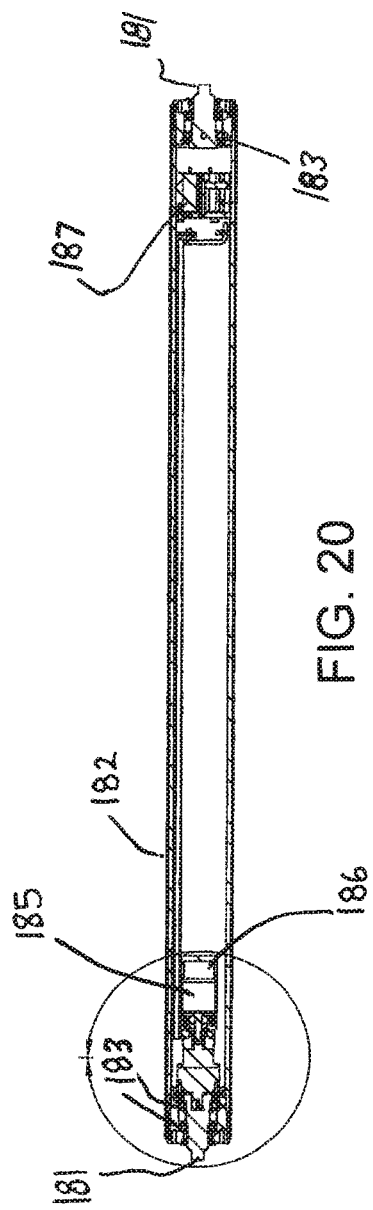
FIG. 20 is a cross-sectional view of the internally-braked guide roller of FIG. 17.

FIG. 20 is a cross-sectional view through the guide roller. The toothed outer shell 182 rotates about the static end mounting axles 181. Bearings 183 control the position of the drum 182 relative to the axles 181. As the conveyor belt engages and turns the shell 182, localized tension is created, which, combined with the speed of the conveyor belt, generates power. A planetary gearbox 185 is connected to the shell 182 and increases the relatively low drum speed so that the output of the planetary gearbox 185 is a relatively high-speed shaft. The high-speed shaft, which rotates at a rate that is equal to the shell revolutions per minute times the ratio of the gearbox, is connected to a permanent magnet electric motor 186, which operates as a generator and creates a voltage when the shell 182 rotates. The voltage generated by the motor depends on the speed at which the motor is driven. The illustrative internally-braked guide roller 180 further includes resistors 187 between the coils of the motor to convert the motor power to heat, which is then dissipated through the shell 182 into the conveyor belt. In this manner, the guide roller 180 can insert dynamic tension in a localized area between guide roller 180 and an infeed, without increasing tension between the guide roller and the drive for the conveyor belt.

Figure 21:
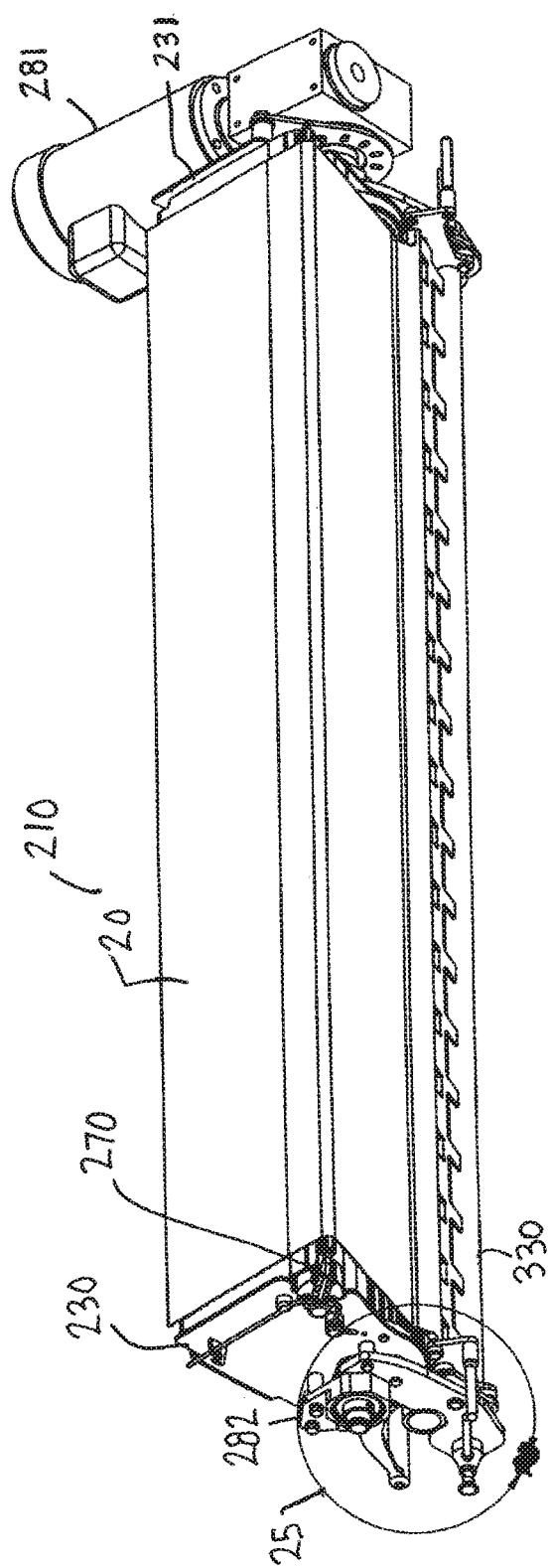
FIG. 21 is an isometric view of an exemplary outfeed portion of a conveyor belt system.
Figure 22:
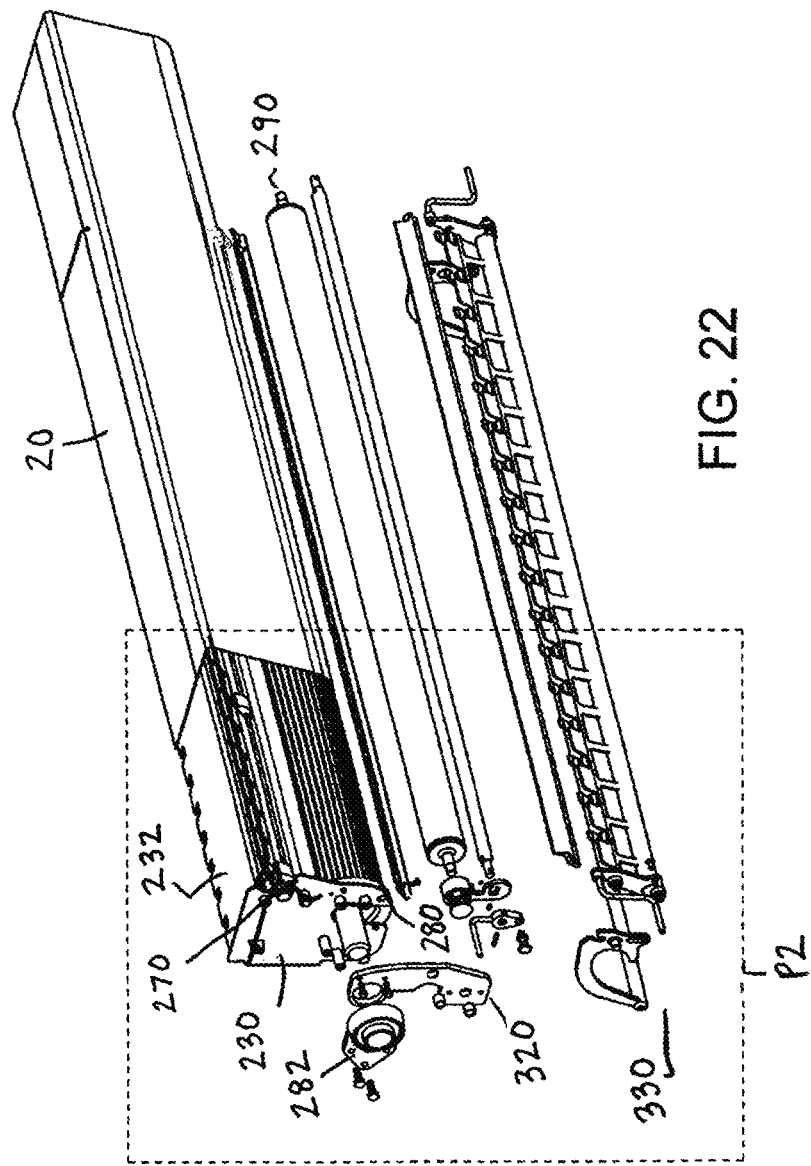
FIG. 22 is an exploded view of the outfeed portion of FIG. 21.
Figure 23:
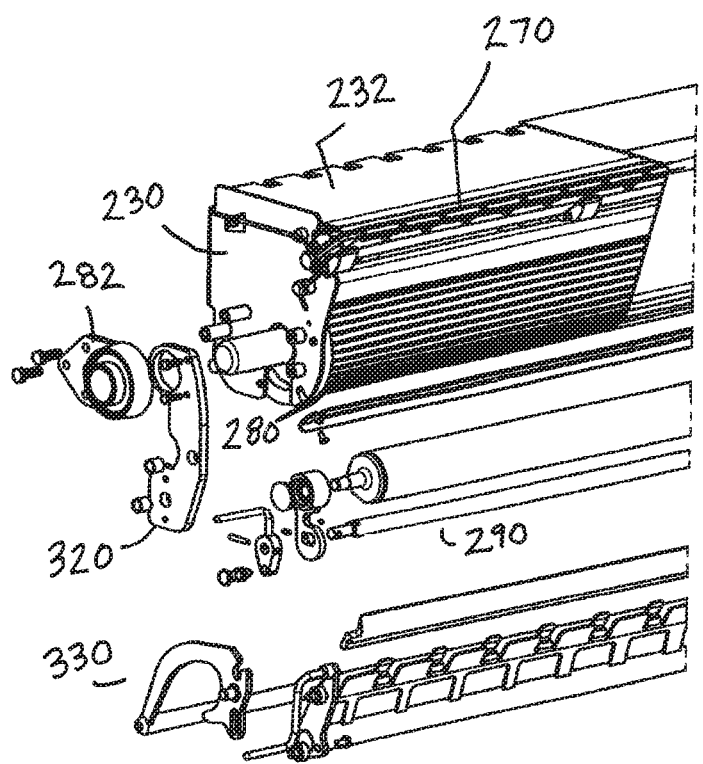
FIG. 23 is a detailed view of the components of FIG. 22.

FIG. 21 is an isometric view of an outfeed end 210 of a conveyor including components that can be disengaged from an operating position while remaining connected to the frame of the conveyor according to an embodiment of the invention. FIG. 22 is an exploded view of the outfeed end of FIG. 21 and FIG. 23 is a detailed view of a portion P2 of FIG. 22. The outfeed end 210 includes a frame comprising side plates 230, 231 and a carryway support 232. A noseroller assembly 270, embodiments of which are describes above, guides a conveyor belt 20 from the end of the carryway into the returnway. The noseroller assembly 270 can be a cartridge unit that can be inserted into and removed from the frame. A drive 280, which may be a drum motor, sprocket or other suitable drive for driving the conveyor belt 20, is driven by a motor 281 and engages drive elements on the drive side of the conveyor belt 20 to move the conveyor belt through the circuit. A drive mount 282, shown as an external bearing connected to a side plate 230 or 231 using fasteners or another suitable means, mounts the drive 280 to the frame. The outfeed assembly also includes a position limiter assembly 290 for ensuring proper engagement between the drive 280 and the conveyor belt 20. A pair of position limiter connecting plates 320 connect each end of the position limiter 290 to the frame to properly locate the position limiter relative to the drive. A scraper assembly 330 is also mounted to the frame. During operation, the position limiter and scraper assembly are in an operating position, with the scraper assembly 330 position to remove debris from the conveyor belt 20 and the position limiter 290 positioned to ensure engagement of the drive 280 with the conveyor belt 20. Both assemblies can be moved out of operating position to allow cleaning or maintenance without entirely removing the assemblies from the frame.

Figure 24:
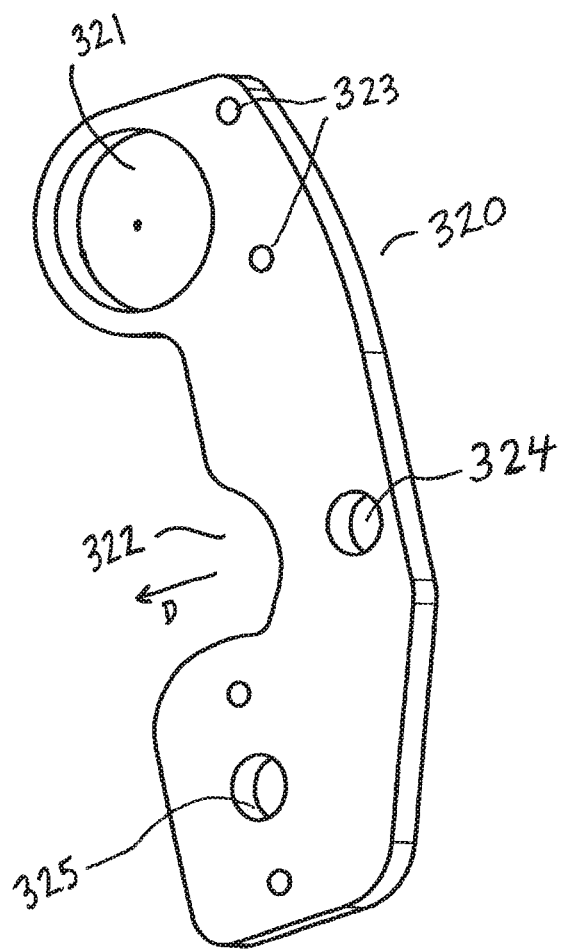
FIG. 24 is an isometric view of the limiter connecting plate of the outfeed portion of FIG. 21.
Figure 25:
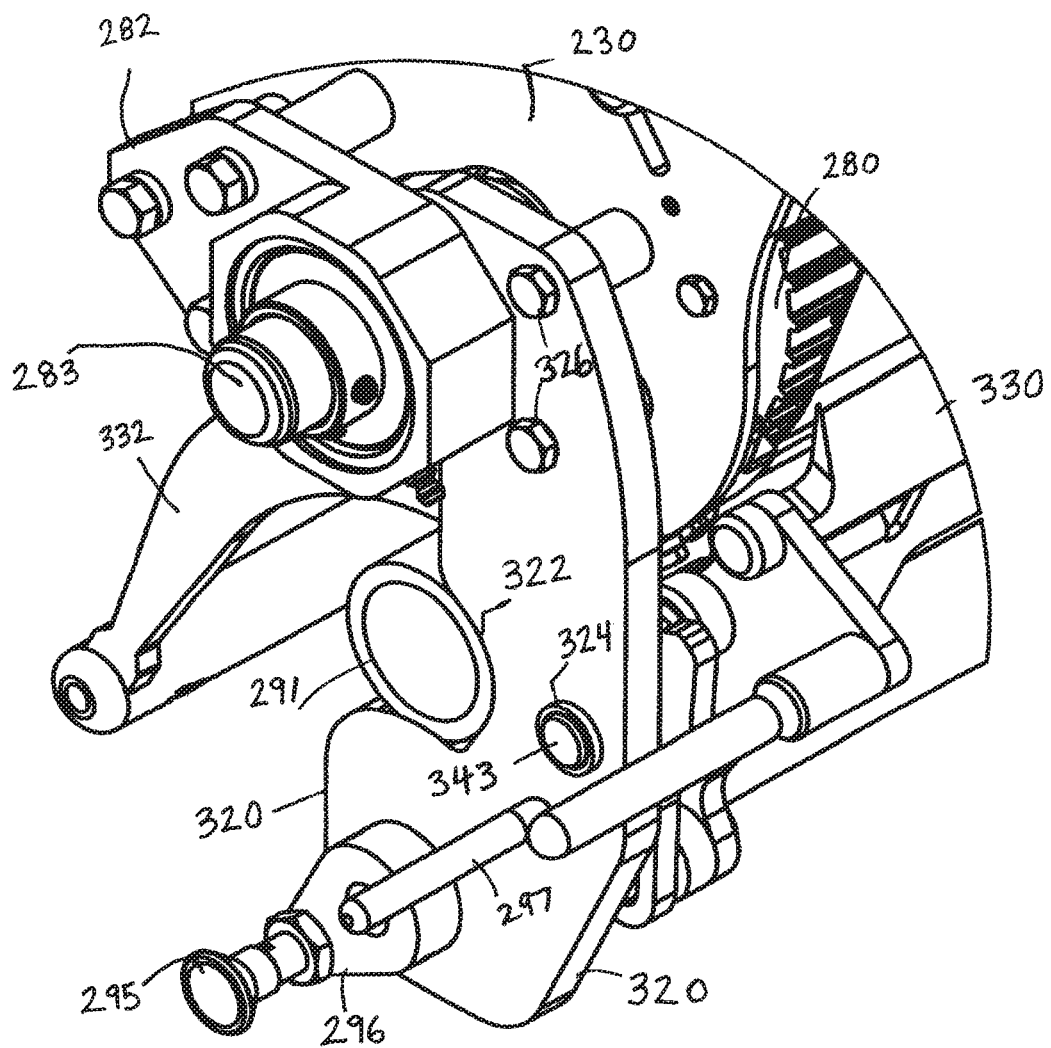
FIG. 25 is a detailed view of a region 25 of FIG. 21.

FIG. 24 shows an embodiment of a position limiter connecting plate 320 for positioning a position limiter relative to a drive. FIG. 25 is a detailed view of the limiter connecting plate region in the assembled outfeed. The limiter connecting plate includes an upper opening 321 for receiving the drive shaft 283 of the drive 280. As shown in FIG. 25, the drive mount 282 is placed outside of the limiter connecting plate 320 when assembled, sandwiching the limiter connecting plate 320 between the drive mount 282 and the associate side plate 230. The position limiter connecting plate includes a seat, comprising an open seat, shown as recess 322, in the middle of the rear edge for seating a first connecting portion of the position limiter assembly, shown as a cylindrical end 291. The open seat 322 is open in a direction D that is perpendicular to the axes of the position limiter roller 90 and drive 280 connected to the connecting plate, to allow the position limiter roller 90 to pivot out of an engaged, operational position. Fastener openings 323 receive fasteners 326 to fasten each limiter connecting plate 320 to an associated frame plate 230, 231. A middle opening 324 receives a protrusion 343 on the scraper assembly to connect the scraper assembly to the limiter connecting plate 320. A lower opening 325 is used to pivotally connect with a second connecting portion of the position limiter 290. The position limiter includes a connecting protrusion 298 that extends through the lower opening 325. A handle 295 extends from a drop-shaped base 296 of the position limiter connected to the connecting protrusion 298. The position limiter assembly 290 can pivot about this lower opening 325 to move the position limiter 290 out of an engaged position.

Figure 26:
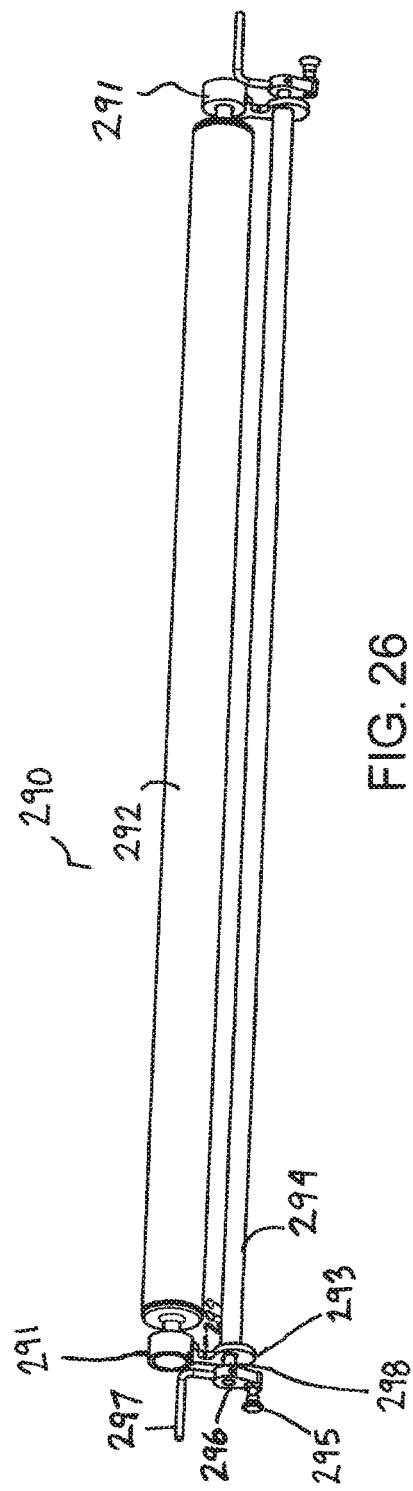
FIG. 26 shows the position limiter assembly of the outfeed portion of FIG. 21.

FIG. 26 shows the position limiter assembly 290 in the outfeed of FIG. 21. The position limiter assembly 290 comprises a roller limiter 292 extending from a first side to a second side and having connecting portions, comprising cylindrical ends 291 extending from axial nubs on the side faces of the roller limiter. The cylindrical ends 291 include a protrusion forming a mounting plate 293 comprising a neck and an enlarged end for connecting to a lower mounting bar 294 that extends below the roller limiter 292. The neck forms a recess 299. The mounting plate 293 connects to the limiter handle via connecting protrusions 298. The limiter handle, which extends outside the limiter connecting plate 320 when the outfeed is assembled, includes a drop-shaped base 296, a handle 297 and a protrusion 295. The connecting protrusion 298 connecting the base 296 to the mounting plate 293 is received in the opening 325 of the limiter connecting plate 320 when the outfeed is assembled, and the position limiter assembly 290 can pivot about this connecting protrusion 298 to move the position limiter out of an engaged position.

Figure 27:
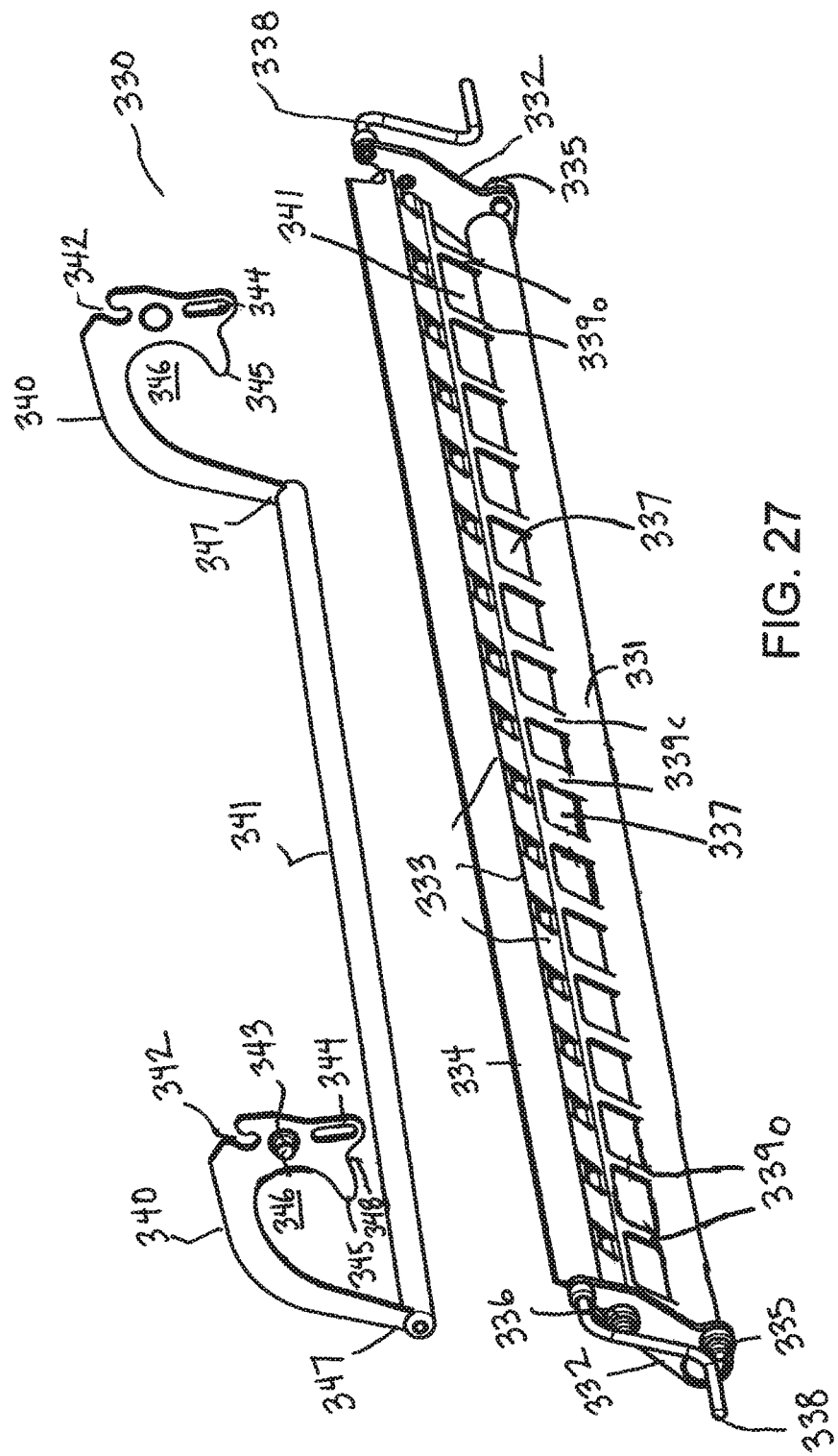
FIG. 27 shows the scraper assembly of the outfeed portion of FIG. 21.

FIG. 27 shows an embodiment of the scraper assembly 330. The scraper assembly 330 comprises a base support 331 extending between mounting plates 332. The base support 331 may be rotationally stiff. The base support 331 forms a plurality of blade receptacles 333, shown as cooperating fingers, for receiving a scraper blade 334. The blade receptacles 333 are flexible and form a channel thinner than the thickness of the scraper blade at its base to compressively hold the scraper blade 334. When assembled, as shown in FIG. 21, the scraper blade 334 is biased into contact with the outer surface of the conveyor belt 20 between the noseroller assembly 270 and the position limiter roller 290 to remove debris from the outer surface. Each mounting plate includes outer protrusions 335, 336 for mounting the base support 331 and scraper blade 334. The scraper assembly also includes handles 338 extending from the top of each mounting plate 332. Mounting arms 340 mounted on each side of a counter weight 341 are used to mount and bias the scraper assembly in position.

Each mounting arm 340 includes an upper recess 342 in an upper edge, a central outer protrusion 343 a lower slot 344. The mounting arm 340 further includes a tapering tail 345 that protrudes inwards from the slot 344. A nook 348 is formed in the bottom edge between the tail 345 and the slot 344. The body of the mounting arm curves to form a curved recess 346. The arm then connects at an end 347 to the counter weight 341.

The scraper assembly base 331 includes a number of cutouts 337 below the receptacles 333. The cutouts are separated by columns 339. The columns 339 may be flexible and able to deflect to allow the scraper tip 334 to remain in constant contact with an outer surface of a conveyor belt. The columns 339c in the central portion of the scraper base 331 may be thicker than the columns 339o in the outer portion of the scraper base 331 to ensure sufficient strength across the scraper assembly, while allowing more deflection towards the outside.

Figure 28:
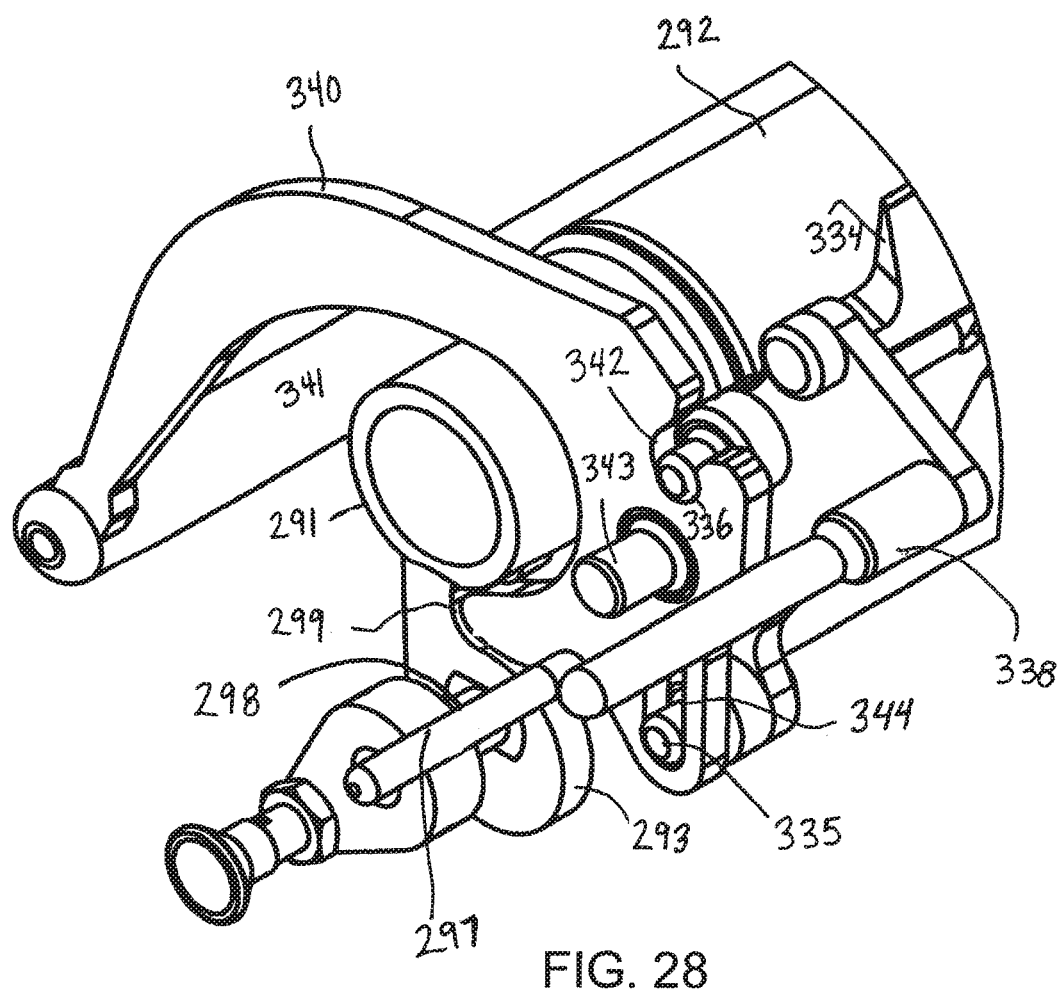
FIG. 28 is a detailed view of the scraper assembly and position limiter assembly of the outfeed portion of FIG. 21 when in engaged positions.

FIG. 28 shows the mounting of the scraper assembly 330 to the position limiter assembly 290 with the limiter connecting plate 320 removed in order to show the connection between the scraper assembly 330 and position limiter assembly 290. When assembled, the cylindrical end 291 of the position limiter is located in the recess 346 of the scraper assembly and seated in the recess 322 of the connecting plate 320. The tail 345 of the scraper assembly is inserted in the recess 299 of the position limiter assembly and the mounting plate 293 of the position limiter assembly is below the tail 345. The upper protrusion 336 of the mounting plate 332 is received in the recess 342 of the mounting arm 340. The lower protrusion 335 of the mounting plate 332 is inserted in the slot 344 of the mounting arm 340. The central outer protrusion 343 passes through the limiter connecting plate middle opening 324.

Figure 29:
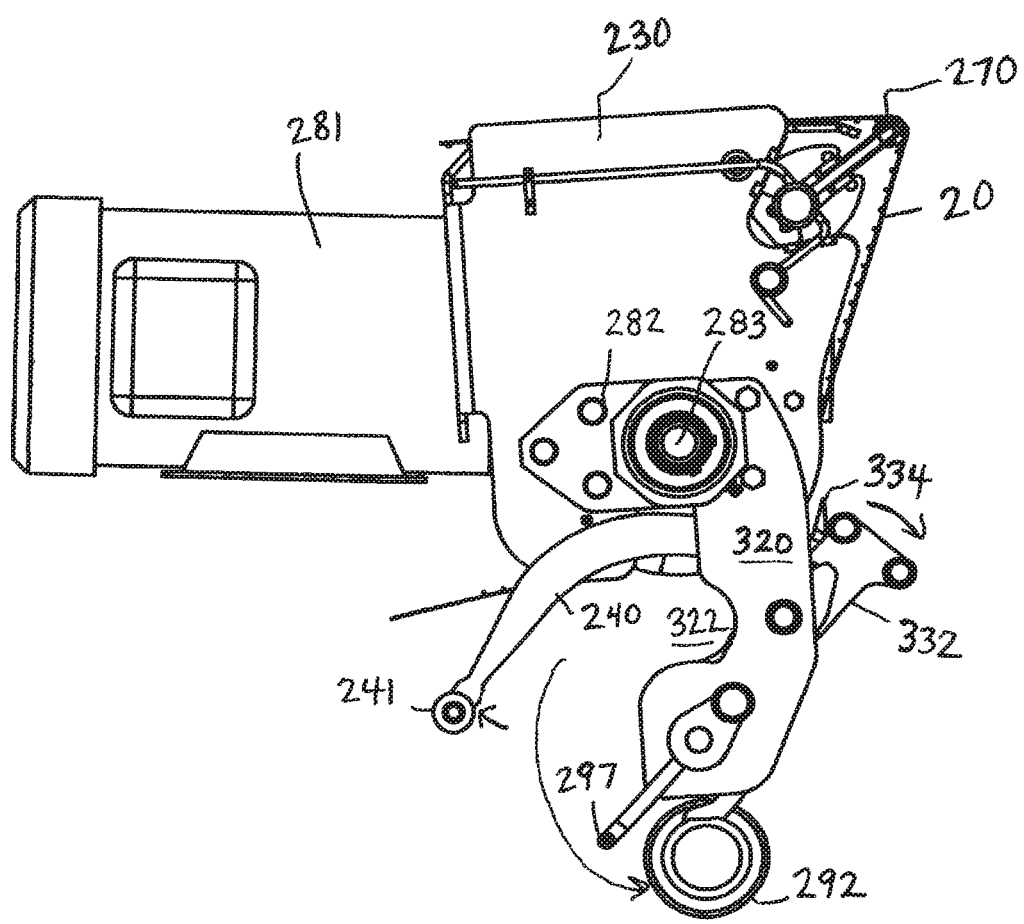
FIG. 29 is a side view of the outfeed portion of FIG. 21 during disengagement of the position limiter assembly and the scraper assembly.
Figure 30:
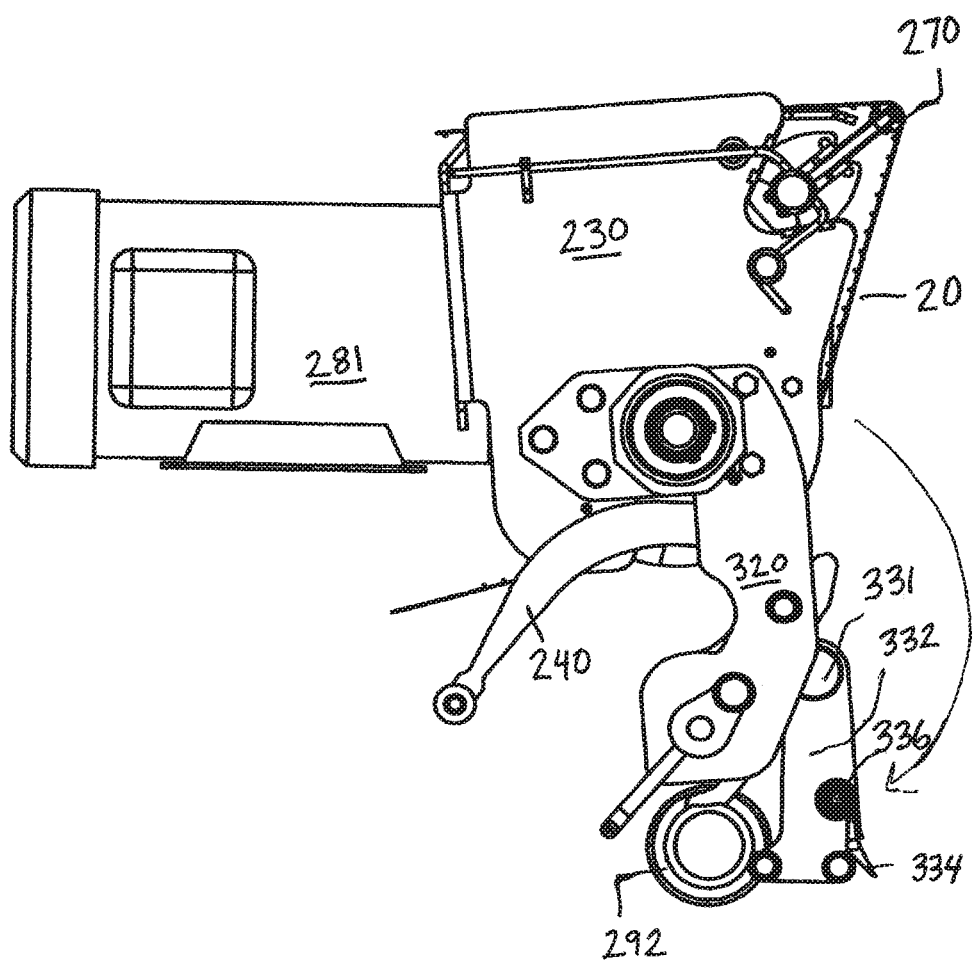
FIG. 30 is a side view of the outfeed portion of FIG. 21 with the position limiter assembly and scraper assembly in fully disengaged positions.

When access, such as for cleaning, is required, a user can easily disengage the components from position without requiring extra tools, while allowing the components to stay connected to the frame. For example, a user can push the position limiter handle 297 towards the rear to push the connected cylindrical end 291 out of the open seat 322 of the connecting plate 320 and the recess 346 of the scraper mounting arms 340. This action rotates the mounting plate 293, causing it to push against the tail 345 of the arm 340 until the mounting plate 293 rests in nook 348. The movement of the handle releases the position limiter roller 292, pivoting it down below the scraper, away from the conveyor belt, as shown in FIG. 29. The camming action between the tail 345 and mounting plate 293 pitches the arm 340 forward, pushing the scraper blade 334 out of contact with the conveyor belt. Then, a user can pull the scraper assembly out of position by pulling up on the handle 338, unseating the protrusion 336 from the upper recess 342, causing the protrusion 335 to slide up in the slot 344. The user can pivot the scraper assembly away from the conveyor belt. The scraper assembly pivots about protrusion 335, resting so that the blade 334 hangs below the frame in front of the hanging position limiter roller, as shown in FIG. 30. Thus, when the position limiter is in an engaged position, it exerts a force against the scraper to push the scraper against the belt. When the position limiter moves to its disengaged position, the force against the scraper is removed, allowing the scraper to disengage when the position limiter is disengaged. In this manner, a user can access components of the outfeed assembly without requiring full disassembly.

Figure 31:
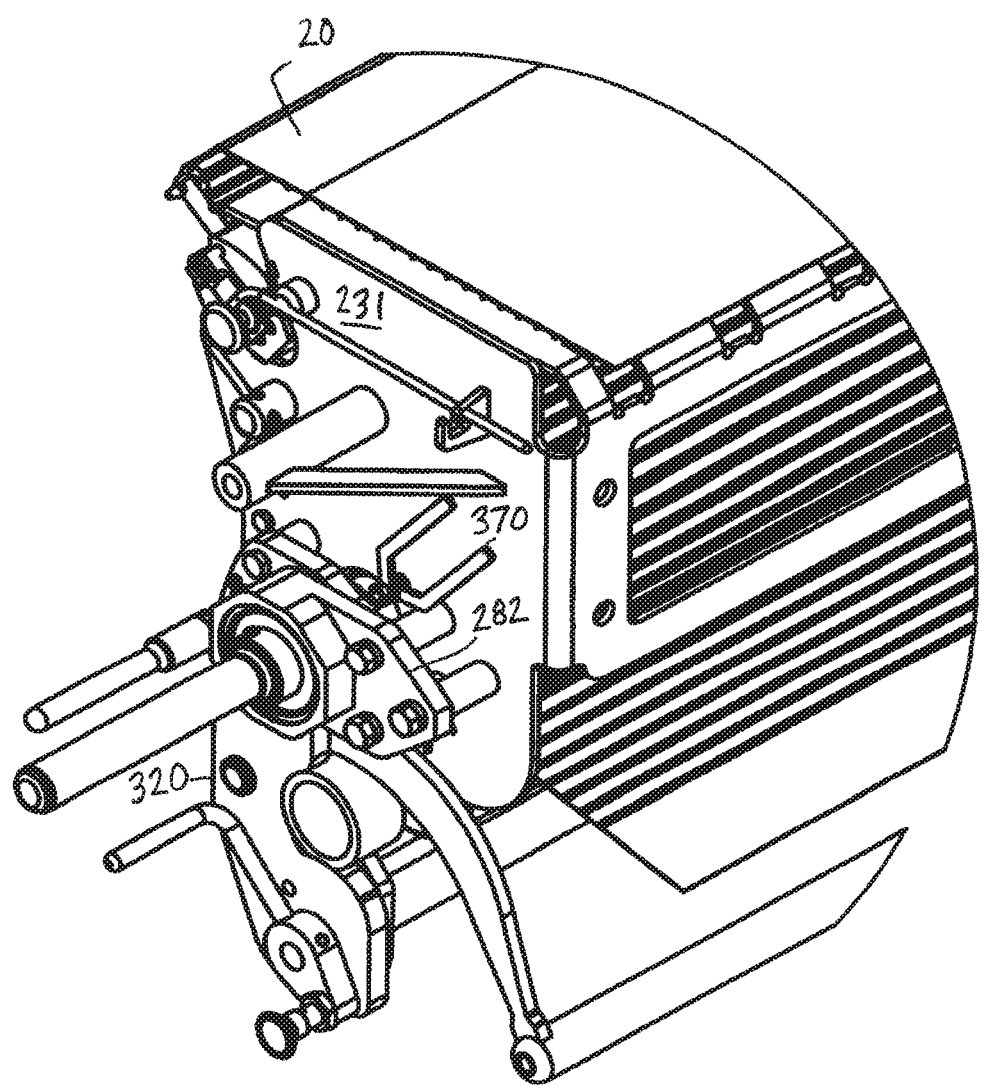
FIG. 31 is an isometric view of the outfeed portion of FIG. 21 during assembly.
Figure 32:
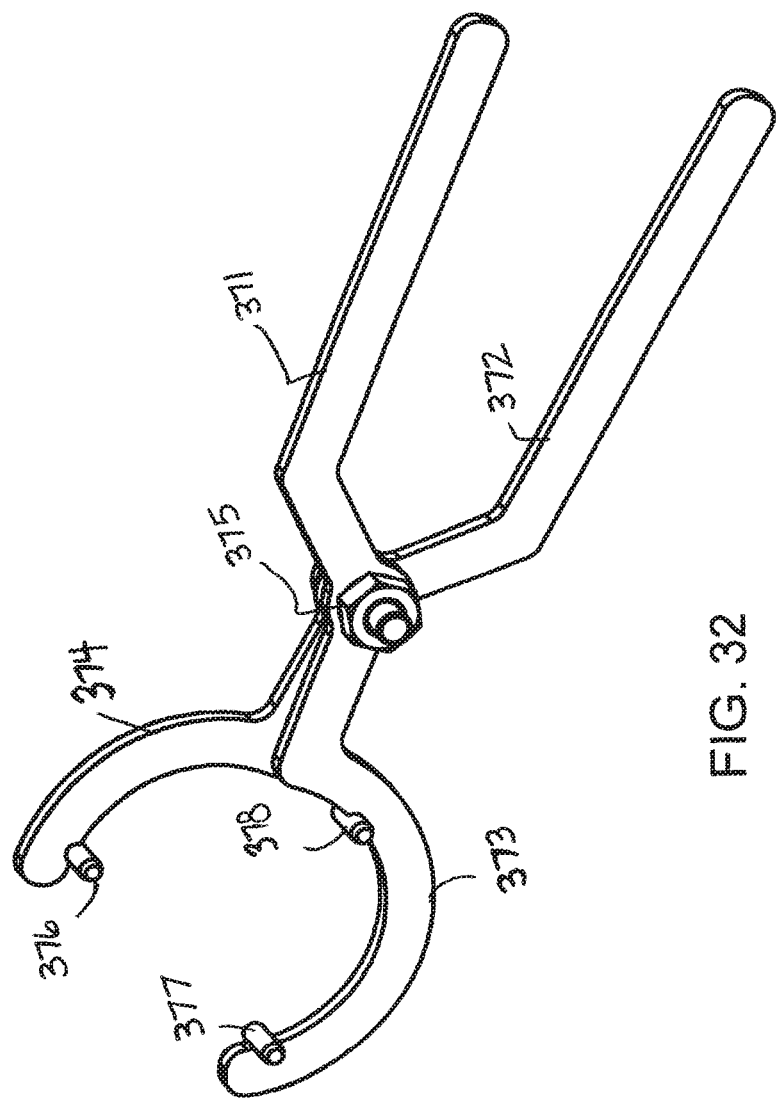
FIG. 32 is an isometric view of the tool used in the assembly shown in FIG. 31.
Figure 33:
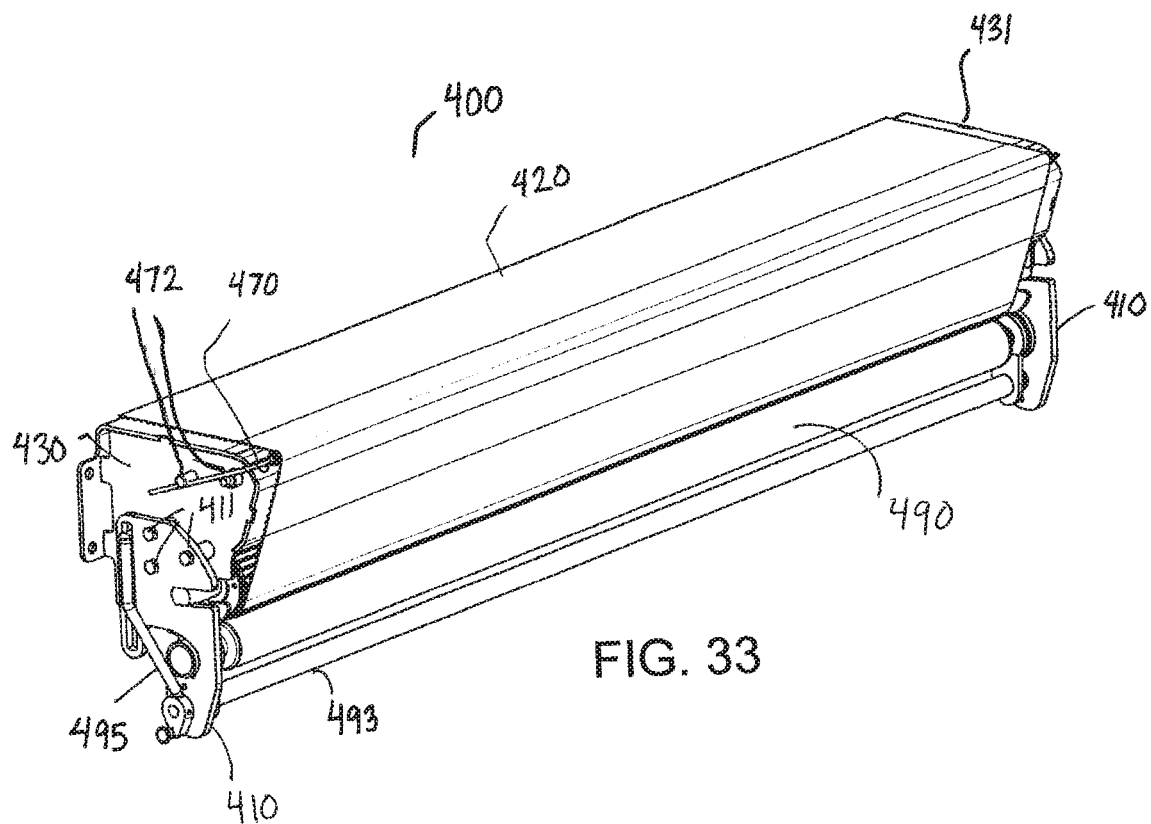
FIG. 33 is an isometric view of another embodiment of an infeed portion of a conveyor.
Figure 34:
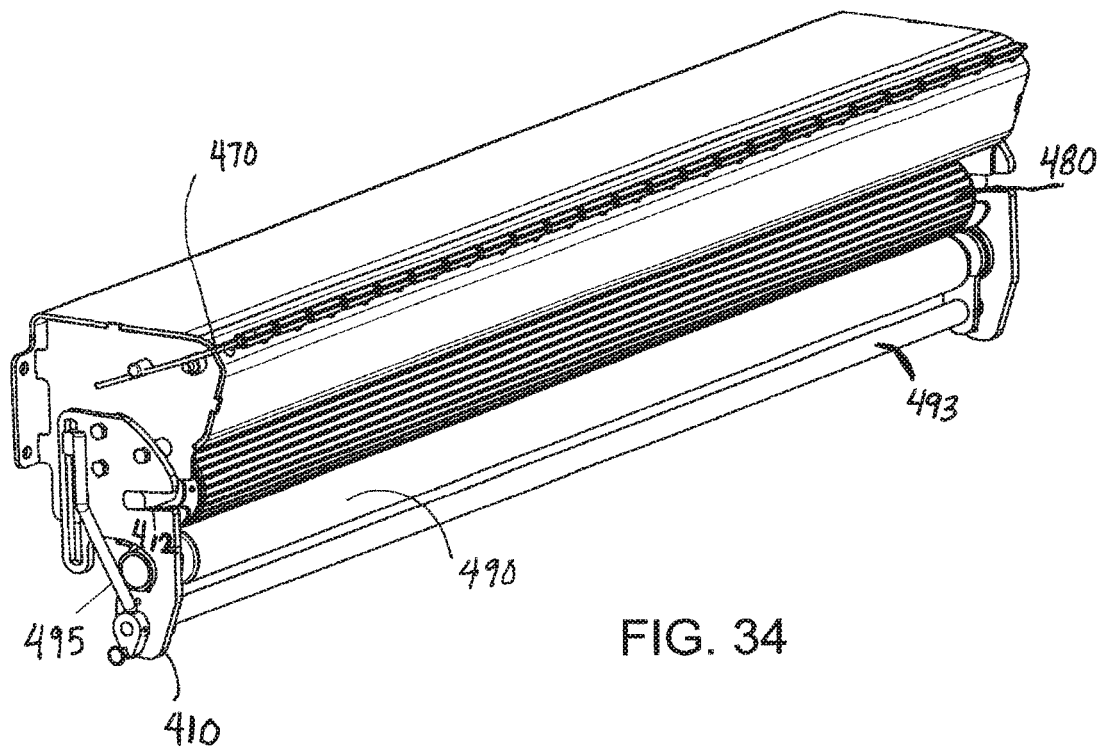
FIG. 34 is an isometric view of the infeed portion of FIG. 33 with the conveyor belt removed.

Referring to FIGS. 31 and 32, a tool 370 may be used during assembly of the outfeed assembly to ensure proper location of the drive shaft 283 within the frame. The tool 370 clamps around the drive shaft 283 at the outside of the plate 230 or 231 between the limiter connecting plate 320 and the frame plate 230 or 231 to center the drive shaft 283 before tightening the drive mount 282. The tool 370 comprises legs 371, 372 pivotally connected together. Rounded arms 373, 374 extend from the pivot point 375. The rounded arms 373, 374 close together when the legs 371, 372 clamp together and open when the legs 371, 372 open. The rounded arms 373, 374 include protrusions 376, 377, 378 about the periphery for centering the drive shaft 283 in an opening of the frame plate before tightening fasteners in the drive mount.

FIGS. 33-39 show another embodiment of an infeed portion 400 of a conveyor including components that can be disengaged from an operating position while remaining connected to the frame of the conveyor according to an embodiment of the invention. The infeed portion mounts belt guiding components between side plates 430, 431. At the end of the carryway, a noseroller assembly 470 mounted to and between the side plates 430, 431 using tabs 472, guides the conveyor belt 420 from below into the carryway, as described above. A drag roller 480 imparts localized tension to ensure that the conveyor belt 420 conforms to the noseroller assembly 470 and is held in seats 433 (see FIG. 37) in the side plates 430, 431. The side plates 430, 431 also include receptacles 436 for mounting a position limiter connecting plate, as described below, and a vertical slot 432 for seating a mounting axle of a belt guiding roller 460 (shown in FIGS. 38 and 39). The noseroller assembly 470 includes arms extending from a base structure extending between the side plates, rather than a separate insert, an axle extending through openings in the arms and rotatably mounting a plurality of noseroller segments in spaces between the arms and a protrusion or other feature on side plate 430 for receiving and locking a bent portion of the axle to the assembly.

Figure 38:
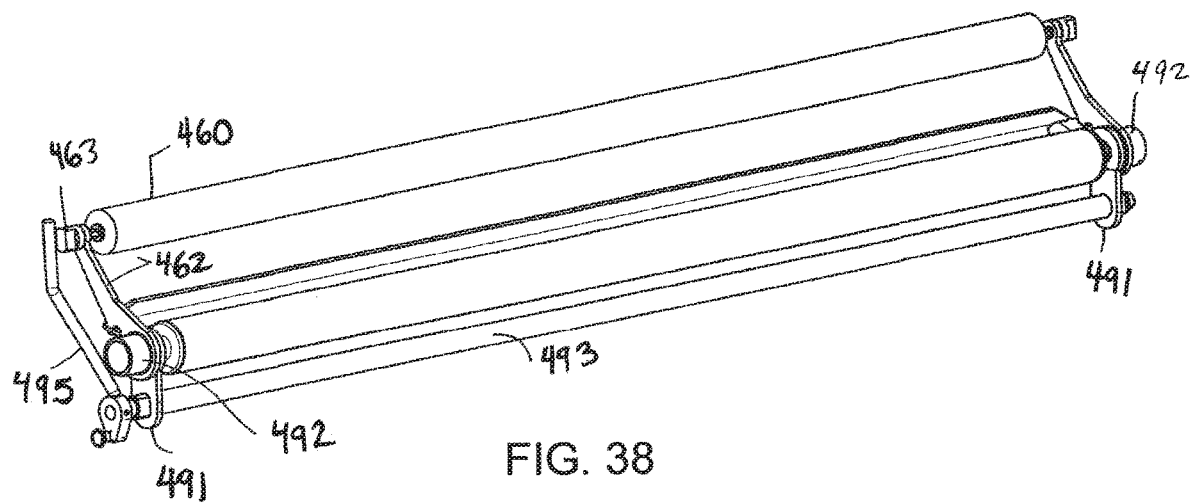
FIG. 38 shows the position limiter assembly of the infeed portion of FIG. 33.
Figure 39:
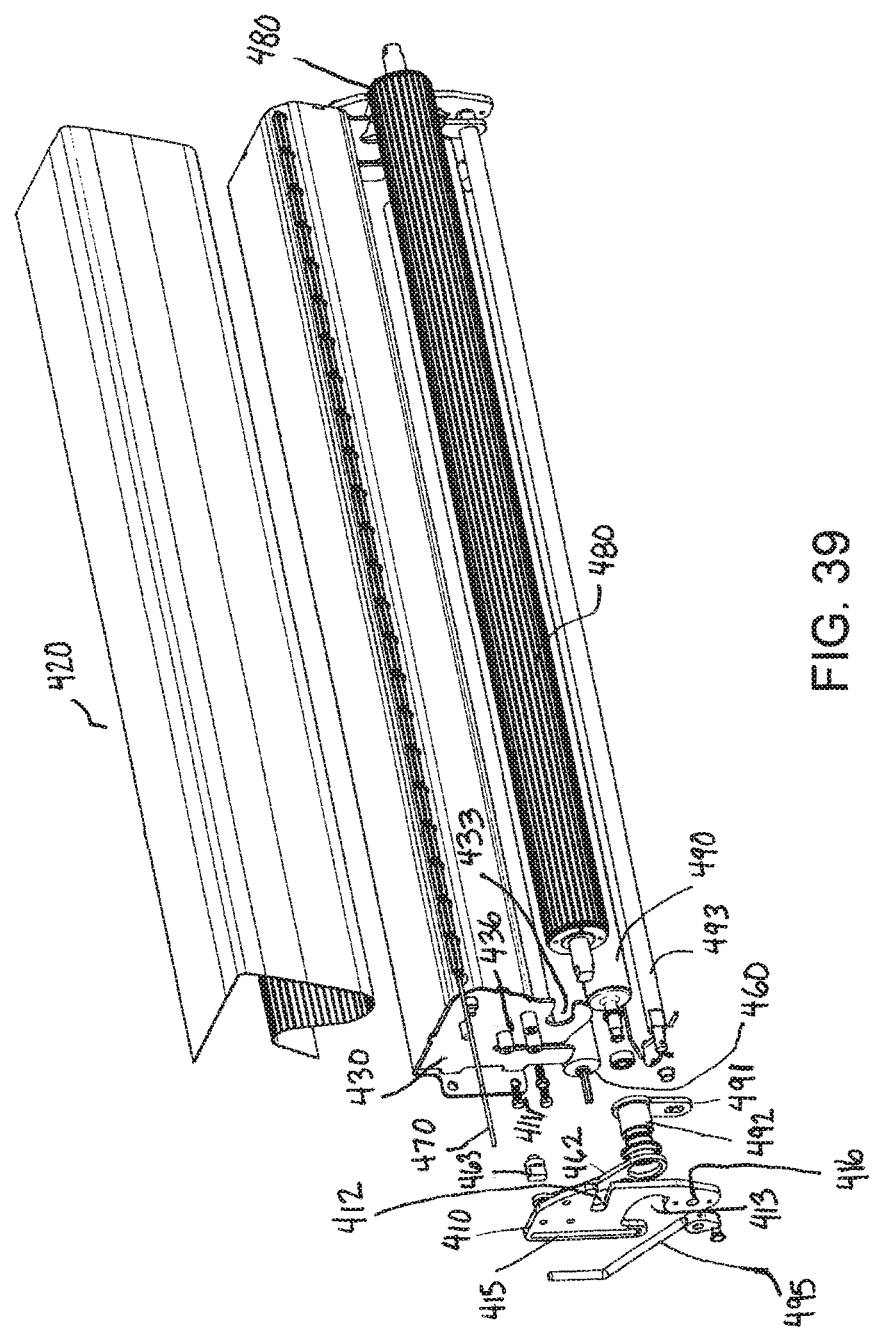
FIG. 39 is an exploded view of the infeed portion of FIG. 33.

The infeed assembly 400 further includes a roller limiter 490 positioned relative to the drag roller 480 to ensure proper engagement between the drag roller 480 and drive side of the conveyor belt 420. As shown in FIG. 38, the roller limiter 490 comprises a roller extending between mounting plates 491 and includes cylindrical mounting ends 492 at each end. A mounting bar 493 extends between the mounting plates 491 below the main roller portion and connects to the handle 495 outside one of the mounting plates 491. At least one end of the mounting bar 493 extends through the associated mounting plate 491 and connects to a handle 495, which can be rotated about the mounting bar 493 to move the roller limiter 490 into and out of position.

The roller limiter 490 is connected to a belt wrapping roller 460 using connecting arms 462 that extend from the ends of the belt wrapping roller 460 to the mounting plates 491 and are connected to the mounting plates 491 by the ends of the roller limiter 490, as shown in FIG. 38.

The infeed assembly further includes position limiter connecting plates 410 that are used to position the roller limiter 490 and belt wrapping roller 460 and connect those components to the frame. The connecting plates 410 are mounted to the side plates 430, 431 using fasteners 411 inserted in receptacles 436 of the side plates 430. Each connecting plate 410 includes a horizontal front slot 412 for receiving the end of the drag roller 480 protruding through the mounting plate 430, an open seat 413 facing the interior of the conveyor frame for seating the end 492 of the roller limiter 490, a rear vertical slot 415 for seating the mounting axle 463 of the belt wrapping roller 460. The open seat 413 is open to allow pivoting of the roller limiter 490 out of engagement with the conveyor belt. The handle 495 of the roller limiter is attached to a mounting bar 493 extending through an opening 416 in the connecting plate 410 so that when assembled, the handle 495 is rotatably mounted on the outside of the connecting plate 410.

Figure 35:
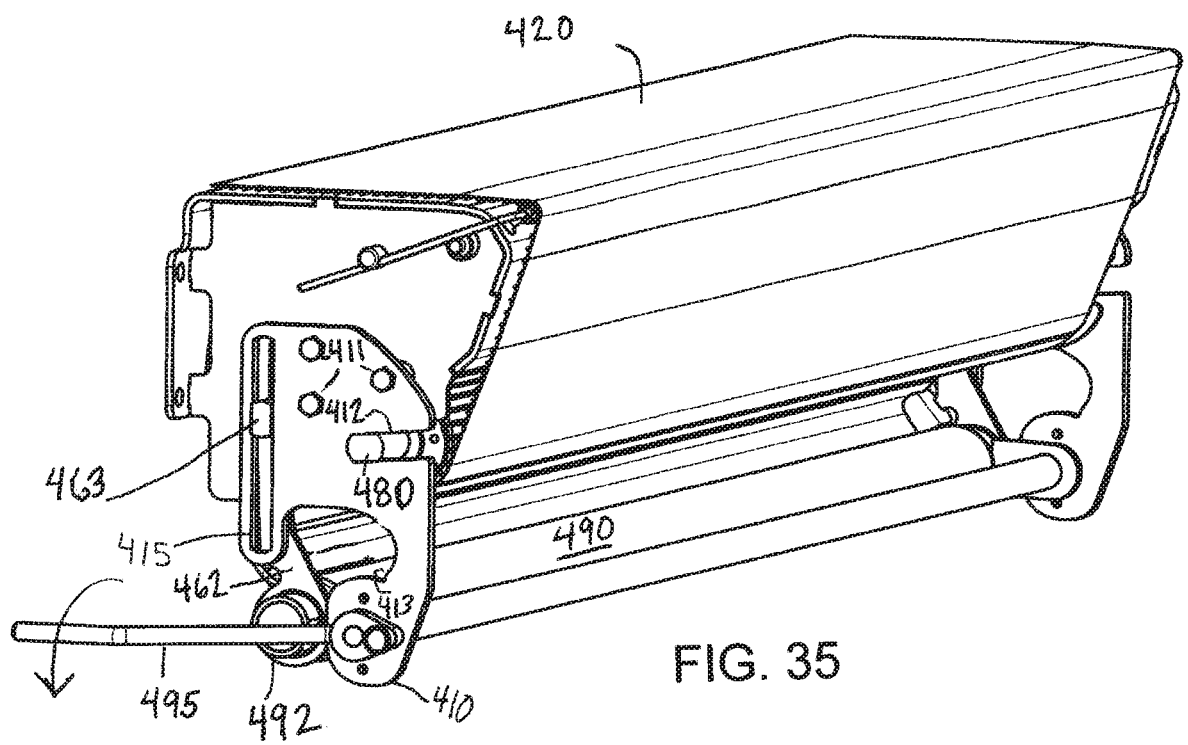
FIG. 35 is an isometric view of the embodiment of FIG. 33 during a step of disengaging the position limiter by rotating the assembly.
Figure 36:
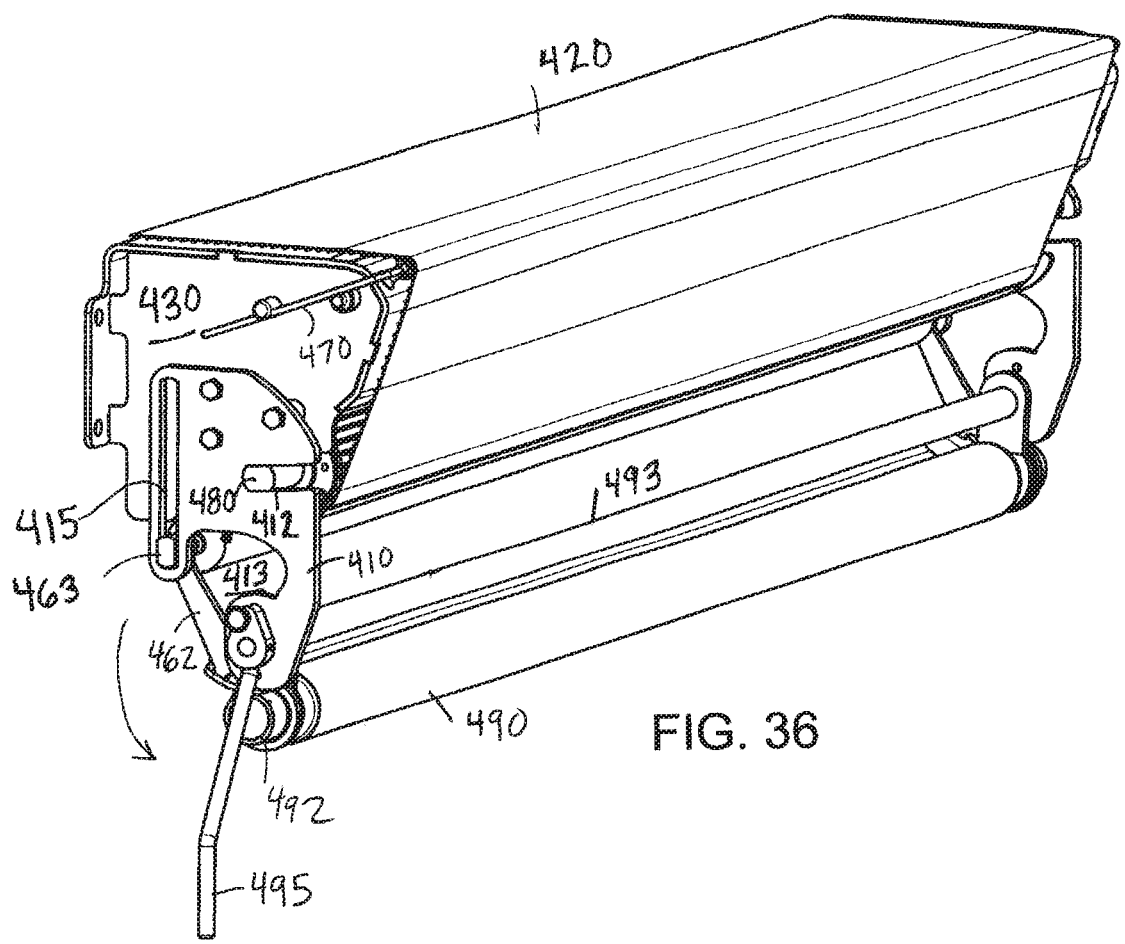
FIG. 36 shows the infeed portion of FIG. 33 in a disengaged mode.
Figure 37:
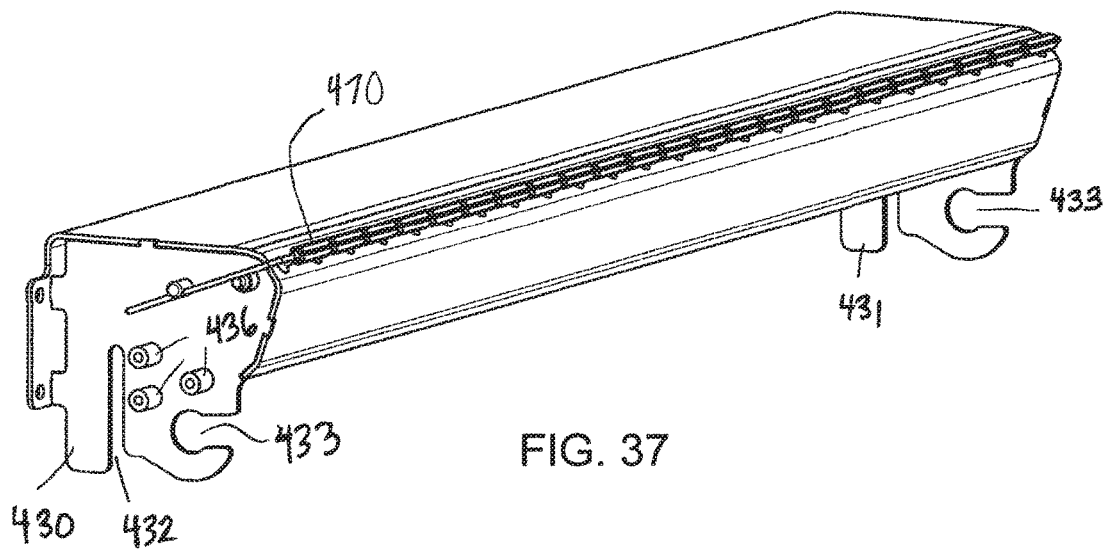
FIG. 37 is an isometric view of the side plates and support structure of the infeed portion of FIG. 33.

The handle 495 can be used to easily unseat the belt guiding roller 460 and roller limiter 490. As shown in FIGS. 35 and 36, rotation of the handle 495 about the axis of rotation defined by the mounting bar 493 pulls the connected roller limiter 490 out of the seat 413, rotating it about the mounting bar 493. This action also pulls the connected belt guiding roller 460 down, with the mounting axle 463 sliding down in the slot 415 of the connecting plate 410. The slot 415 contains the belt guiding roller 460. The components can easily be moved back into position by rotating the handle 495 in the opposite direction from the arrow. The geometry of the connecting plate allows precise alignment and positioning of the roller limiter relative to the drag roller 480. Preferable, the open side of the open seat 413 is about perpendicular to a reference line extending from the central axis of the drag roller 480 and the central axis of the roller limiter 490 in the mounted position and also about perpendicular to the axis of the roller limiter 490. The geometry of the open seat 413 controls the translation of the roller limiter 490 to the engaged, operating position (FIGS. 33 and 34) such that as it moves from the disengaged, non-operating position (FIGS. 35, 36) to the operating position, the distance between the axis of the roller limiter and the axis of the drag roller 480 doses to the smallest clearance allowable for the conveyor belt 420 and then opens back up to a desired final optimal distance for allowing the conveyor belt to pass therebetween. The invention is not limited to moving an auxiliary components, such as the belt-wrapping roller 460, when moving the roller limiter 490 into and out of engagement.

The components shown in FIGS. 33-39 can be permanently mounted to conveyor, but certain components may be disengaged and moved into a non-operating position for cleaning, repair or other needs without removing the components from the conveyor. The components may be easily moved back into a precise operating position without requiring external tools to excessive adjustments.

FIGS. 40-48 show another embodiment of an infeed assembly 600 similar to the embodiment shown in FIGS. 33-39, but having a different handle 695, a curved slot 615 seating a mounting axle 663 of a belt wrapping roller 660 and other small variations.

The infeed assembly 600 includes opposing side plates 630, 631 and a noseroller assembly 670 mounted to the side plates 630, 631 for guiding a conveyor belt 620 at an infeed of a conveyor. The noseroller assembly 670 can comprise a support plate extending the first side plate to the second side plate at the end of the carryway, arms extending from the support plate, an axle having a curved end and supported by the arms, and one or more rotatable nosebars mounted on the axle for guiding the conveyor belt 620 onto the carryway of the conveyor. The removable belt-guiding assembly 670 is mounted to the frame using outward-facing protrusions 635 on the first side plate 630.

The assembly further includes a drag roller 680 mounted between the side plates 630, 631 for inducing limited drag in the conveyor belt 620 to allow the conveyor belt to conform to the noseroller assembly 670 at the infeed end of the conveyor. A roller limiter 690 is positioned relative to the drag roller 680 to ensure proper engagement between the drag roller 680 and the drive side of the conveyor belt 620. The axle ends of the drag roller 680 are seated in a seat in the side plates 630, 631. An illustrative seat 633, shown in FIG. 42, for example, is open to the front of the plate but the invention is not so limited. The side plates 630, 631 also include a top seat 632 for a take-up, belt wrapping roller 660. The top seat 632 is open towards the bottom. The side plates 630, 631 also include openings 636 or other features for mounting connecting plates 610 to the side plates.

Figure 43:
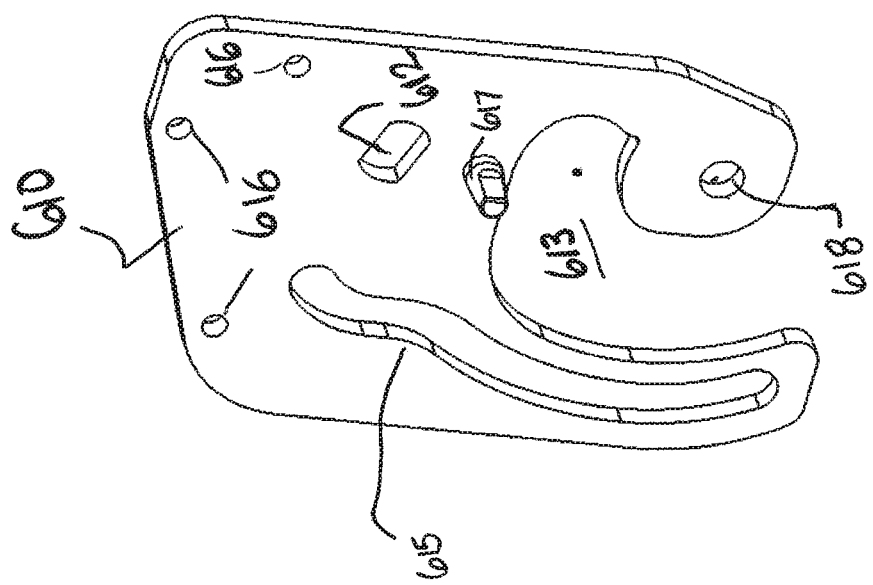
FIG. 43 is an isometric view of a limiter connecting plate of the infeed portion of FIG. 40.

The illustrative assembly 600 further includes a position limiter connecting plate 610 connected to each side plate 630, 631 for mounting and positioning the roller limiter 690, belt wrapping roller 660 and other accessories. As shown in FIG. 43, an illustrative connecting plate 610 includes upper openings 616 configured to align with the openings 636 in an associated side plate 630 or 631. Fasteners 611 are inserted through the aligned openings to mount the connecting plate 610 to a side plate 630 or 631, though any suitable means to mount the connecting plates 610 may be used. A slotted seat 612 receives the end of the drag roller 680 protruding through the side plate 630. The illustrative seat 612 is closed, but can be open as shown above. Each connecting plate 610 further includes an open seat 613 for the roller limiter 690. The seat 613 comprises a curved slot, open to the bottom edge of the connecting plate 610 and terminating in a rounded end that seats a mounting end 692 of a roller limiter 690 when the conveyor is in an operating mode. An opening 618 in the connecting plate below the rounded end is used to connect a handle 695 to a mounting bar 693 extending between two mounting plates 691 that connect the mounting bar 693 to the positioning roller 690. The open seat 613 is configured to allow pivoting of the cylindrical mounting end 692 out of the rounded end, through the curved slot and out of the connecting plate 610 about opening 618 to unseat the roller portion of the position limiter assembly. In one embodiment, the open seat 613 is sized and shaped such that as the roller limiter moves from the disengaged position to the engaged position the distance between the axis of the roller limiter and the axis of the guide roller 680 closes to a smallest allowable clearance to accommodate the belt, then opens back up to a desired final optimal distance.

Figure 44:
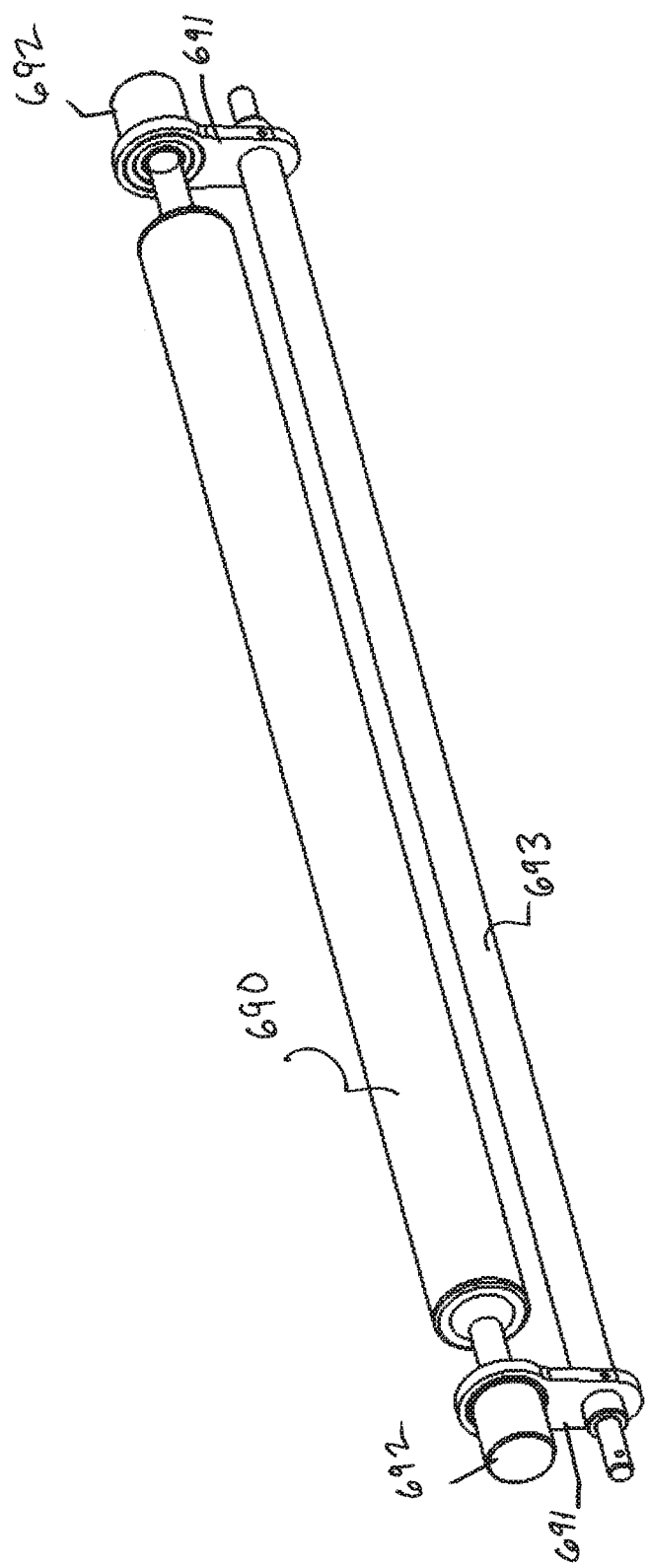
FIG. 44 shows the position limiter assembly of the infeed portion of FIG. 40.
Figure 45:
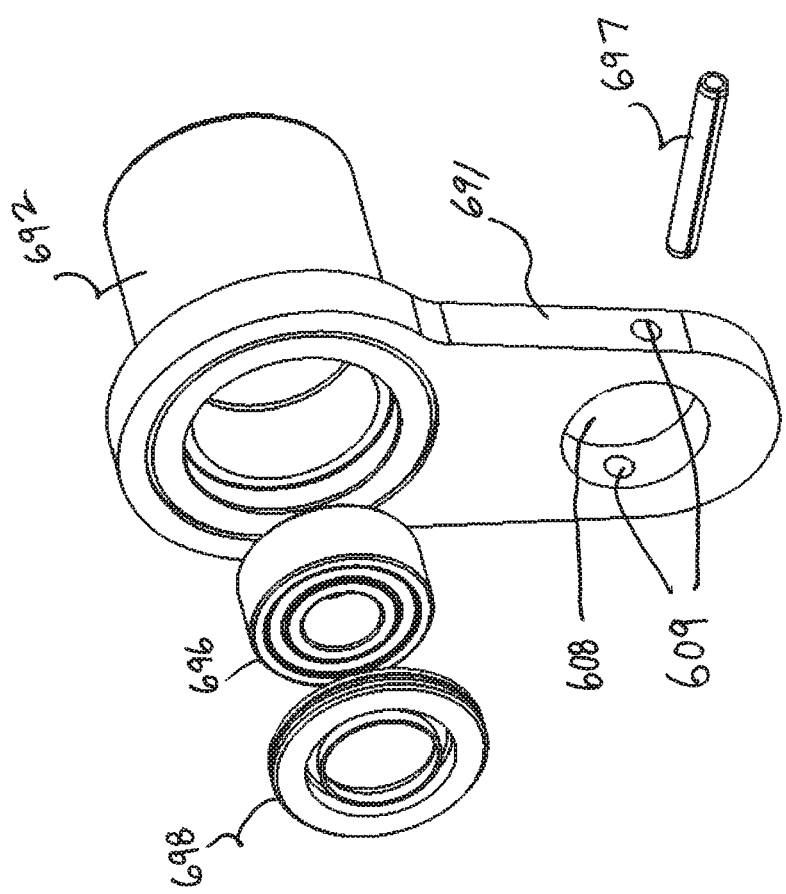
FIG. 45 is an exploded view of the connecting portion of the position limiter assembly of FIG. 44.

FIGS. 44 and 45 show an embodiment of a roller limiter assembly suitable for mounting to the end plates 630, 631 using connecting plates 610. The roller limiter assembly comprises a roller 690 extending between mounting plates 691 and including cylindrical mounting ends 492 at each end. During operation, the roller limiter 690 is positioned relative to the drag roller 680 to ensure proper engagement between the drag roller 680 and conveyor belt 620. A mounting bar 693 extends between the mounting plates 691 below the main roller portion. At least one end of the mounting bar 693 extends through the associated mounting plate 691, and through the opening 618 in the connecting plate 610 when assembled. The mounting bar end connects to the handle 695, which can be rotated about the mounting bar 693 to move the roller limiter 690 into and out of position.

The roller limiter 690 is connected to a belt wrapping roller 660 using connecting arms 662 that extend from the ends of the belt wrapping roller 660 to the mounting ends 492 of the roller limiter.

As shown in FIG. 45, a pin 697 can be used to secure the mounting bar 493 to the mounting plates 691. An end of the mounting bar 693 is housed in an axial opening 608 in the mounting plate 691. The pin 697 is inserted through a passageway formed by aligning a perpendicular opening 609 through the mounting plate 691 with an opening in the mounting bar 691 to secure the mounting bar to the mounting plate 691.

A bearing 6% and retaining cap 698 are assembled within the cylindrical mounting end 492 extending from an upper portion of the mounting plate 691 for retaining the axle end of the position roller 690.

A belt wrapping roller 660 is connected to the positioning roller 690 using connecting arms 662, so that dislodging of the positioning roller 690 from the seat 613 moves the belt wrapping roller as well. The connecting plate 610 further includes a curved slot 615 comprising an upper section and a lower section for seating the mounting axle 663 of the belt wrapping roller 660. When the positioning roller is moved out of operating position, the mounting axle 663 moves down through the track formed by the curved slot 615.

Figure 40:
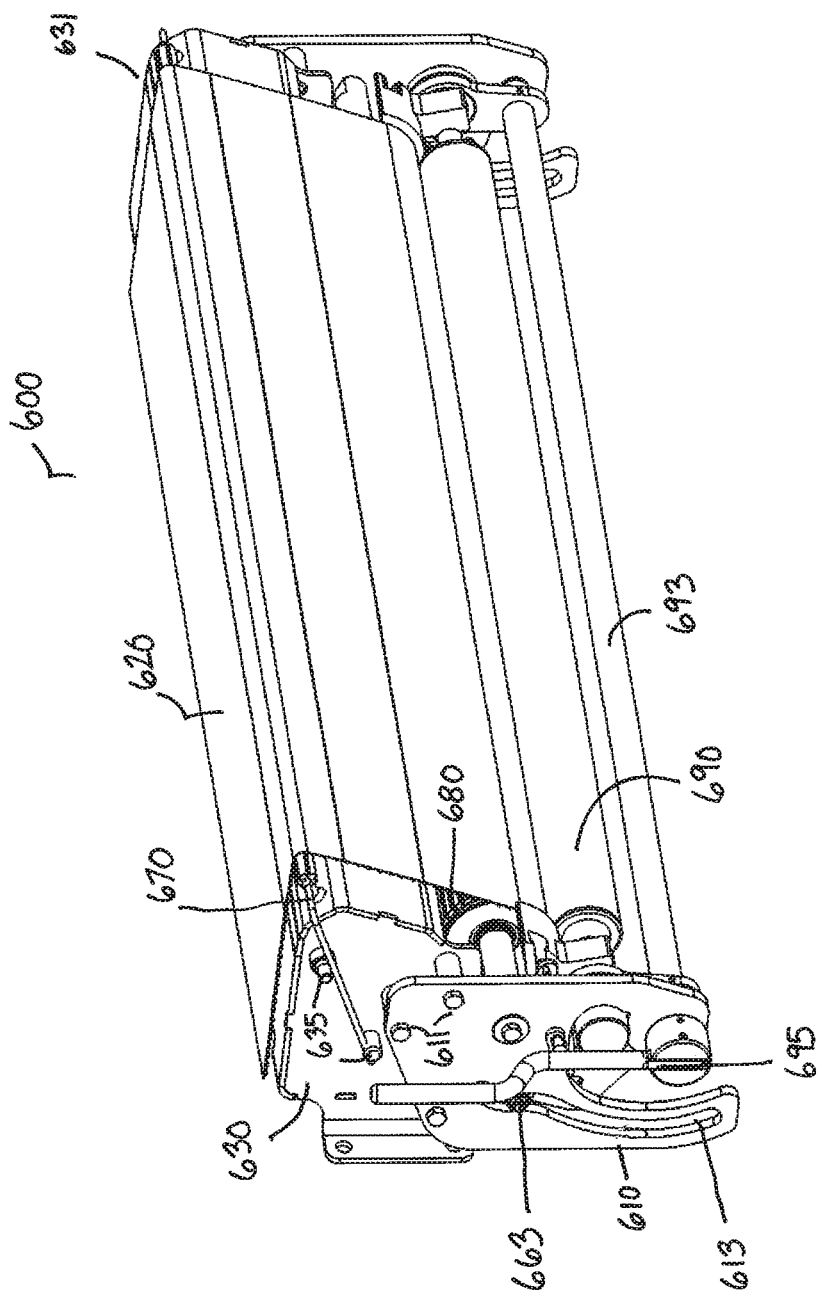
FIG. 40 is an isometric view of an infeed portion of a conveyor according to another embodiment.
Figure 41:
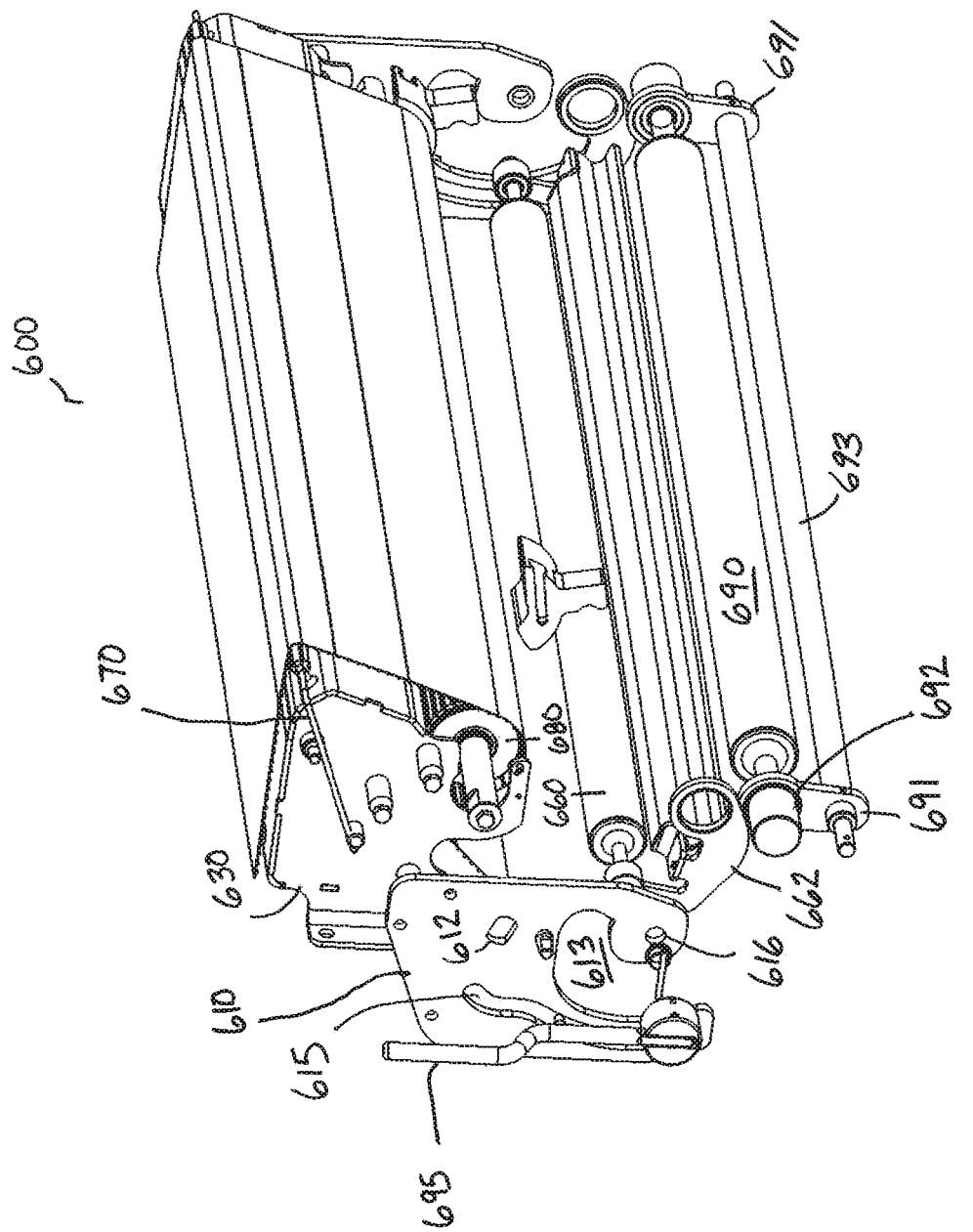
FIG. 41 is an exploded view of the infeed portion of FIG. 40.
Figure 42:
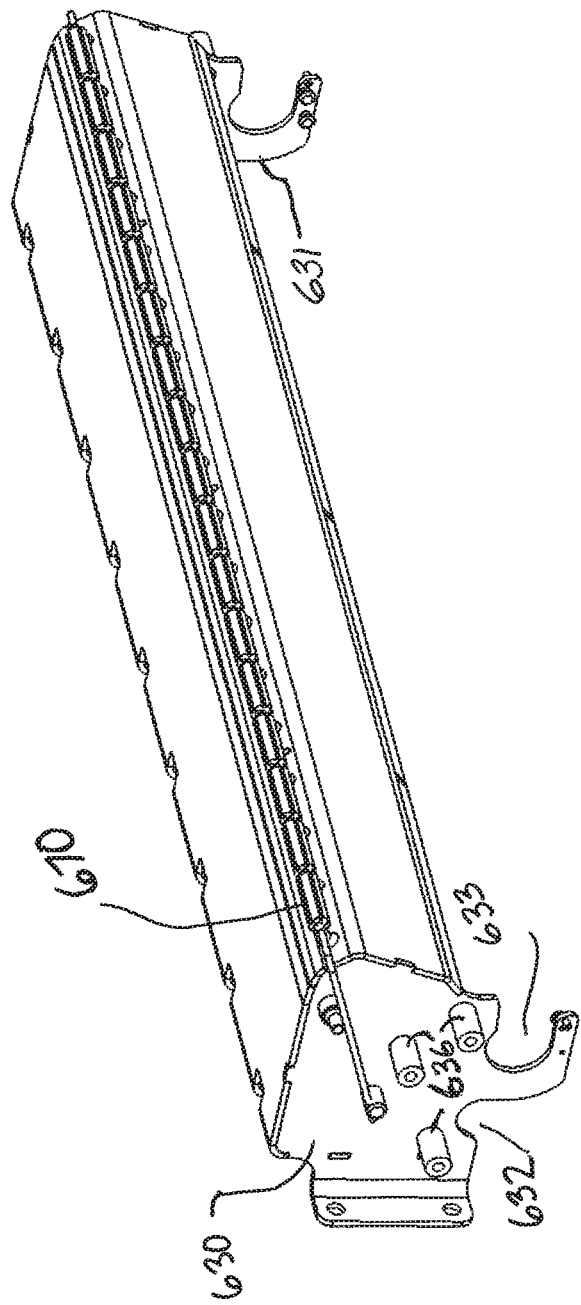
FIG. 42 is an isometric view of the side plates and support structure of the infeed portion of FIG. 40.
Figure 46:
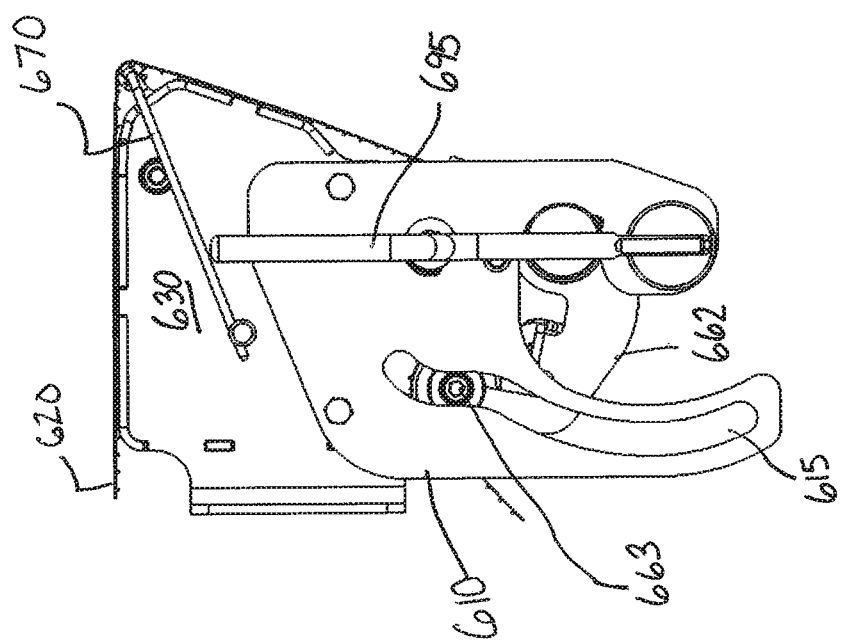
FIG. 46 is a side view of the infeed portion of FIG. 40 in an engaged mode.
Figure 47:
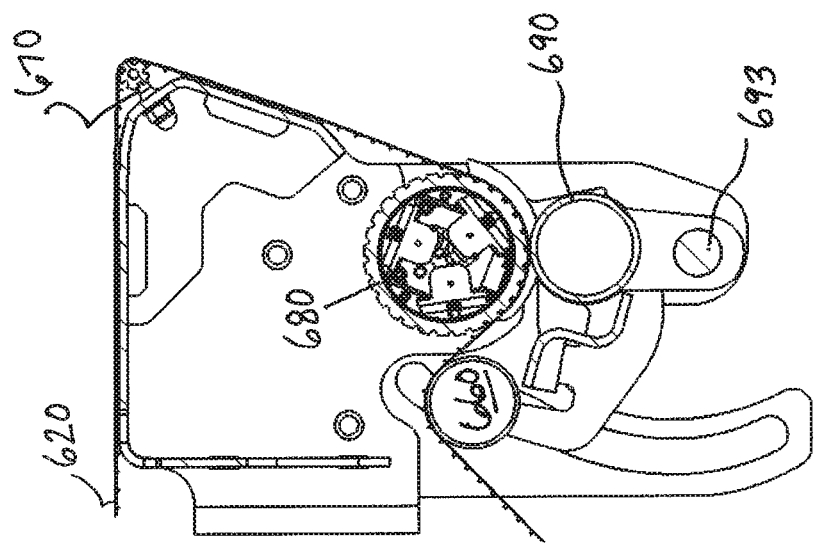
FIG. 47 is a cross-sectional side view of the infeed portion of FIG. 40 in the engaged mode.

In an operating mode, as shown in FIGS. 40, 46 and 47, the handle 695 is upright, the connected cylindrical mounting caps 692 are seated in the seat 613 and the axle end 663 of the belt wrapping roller 660 is in the top portion of the slot 615 of the connecting plate 610.

Figure 48:
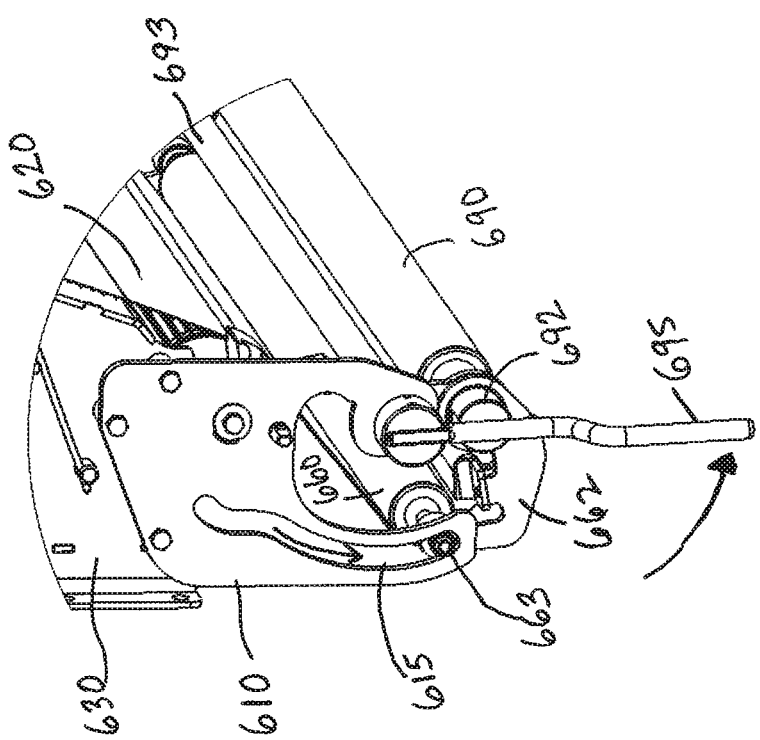
FIG. 48 is an isometric detailed view of the infeed portion of FIG. 40 in a disengaged mode.

The handle 695 is rotated about the connected mounting bar 693 to move the assembly a non-operating position, shown in FIG. 48. The connecting plate 610 includes a protrusion 617 (see FIG. 43) for seating the handle 495 in the operating position.

In the operating mode, shown in FIGS. 40, 46 and 47, a noseroller assembly 670 guides a conveyor belt 620 belt down to drag roller 680, which imparts localized tension to ensure that the conveyor belt 620 conforms to the small diameter noserollers. The positioning roller 690 ensures proper engagement of the conveyor belt 620 with the drag roller 680, and the take-up roller 660 is positioned to wrap the belt to facilitate proper engagement. The connecting plate 610 maintains the various component in optimal position and engagement during operation.

To move the assembly 600 into a non-operating mode, to allow access for cleaning or another purpose, a user rotates or otherwise moves the handle 695 to push the mounting caps 692 out of the seat 613. The roller limiter 690 pivots about the mounting bar 693 to a hanging position, allowing access to the belt 620. The roller limiter 690 pulls the connected belt wrapping roller 660 down, with the axle end 663 sliding through the slot 613. The relative positions of the rollers 660, 690 are maintained by connectors 662. The components stay connected to the frame of the conveyor by mounting bar 693 and the axle ends 663 of the belt wrapping roller while allowing access to the conveyor belt.

Figure 49:
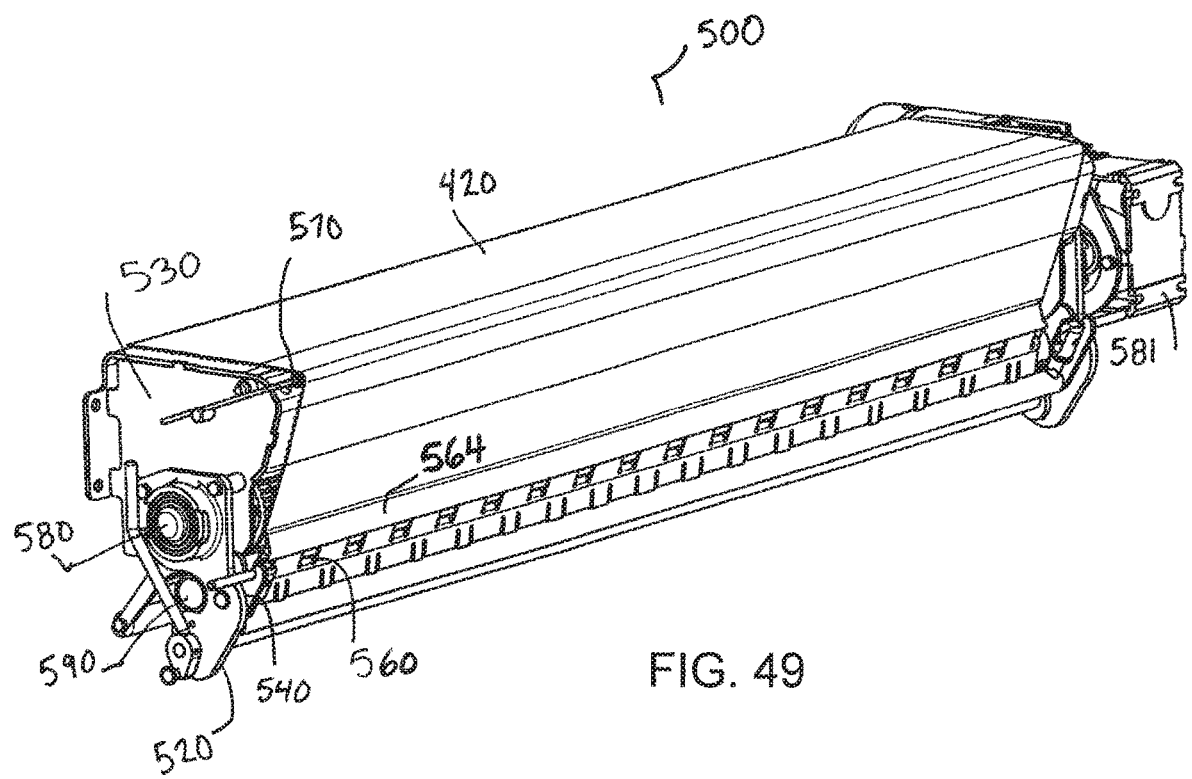
FIG. 49 is an isometric view of an outfeed portion of a conveyor in an engaged mode according to another embodiment of the invention.
Figure 50:
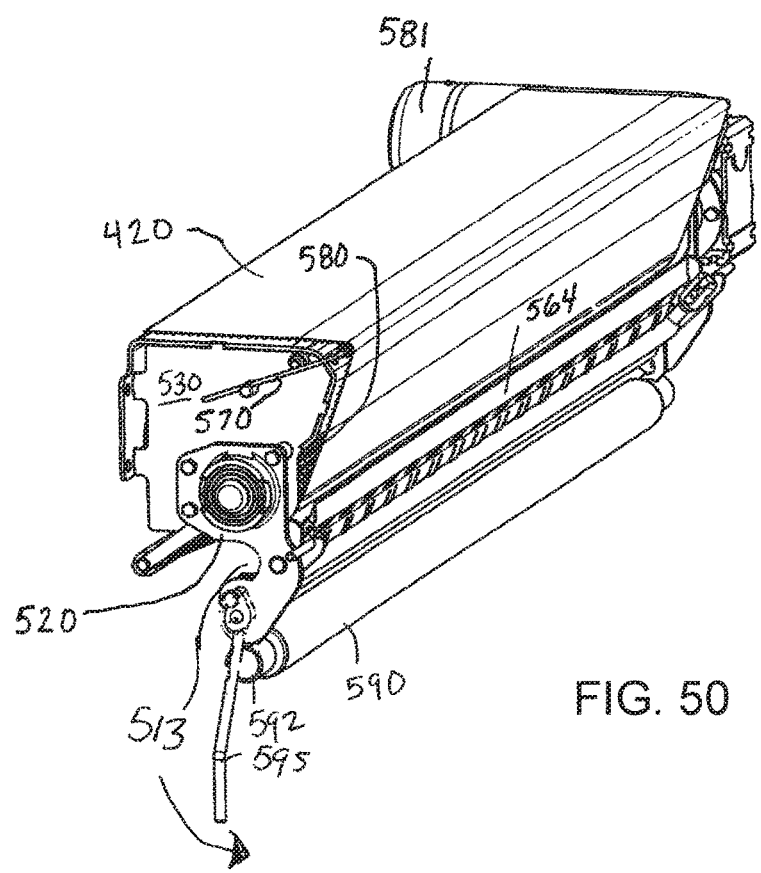
FIG. 50 shows the outfeed portion of FIG. 49 in a disengaged mode.
Figure 51:
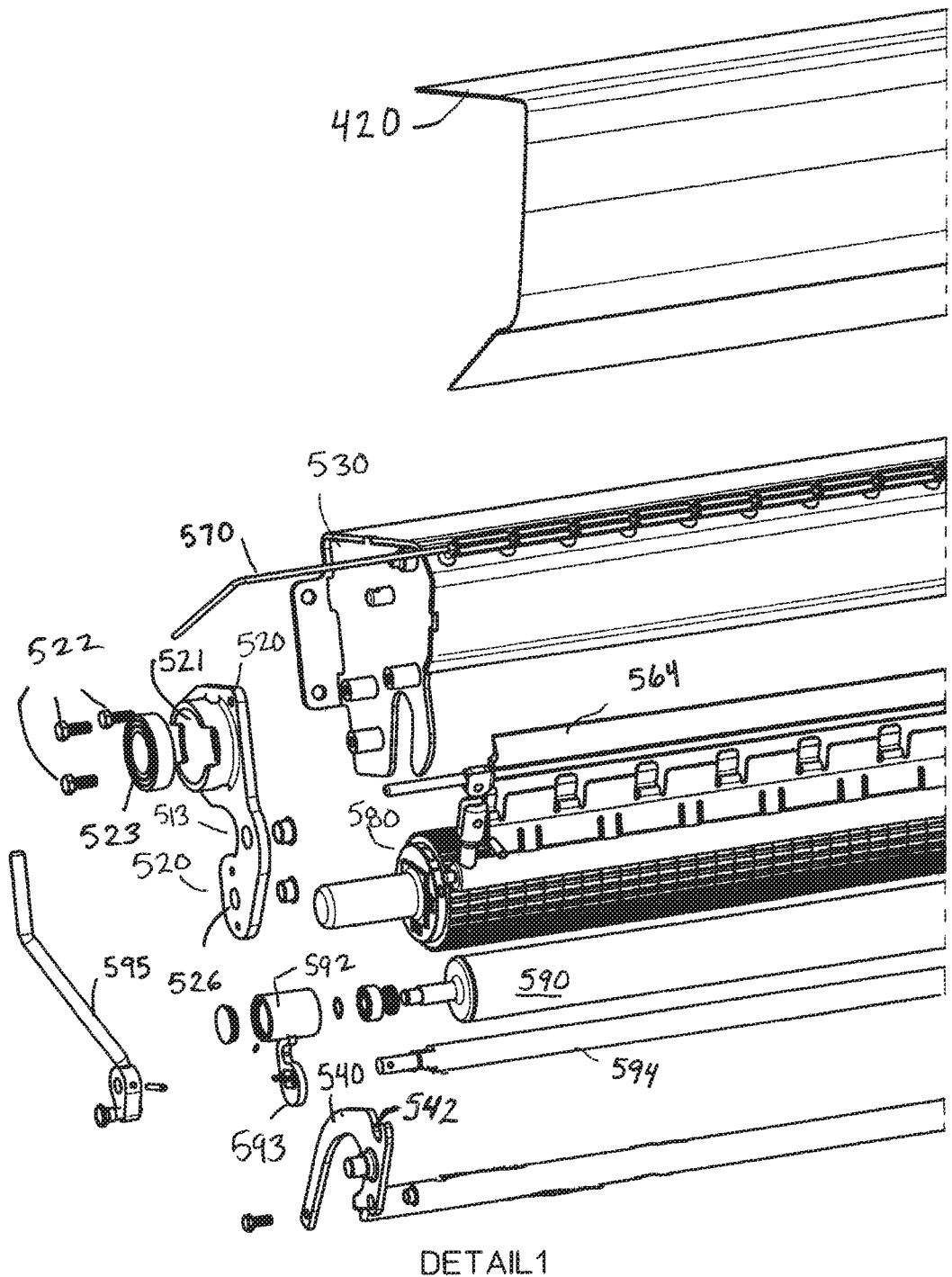
FIG. 51 is an exploded view of the outfeed portion of FIG. 49.
Figure 52:
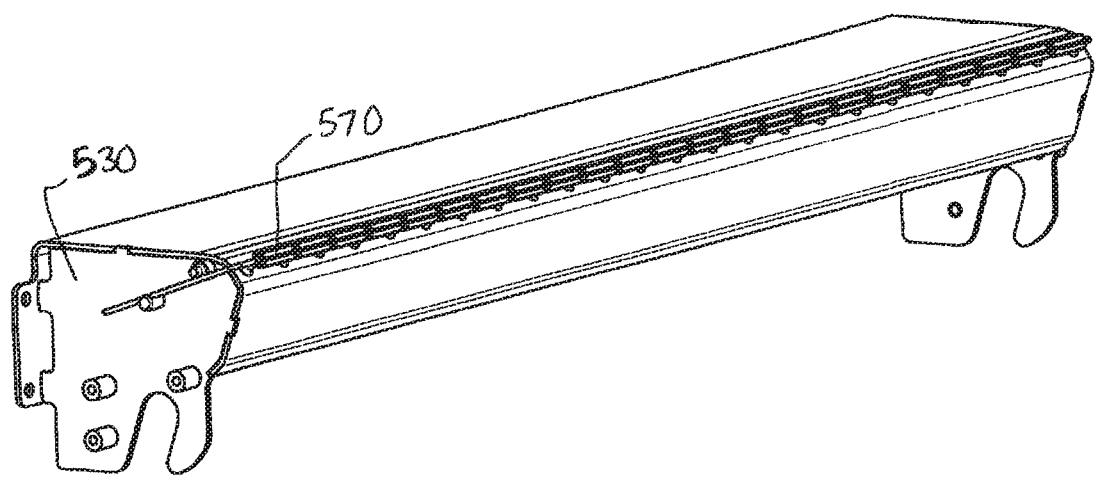
FIG. 52 is an isometric view of the side plates and support structure of the infeed portion of FIG. 49.
Figure 53:
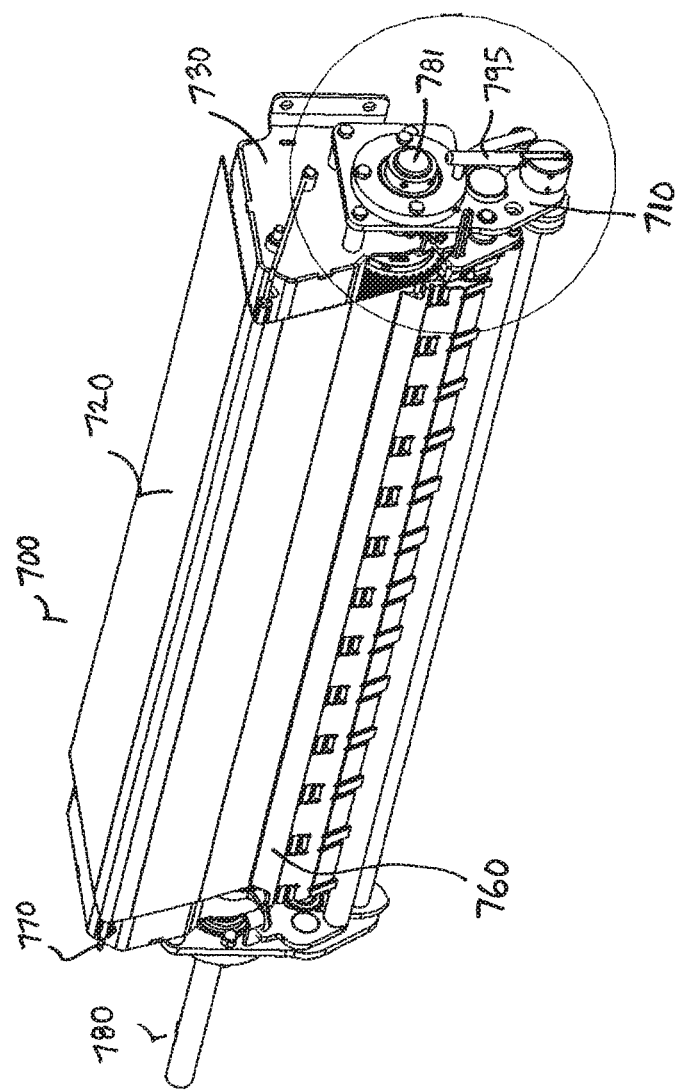
FIG. 53 is an isometric view of another embodiment of an outfeed portion of a conveyor assembly.

FIGS. 49-53 show another embodiment of an outfeed assembly 500 for a conveyor, which includes many similar components described above, including side plates 530, a noseroller assembly 570, a drive 580 driven by a motor 581, a position limiter, shown as a roller limiter 590 that can be rotated into and out of operational position, a scraper assembly 560 and position limiter connecting plates 520 for positioning the position limiter 590 in a proper position relative to the drive 580. The seat 513 of the connecting plate 520 is similar to the seat 413 at the infeed 400, and is open to allow pivoting of a cylindrical mounting end 592 of the position limiter from an operational position, seated in the curved seat, to a disengaged position, whereby the cylindrical mounting end 592 is pivoted out of the open seat 513 to disengage the position limiter. When assembled, as shown in FIG. 49, the noseroller assembly guides the conveyor belt 420 from the carryway down to the drive 580, which engages the drive side of the conveyor belt. A scraper blade 564 mounted in the scraper assembly 560 removes debris from the exterior of the conveyor belt and is properly positioned by an upper recess 542 in a mounting arm 540 connected to the connecting plate 520. A handle 595 connects to the outer side of the connecting plate 520, connecting on an inside of the mounting plate to a mounting bar 594, which connects to the position limiter roller 590 via mounting plates 593 and cylindrical ends 592. The handle 595 can pivot down to unseat the position limiter roller 590, as shown in FIG. 50, which can also push the scraper blade 564 out of engagement with the conveyor belt 520. The scraper blade 564, arms and support can be pulled out of the assembly.

The connecting plate 520 can be mounted to the side plate 530 using fasteners 522. The connecting plate 520 includes a top opening 521 for housing a bearing 523 for rotatably mounting the axle of the drive 580. An open seat 513 for the roller limiter end cap 592 is formed in the middle section and an opening 526 below the seat 513 couples the handle 595 to the mounting bar 594 for the roller limiter 590.

FIGS. 53-56 show another embodiment of an outfeed assembly 700 for a conveyor, which includes many similar components described above, including side plates 730, a noseroller assembly 770 for guiding a conveyor belt 720 at an outfeed of a carryway, a drive 780 for positively driving the conveyor belt 720 by engaging the drive side of the conveyor belt, a position limiter, shown as a roller limiter 790 that can be rotated into and out of operational position where it ensure optimal engagement of the conveyor belt 720 and the drive 780, a scraper assembly 760 and one or more position limiter connecting plates 710 for positioning the roller limiter 790 in a proper position relative to the drive 780 during operation and allowing the roller limiter and scraper assembly to move away from the drive 780 in a nonoperating mode.

The outfeed assembly 700 shows variations from the embodiments described above.

Figure 56:
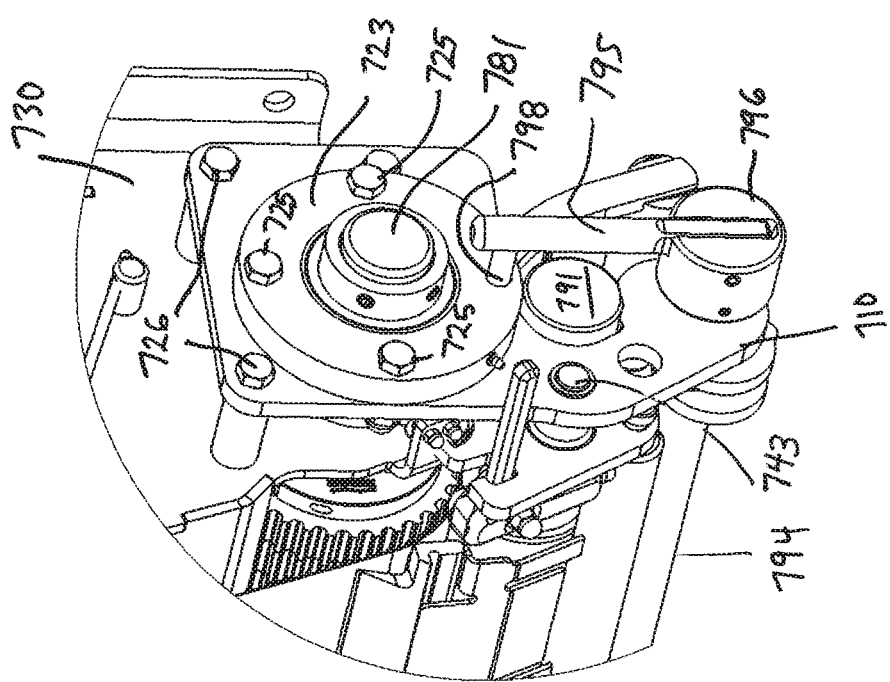
FIG. 56 is a close-up view of the outfeed portion of FIG. 53, without the conveyor belt and with the components in an engaged position.

For example, the handle 795 may be differently configured. In addition, the bearing 723 for the drive axle 781 can be an external bearing mounted to the outer side of the connecting plate 710. As shown in FIG. 56, the external bearing 723 is mounted to an outer surface of connecting plate 710 using fasteners 725 inserted through openings 729. An upper opening 721 of the connecting plate 710 (shown in FIG. 57) aligns with the central opening of the bearing 723 to house the drive axle 781. The connecting plate 710 is in turn aligned with a drive shaft opening in the side plate 730 and affixed thereto using fasteners 726 passing through openings 728 of the connecting plate and into the side plate 730.

Figure 57:
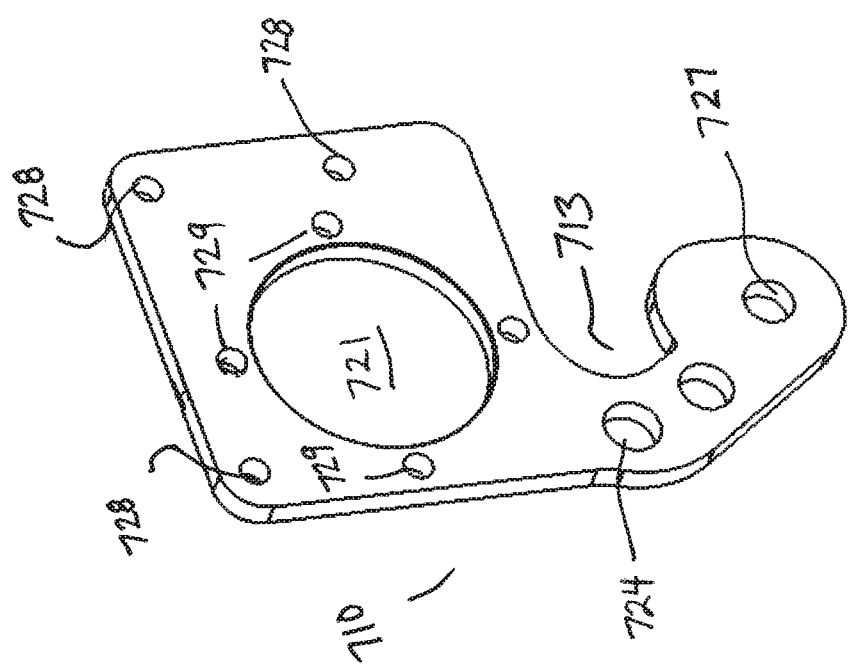
FIG. 57 is an isometric view of a limiter connecting plate of the outfeed portion of FIG. 53.

The handle 795 connects to the position limiter assembly 790 through a bottom opening 727 in the connecting plate 710, shown in FIGS. 56 and 57. The illustrative handle includes a base 796 that receives a protrusion 793 extending through the bottom opening 727 from the mounting bar 794 of the position limiter assembly 790. A handlebar extends from the base 796 to form the handle 795, with an inward protrusion 798 at the end of the handlebar. The inward facing protrusion is received in an opening 726 in the bearing 723 to selectively lock the handlebar 795 in place during operation.

In addition to the upper opening 721 for the drive axle, and the lower opening 727 for connecting the handle to the position limiter assembly 790, the connecting plate also includes an open middle seat 713 for receiving the end cap 791 of the position limiter assembly during operation, thus optimally positioning the roller portion of the position limiter assembly relative to the drive 780. Another middle opening 724 in the neck portion of the connecting plate formed by the open seat receives an outer protrusion 743 of the scraper assembly 760, shown in detail in FIG. 59, to facilitate mounting and positioning of the scraper assembly relative to the conveyor belt 720. The base 761 may be pivotally connected to the tail of the mounting arms 740 via openings 748. The open middle seat 713 allows pivoting of the end cap 791 about the opening 727 to unseat the roller portion of the position limiter assembly. The middle seat 713 is open facing a direction that is perpendicular to a reference line between the central axis of the drive axle in the upper opening 721 and the axis of the roller limiter 790 to allow translation of the roller limiter 790 from the engaged position to a disengaged position. In one embodiment, the open seat is sized and shaped such that as the roller limiter moves from the disengaged position to the engaged position the distance between the axis of the roller limiter and the axis of the drive 780 closes to a smallest allowable clearance to accommodate the belt, then opens back up to a desired final optimal distance.

Figure 58:
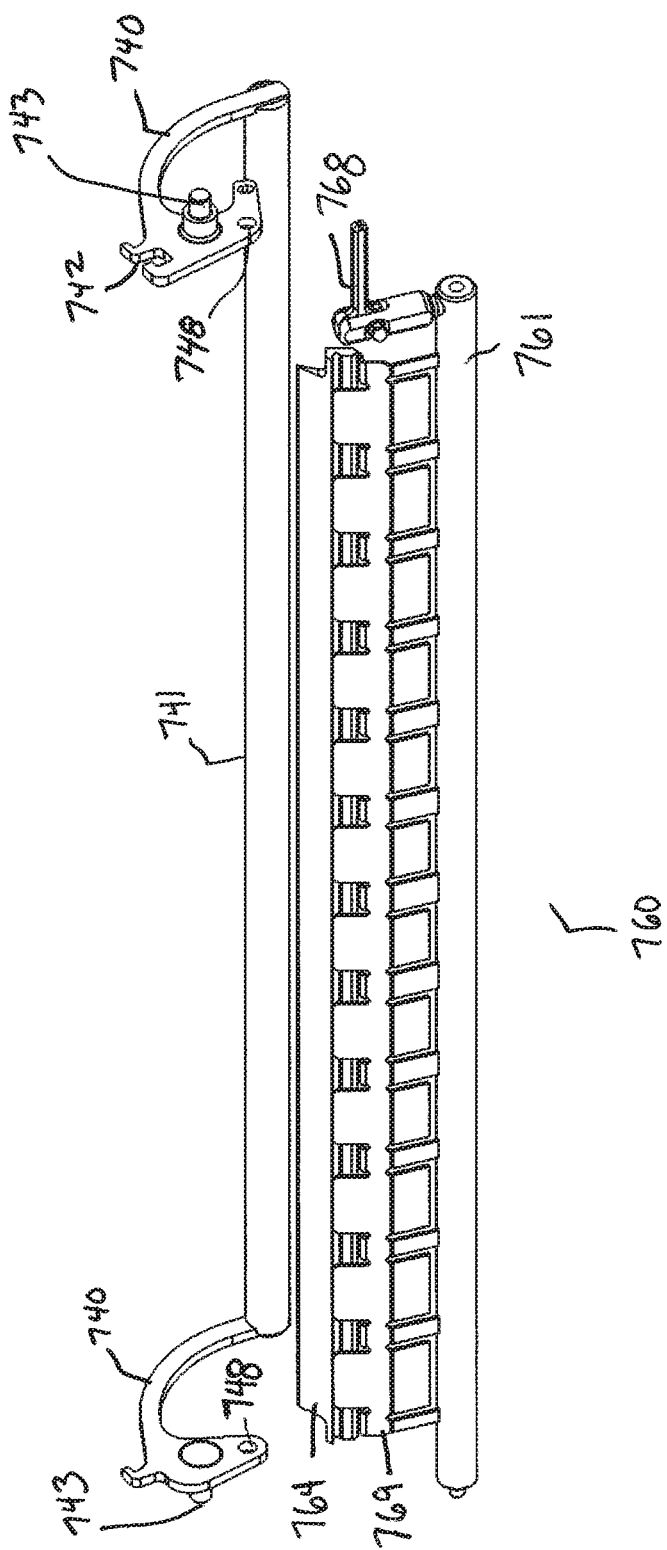
FIG. 58 is an exploded view of the scraper assembly of the outfeed portion of FIG. 53.

Referring to FIG. 58, the scraper assembly 760 includes mounting arms 740 with at least one upper recess 742 and outer protrusions 743 for mounting to the connecting plate 710. A counter weight 741 extends between ends of the mounting arms 740. The scraper blade portion comprises a base 761, flexible arms 769 and a blade 764 inserted in the flexible arms. A handle 768 extends from the end of the base 761 and is received in an upper recess 742 of a mounting arm 740 to assemble the scraper assembly.

Figure 54:
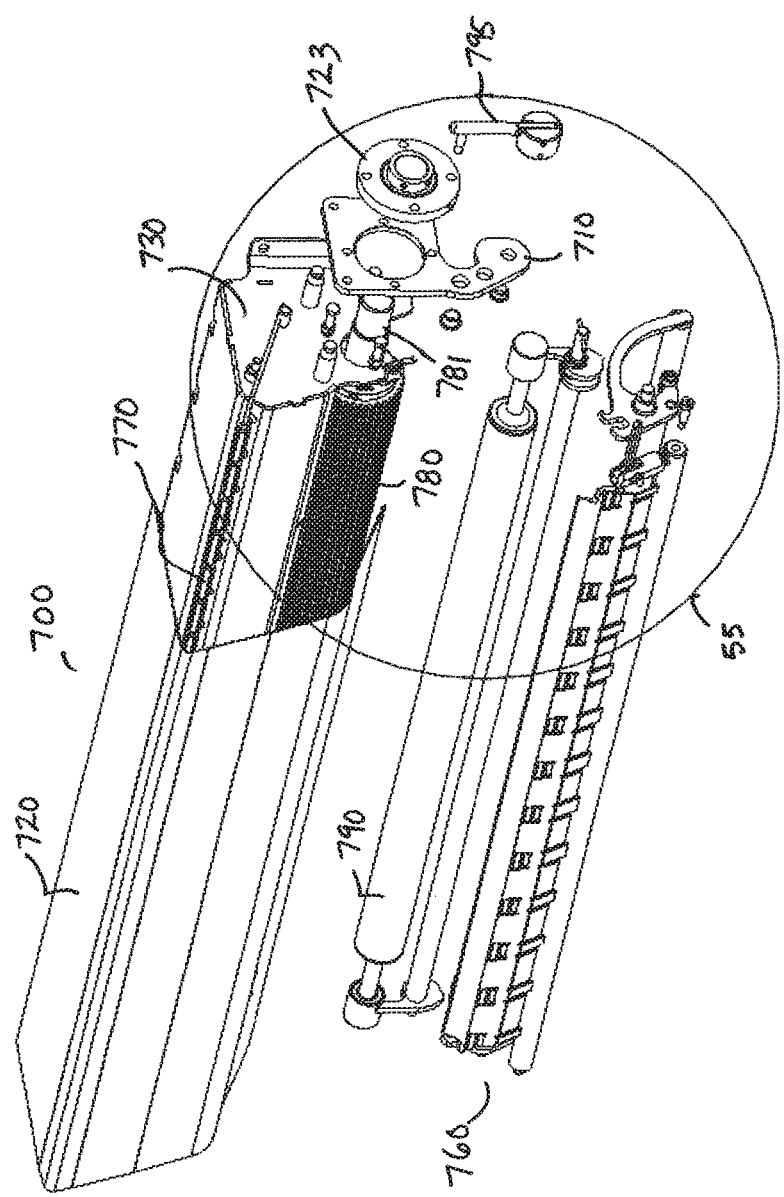
FIG. 54 is an exploded view of the outfeed portion of FIG. 53.
Figure 55:
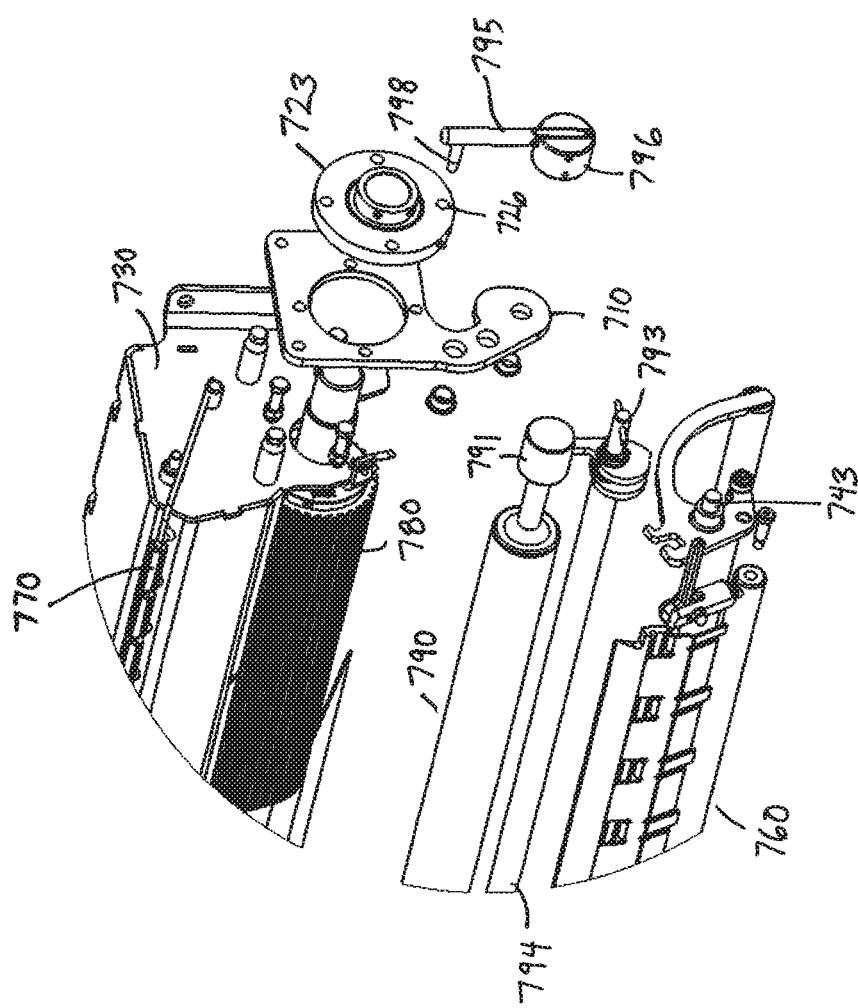
FIG. 55 is a detailed view of region 55 of FIG. 54.

In operational mode, shown in FIGS. 54 and 56, the guide assembly 770 guides the conveyor belt from carryway to the drive 780. The position limiter assembly 790, held in position by the connecting plate 710 ensures engagement of the conveyor belt and drive. The scraper assembly 760 holds the blade 764 in proper position against the conveyor belt 720 to remove debris and is held in place by the connecting plate 710 and counter weight 741 as well.

Figure 59:
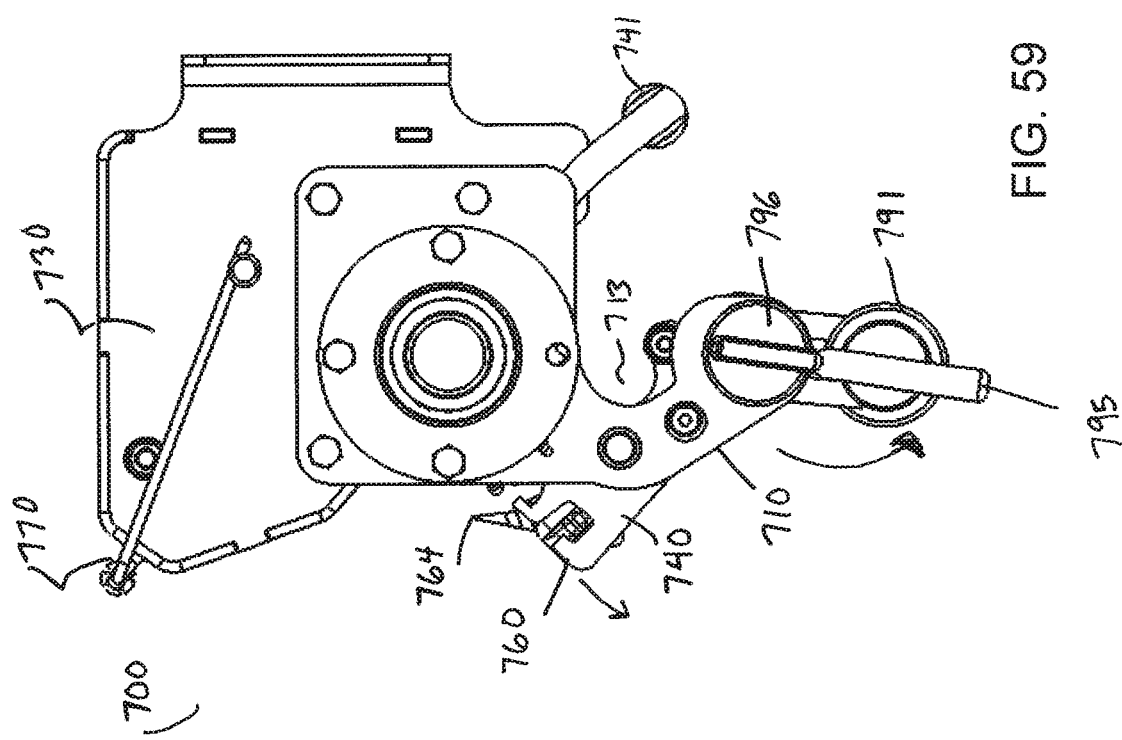
FIG. 59 is a side view of the outfeed portion of FIG. 53 in a disengaged mode.

In a non-operating mode, the position limiter 790 and scraper 764 can disengage to allow access for cleaning, repair or another purpose. Referring to FIG. 59, the handle 795 can be pivoted about its base 796 to dislodge the cylindrical end caps 791 of the position limiter assembly from the open seat 713, which pushes the connected roller portion out of an engaged position. The movement tilts the mounting arms 740 of the scraper assembly 740 away from the belt, pivoting about mounted protrusion 743 and pushing the blade portion 764 out of contact with the conveyor belt.

Figure 60:
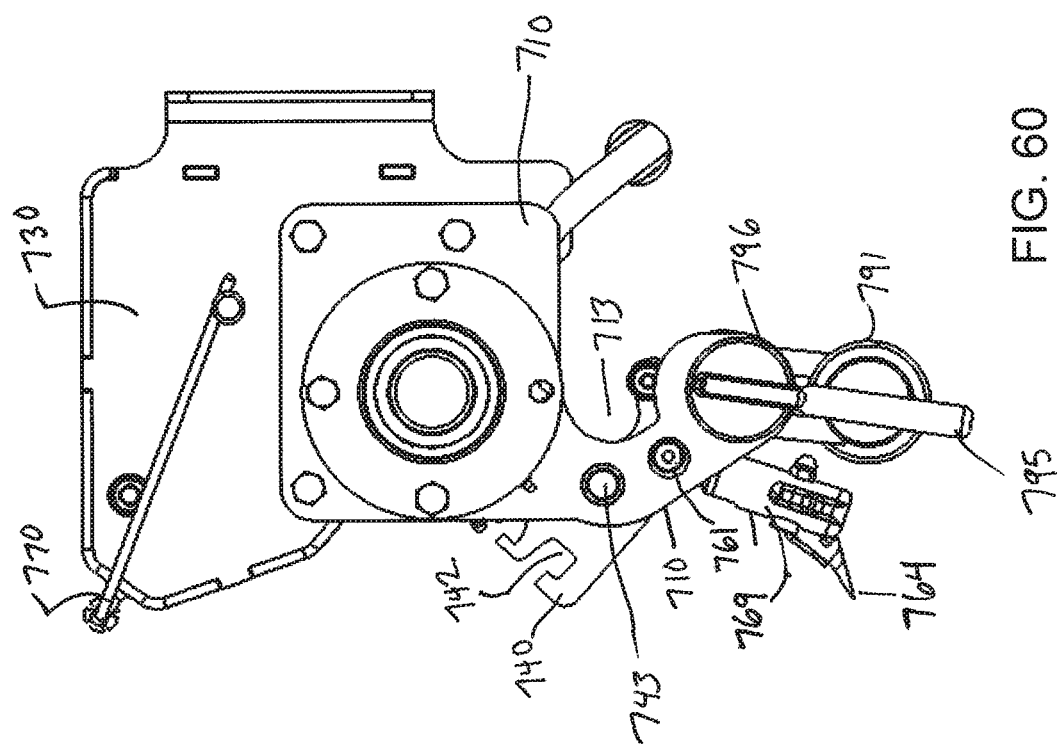
FIG. 60 is a side view of the outfeed portion of FIG. 53 when the scraper blade is disengaged from the mounting arms.
Figure 61:
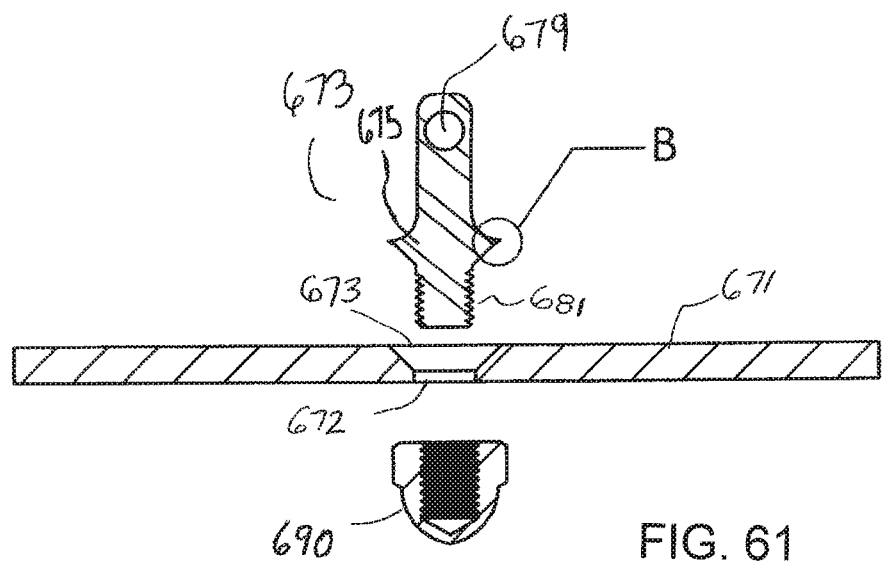
FIG. 61 is an exploded front view of an arm and base suitable for use in a noseroller assembly in a conveyor.
Figure 62:
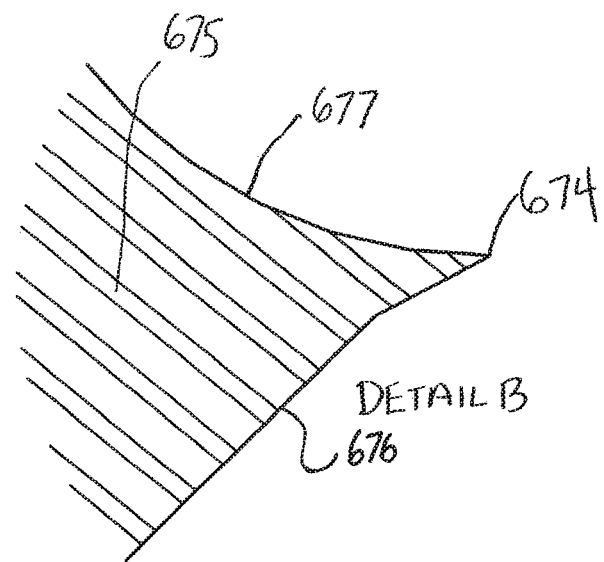
FIG. 62 is a detailed view of region B of FIG. 61.
Figure 63:
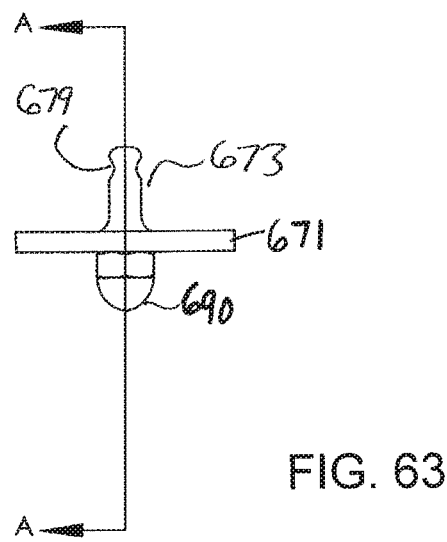
FIG. 63 shows the arm in an assembled position.
Figure 64:
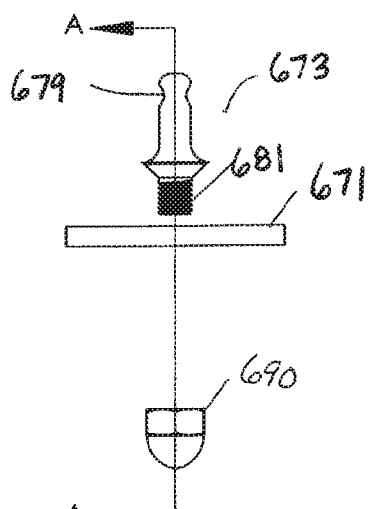
FIG. 64 is a side view of the arm of FIG. 61.
Figure 65:
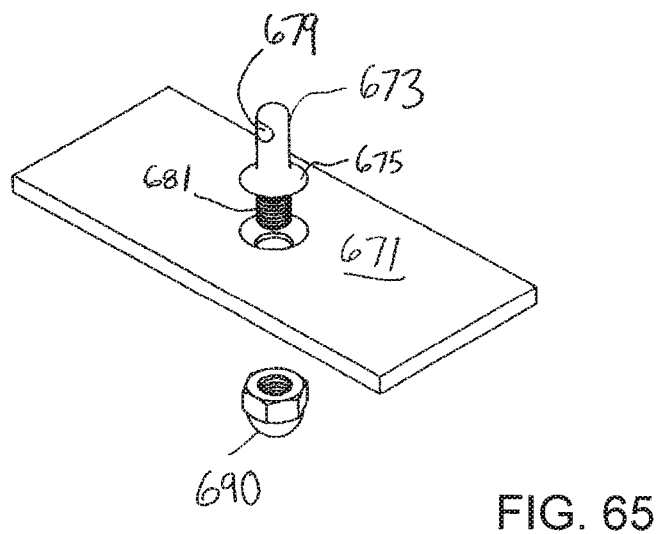
FIG. 65 is an isometric view of the arm and base of FIG. 61.
Figure 66:
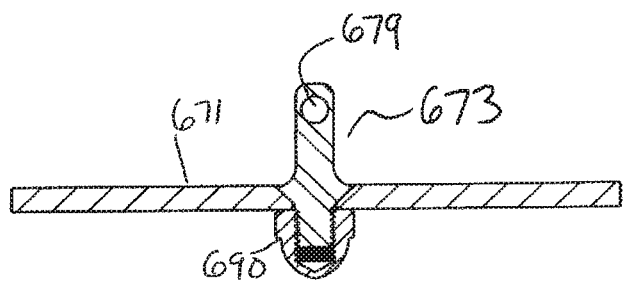
FIG. 66 is a cross-sectional view of the assembly of FIG. 63 through line A-A.
Figure 67:
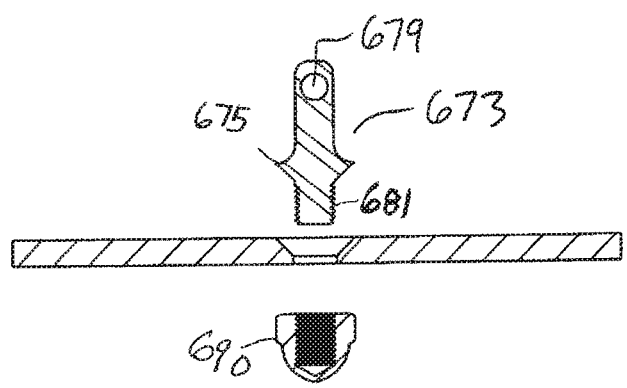
FIG. 67 is a cross-sectional view of the assembly of FIG. 64 through lines A-A.

As shown in FIG. 60, the blade 764 and arms 769 can be pushed further from the conveyor belt by lifting the handle 768 from the recess 742 and rotating the arms and attached blade 764 about the base 761 and away from the conveyor belt. As shown, in the disengaged mode, the components, such as the position limiter assembly 790 and scraper assembly 760 remain attached to the conveyor frame and can be easily pushed back into operating position.

In the assemblies described above, the noseroller assemblies 70, 170, 270 470, 570, 670, 770, comprise a support beam or plate extending from a first side to a second side, arms extending arms extending from a top surface of the support beam or plate, the arms including a plurality of aligned openings, an axle extending through the aligned openings and at least one rotatable nosebar mounted on the axle. The support beam can be mounted in a recess in the side plates of the frame, or the support plate can be permanently connected to the side plates. The axle is secured to the side plates through any suitable means. FIGS. 61-67 shown an embodiment of an arm 673 suitable for use in a noseroller assembly to support an axle holding noserollers for guiding a conveyor belt.

Each arm 673 comprises a shaped bar having an upper opening 679 for receiving an axle and a threaded bottom portion 681 for securing the arm to a support plate 671, beam, or other structure. The arm may be stainless steel or comprise any suitable material or combination of materials.

The illustrative support plate 671, beam or other conveyor component to be joined includes an opening 672 for receiving the bottom portion of the arm. A threaded nut 690 or other suitable component mates with the threaded bottom portion 681 to secure the arm 673 relative to the plate 671.

In the illustrative embodiment, the opening 672 has an upper chamfer 673, with the larger diameter of the opening facing the portion of the conveyor in which hygiene may be more important.

The arm 673 has an enlarged central portion 675 configured to be received in the upper chamfer 673. The enlarged central portion 675 comprises chamfered upper and lower surfaces 677, 676 that taper to a point 674. The bottom surface 676 may have a shape that does not match the chamfer 673 of the opening. In this manner, the arm 676 can be compressively sealed against the support plate 671. As the nut 690 is threaded onto the threaded bottom 681, the bottom surface 676 will deform to match the shape of the opening, thereby compressively sealing the arm 676 and support plate 671. This approach joining can be used to join any two conveyor components.

Figure 68:
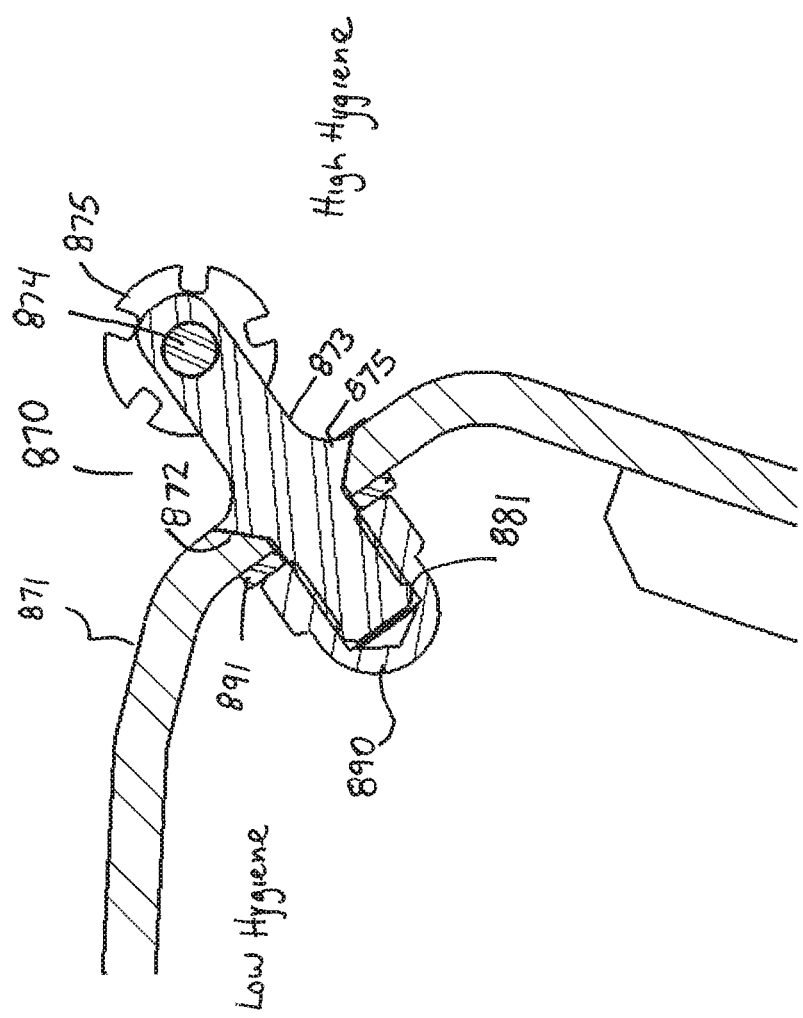
FIG. 68 is a cross-sectional is view of a noseroller assembly in a conveyor formed using a compressive seal between a high hygiene environment and a low hygiene environment according to an embodiment of the invention.

FIG. 68 is an example of an infeed or outfeed noseroller assembly 870 formed using a compressive seal between a high hygiene environment (outside the bend in the plate 871) and a low hygiene environment (within the bend of the plate 871). As shown, the base plate 871 bends to form the transition from a carryway to a returnway. At the bend, a series of openings 872 with upper chamfers are formed. A plurality of arms 873 having aligned openings are inserted in the openings 672. The arms 873 have enlarged central portions 675 configured to be received in the upper chamfers. The enlarged central portion 675 comprises chamfered upper and lower surfaces, and the bottom surfaces may be different from the shape of the upper chamfer of the openings, allowing the arm 676 can be compressively sealed against the support plate 871. The arms include a threaded bottom end 881, configured to receive a corresponding nut 890 or other suitable device. A washer 891 may be inserted between the nut 890 and inner surface of the plate 871 to facilitate sealing. As the nut 890 tightens on the threaded bottom, the bottom surface of the enlarged central portion 875 will deform to match the shape of the opening 872, thereby compressively sealing the arm 876 and support plate 871. An axle 874 inserted through the aligned openings of the arms may house one or more rotatable noseroller segments 875, as described above.

The scope of the claims is not meant to be limited to the details of the described exemplary embodiments.

What is claimed is:

1. An assembly for a conveyor, comprising:
   a first side plate;
   a second side plate opposing the first side plate;
   a first roller extending between the first side plate and the second side plate for engaging a drive side of a conveyor belt;
   a connecting plate mounted to the side plate and having a first seat for receiving an axle end of the first roller, and a second seat that is open;
   a position limiter for ensuring proper engagement between the drive side of the conveyor belt and the first roller, the position limiter having a first end configured to be received in the open seat; and
   a handle connected the position limiter, the handle movable between an operating position in which the position limiter end is mounted in the open seat and a nonoperating position, in which the position limiter end is unseated from the open seat.

2. The assembly of claim 1, wherein the open seat faces a direction that is perpendicular to the axis of the first roller and the axis of the position limiter.

3. The assembly of claim 2, wherein the open seat faces a direction that is perpendicular to a reference line between the axis of the first roller and the axis of the position limiter.

4. The assembly of claim 1, wherein the position limiter is connected to an auxiliary component, such that movement of the position limiter translates into movement of the auxiliary component.

5. The assembly of claim 4, wherein the auxiliary component is a scraper assembly comprising scraper blade mounted on a base and at a mounting arm connected to the base for mounting the scraper assembly to the position limiter.

6. The assembly of claim 5, wherein the mounting arm comprises an outward extending protrusion that is received in an opening of the connecting plate.

7. The assembly of claim 1, wherein the position limiter comprises a position limiter roller extending along a roller axis, the first end having a cylindrical shape, a mounting bar extending along an axis parallel to the roller axis, a mounting plate connecting the mounting bar to the first end and a protrusion extending outward of the mounting plate and into an opening in the connecting plate.

8. The assembly of claim 7, wherein the handle connects to the protrusion on the mounting plate and the protrusion forma a pivot point for the handle.

9. The assembly of claim 4, wherein the auxiliary component comprises a take-up roller and the connecting plate includes a slot for receiving an axle end of the take-up roller.

10. The assembly of claim 1, further comprising a bearing for bearing connected to the connecting plate for receiving the axle end of the first roller.

11. The assembly of claim 1, wherein the first roller is a brake for selectively tensioning a portion of the conveyor belt.

12. The assembly of claim 1, wherein the first roller is a sprocket for driving the conveyor belt.

13. The assembly of claim 1, further comprising a noseroller assembly mounted to the first and second plate, the noseroller assembly comprising:

a plurality of arms extending from a support, each arm including an opening aligned with openings in the other arms;

an axle passing through the openings, the axle having a curved end;

a plurality of rotatable nosebar segments inserted in spaces between the arms and mounted on the axle.

14. The assembly of claim 13, wherein each arm comprises a threaded base and an enlarged middle portion, and the support includes an opening having an upper chamfer for receiving the threaded base and enlarged middle portion.

15. The assembly of claim 14, further comprising a fastener having a threaded opening for mating with the threaded base of an arm to secure the arm to the support, wherein the enlarged portion has a bottom surface that does not match the shape of the chamfered opening, so that tightening of the fastener causes the enlarged portion to deform to match the chamfered opening, thereby compressively sealing the first component to the second component.

* * * * *